US011487793B1

(12) United States Patent
Danaei et al.

(10) Patent No.: US 11,487,793 B1
(45) Date of Patent: Nov. 1, 2022

(54) OPTIMIZED SEARCH RESULTS SYSTEM AND METHODS

(71) Applicant: VertiTrade Technologies LLC, Gold River, CA (US)

(72) Inventors: Amir Danaei, Carmichael, CA (US); Darrell Christopher LaManna, Fair Oaks, CA (US)

(73) Assignee: VERTITRADE TECHNOLOGIES LLC, Sacramento, CA (US)

( * ) Notice: Subject to any disclaimer, the term of this patent is extended or adjusted under 35 U.S.C. 154(b) by 251 days.

(21) Appl. No.: 16/801,085

(22) Filed: Feb. 25, 2020

Related U.S. Application Data

(63) Continuation of application No. 15/338,175, filed on Oct. 28, 2016, now Pat. No. 10,621,215.

(60) Provisional application No. 62/247,712, filed on Oct. 28, 2015.

(51) Int. Cl.
| | |
|---|---|
| *G06F 7/00* | (2006.01) |
| *G06F 16/29* | (2019.01) |
| *G06F 16/2455* | (2019.01) |
| *G06F 16/2457* | (2019.01) |
| *G06F 16/248* | (2019.01) |
| *G06Q 30/06* | (2012.01) |

(52) U.S. Cl.
CPC ............ *G06F 16/29* (2019.01); *G06F 16/248* (2019.01); *G06F 16/2455* (2019.01); *G06F 16/24575* (2019.01); *G06F 16/24578* (2019.01); *G06Q 30/0643* (2013.01)

(58) Field of Classification Search
CPC ................. G06F 16/29; G06F 16/2455; G06F 16/24575; G06F 16/24578; G06F 16/248; G06F 16/22; G06F 16/2282; G06F 16/23; G06F 16/289; G06F 3/0643; G06F 16/13; G06Q 30/0643
See application file for complete search history.

(56) References Cited

U.S. PATENT DOCUMENTS

| | | | |
|---|---|---|---|
| 8,606,769 B1 | 12/2013 | Berry | |
| 9,710,837 B1* | 7/2017 | Aannestad | ......... G06Q 30/0619 |
| 10,621,215 B1 | 4/2020 | Danaei et al. | |
| 2014/0172926 A1* | 6/2014 | Shafiee | ................... G06F 16/13 |
| | | | 707/821 |
| 2015/0317399 A1 | 11/2015 | Akselrod et al. | |
| 2016/0171395 A1* | 6/2016 | Lippow | ................ G06Q 10/025 |
| | | | 705/6 |
| 2017/0091203 A1 | 3/2017 | Hu et al. | |

\* cited by examiner

*Primary Examiner* — Mohammad A Sana
(74) *Attorney, Agent, or Firm* — Jones Robb, PLLC

(57) ABSTRACT

In general, the systems, components, methods, and techniques provide identifying and ordering results of a search query of a database of records, the records including a location. A user-submitted query including one or more search criteria is accessed. The search criteria are applied to search the records of database to identify a plurality of results for the query; each result corresponding to a record of the database satisfying the criteria. A first physical location associated with the user-submitted query and a second physical location indicated by the location data field or attribute of an original record are determined. An order for results is determined based on the location data.

17 Claims, 43 Drawing Sheets

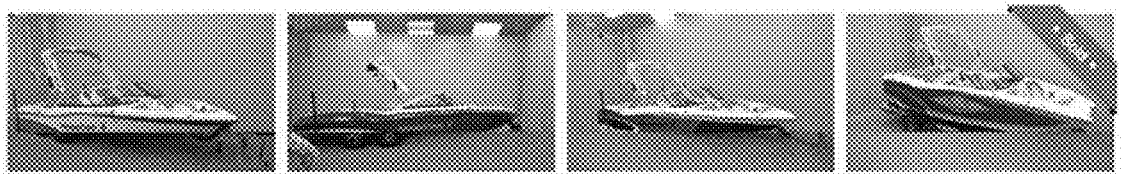
FIG. 11B

RECENTLY ADDED TO OUR PRE-OWNED INVENTORY

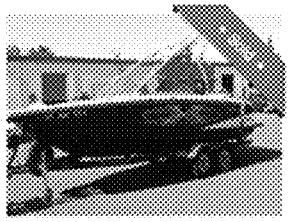 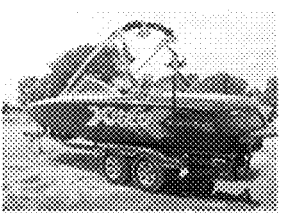 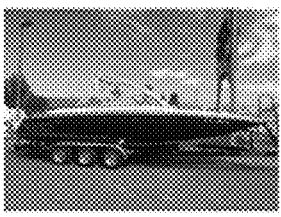 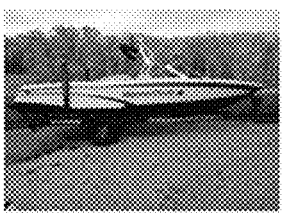

2005 MASTERCRAFT X45
$32,000.00 USD
2005 MasterCraft X45! Owner anxious to sell! Priced to sell at $32,000! 413 Hours! Optional Equipment Includes - INDMAR LY6 Upgrade Engine (Cadillac NorthStar) - Perfect Pass - Heater - ...
View Boat

2008 MASTERCRAFT XStar
$43,000.00 USD
Great boat at an amazing price!
View Boat

2006 MASTERCRAFT X80
$64,995.00 USD
2006 X80, Loaded with all options, Shower, Boat Cover, Triple Axle Trailer, Tower Speakers and Racks, with Twin MCX Motors. Very low hours with only 140 total! Call NorCal MasterCraft ...
View Boat

2015 MASTERCRAFT ProStar
Call For Price
LIKE NEW MASTERCRAFT PROSTAR, WELL EQUIPPED! Enjoy this well cared for ProStar nicely equipped with the following: 5.7 liter 320hp engine, Removable Tower, MTS Ballast, Stereo w/JL Speakers, Mooring Cover, Ski ...
View Boat

| BOAT LISTINGS | SELL YOUR BOAT | TRADE-IN YOUR BOAT |

Mastercraft Apparel    Listing
Trade-in               Sell Your Boat
Term of Use            Boat Showroom
Contact                Dealer Login

FIG. 11C

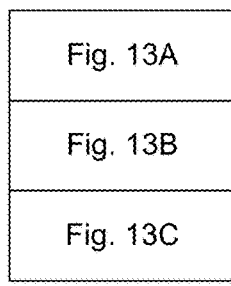
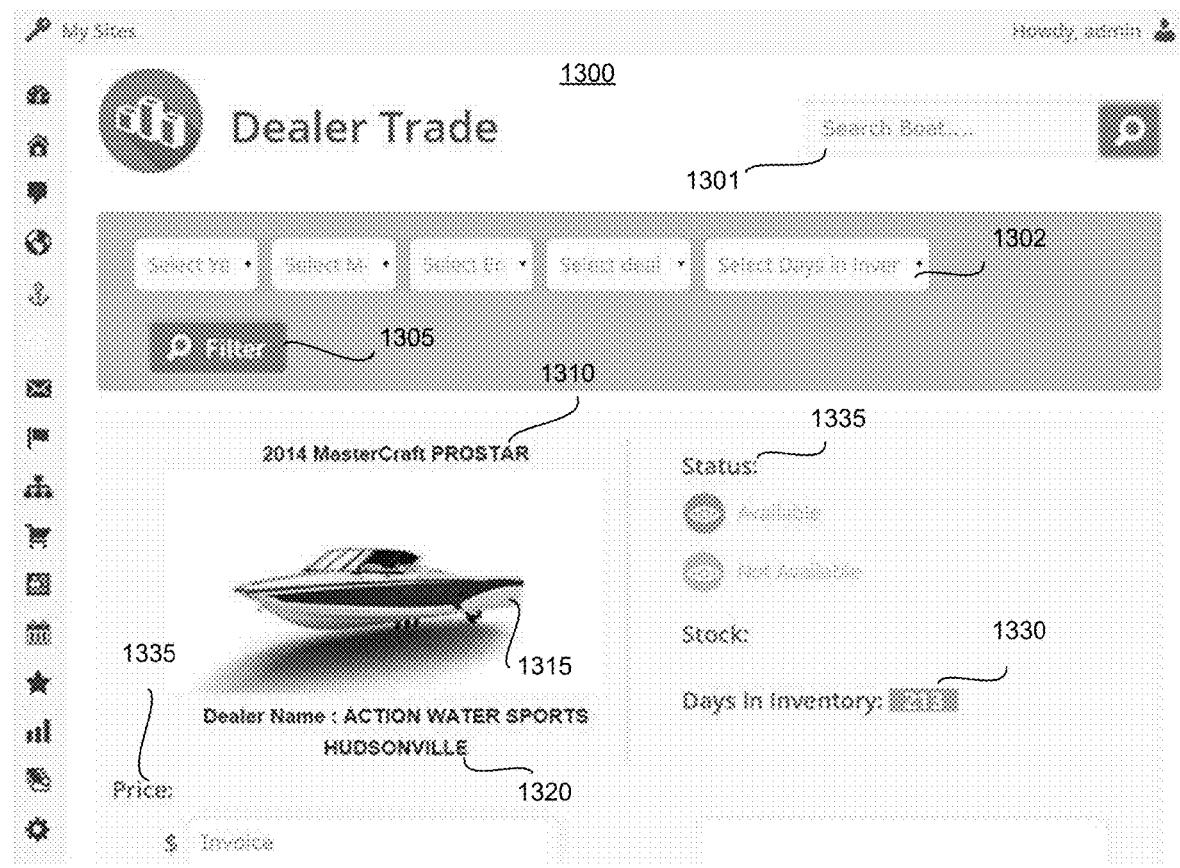
FIG. 13A

Add images gallery

Note: You cannot directly select the images from the media library, instead you have to upload a new image.

Featured image

Remove featured image

Boats Information

Price: 154980
Enter Price only. Example : 100 or 152

Model Status: ● New Model  ○ Used Model
Select whether the model is new or used(old)

Mfg. Year: 2016
Enter Year of Manufacture. Example : 2015

Make: MasterCraft
Manufacturers Name

Model: X23
Boat Model

Length: 22ft 9in / 6.93m
Length of Boat

Color:
Color Combination

Engine Description:
Make Model and Horsepower

FIG. 17B

| | | |
|---|---|---|
| Engine Model | 6.2 VD 2:1 16 MV8 ILMOR | |
| | Model and Size of Engine or Motor | |
| Engine Hours | 0 | FIG. 17C |
| | Number of Hours on Engine | |
| Stock Number | | |
| | Stock Number of boat | |
| PDF URL | | |
| | Enter PDF URL. Example: http://mysite.com/pdf/car.pdf | |
| Contact Name | | |
| | Enter Contact Name. Example: John Smith | |
| Zip Code | | |
| Dealer ID | 42418200 | |
| | MasterCraft Dealer ID | |
| Video | | |
| | Enter embedded code for video. eg. : code from youtube, vimeo, etc... | |
| Additional Features | | |
| | Add Additional Features here. | |
| Sale Status | ● For Sale   ○ Pending Sale   ○ Sold & Delivered | |

FIG. 18

Discount Report

Total Budget For Discounts : $100000 USD

Remaining Budget : $80000 USD

1900

| Model Status | Year | Make | Model | Dealer Name | Hull ID | Manufacturer Discount |
|---|---|---|---|---|---|---|
| New Model | 2015 | MasterCraft | PROSTAR | CALIFORNIA SKIER | MBC3DER7K415 | $ 5000 USD |
| New Model | 2015 | MasterCraft | PROSTAR | NOR CAL MC-PLEASNTON | MBC3DEH1J415 | $ 4000 USD |
| New Model | 2015 | MasterCraft | PROSTAR | RAYBURNS MARINE | MBC3DCL3H415 | $ 5000 USD |
| New Model | 2015 | MasterCraft | NXT20 | StarCraft of Oregon | MBC3FC6BH415 | $ 6000 USD |

FIG. 19

OPTIMIZED SEARCH RESULTS SYSTEM AND METHODS

CROSS-REFERENCE TO RELATED APPLICATIONS

This application is a continuation of U.S. application Ser. No. 15/338,175, titled "OPTIMIZED SEARCH RESULTS SYSTEM AND METHODS" filed on Oct. 28, 2016, which claims the benefit under 35 U.S.C. § 119(e) of U.S. Provisional Application No. 62/247,712, titled "MANUFACTURED PRODUCTS AND RELATED PARTS INVENTORY MANAGEMENT SYSTEM AND METHODS" filed on Oct. 28, 2015 in the U.S. Patent and Trademark Office, both of which are herein expressly incorporated by reference in their entirety for all purposes.

BACKGROUND

The Internet provides access to a wide variety of resources, for example, webpages, image files, and videos. These resources include content for particular subjects, items, or interests of users. A search system can aid a user in identifying one or more resources in response to receiving a search query. A search query is data that a user submits to a search engine to find information to satisfy the user's informational needs or criteria. The search queries are usually in the form of text, e.g., one or more query terms or other criteria selected by a user. The search system selects resources based on the query and provides search results that link to the selected resources. The search results are typically presented to a user; however, even if ranked or scored, the presentation of the results may not best suited for a particular user or allow a user to make a quick or informed decision. A user often is not confident in the results returned, especially in cases where a large number of results match the terms or criteria. As a result, a user is left with combing through pages of results or giving up in frustration.

SUMMARY

In general, one innovative aspect of the subject matter described in this specification can be embodied systems, components, methods, and techniques that provide identifying and prioritizing results of a search query of a database of records, where the records including a location. A user-submitted query generated by a user interface of a user device, the query including one or more search criteria is accessed; the search criteria is applied to search the records of database to identify a plurality of results for the query; each result corresponding to a record of the database satisfying the criteria; a first physical location associated with the user-submitted query and a second physical location based on a relation to the first physical location are determined. A priority for each of the plurality of results is determined, wherein a result is determined to have: a first priority when a physical location indicated by the record corresponding to the result matches the second location; a second priority when a virtual location indicated by the record corresponding to the result matches the second location; and a priority lower than the first or second priority when the physical location or the virtual location indicated by the record corresponding to the result does not match the second location; and the results are provided for presentation by the interface of the user device in an order based on the priority of each result.

Particular embodiments of the subject matter described in this specification can be implemented so as to realize one or more of the following advantages. For example, prioritizing the results as described herein reduces the likelihood that the user will be presented with extraneous information or become frustrated and ignore or become disinterested in the results returned in response to a query. This, in turn, allows the user to focus more quickly on resources and information that are more likely to satisfy the user's informational need. Moreover, a user will be presented with results that a user would not otherwise recognize as viable results based on a search of the records without the prioritization as described herein. Moreover, the user satisfaction may be increased by providing a resource that is better able to service the user in response to selection of a result or resource.

Implementations of any of the described techniques may include a method or process, an apparatus, a device, a machine, a system, or instructions stored on a non-transitory computer-readable storage device. The details of particular implementations of the subject matter described in this specification are set forth in the accompanying drawings and description below. Other features, aspects, and advantages will become apparent from the following description, including the drawings, and the claims.

BRIEF DESCRIPTION OF THE DRAWINGS

FIG. 18 shows an example of a screen shot that may be provided by a system transfer interface. comprise FIG. 19 shows an example of a screen shot of a system transfer interface manufacturer discount report.

DETAILED DESCRIPTION

Figure 1:
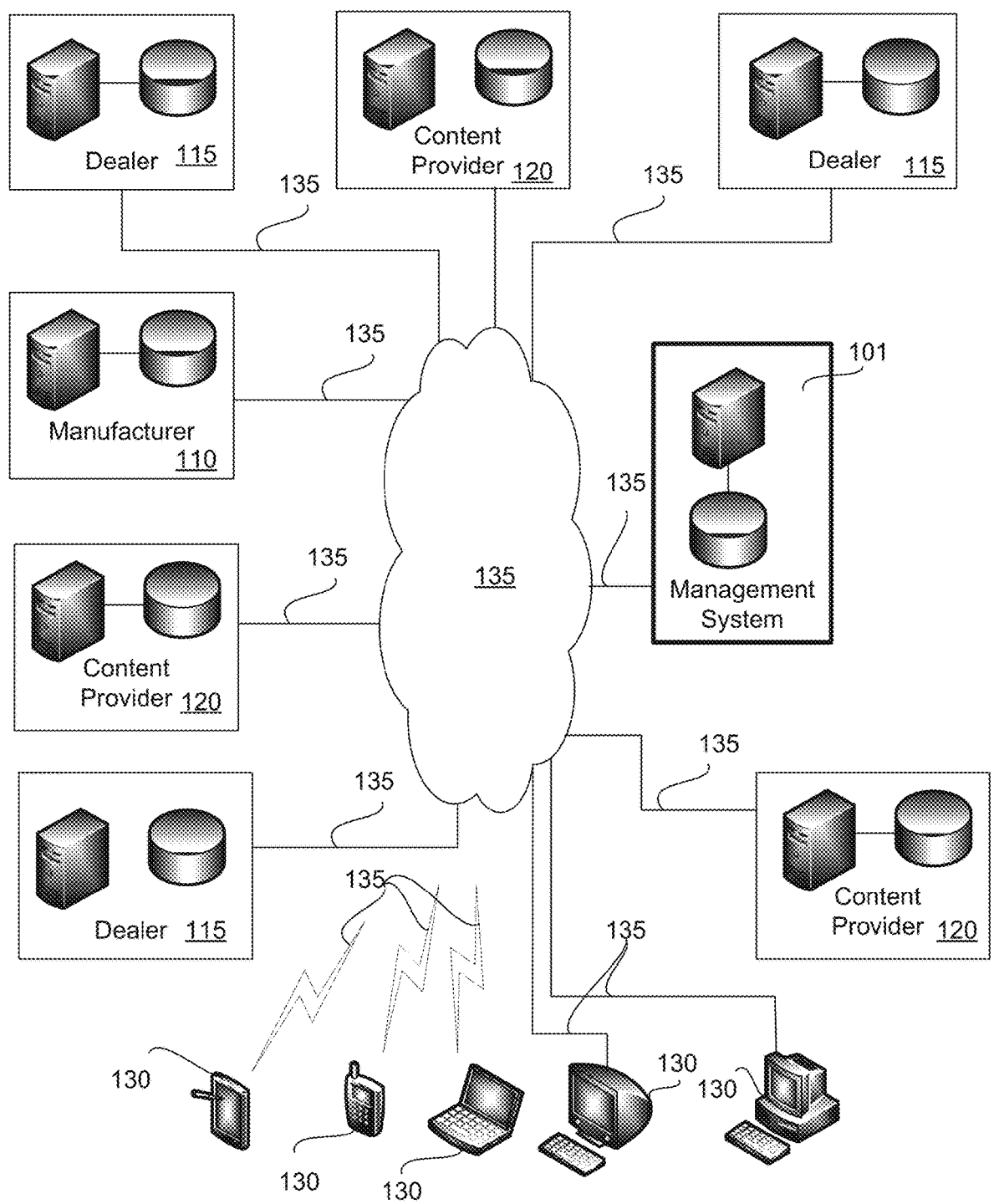
FIG. 1 illustrates an example of a system for optimizing and facilitating inventory management, transferring products and parts between dealerships, and e-commerce sites for listing of products and parts.

The following detailed description is merely exemplary in nature and is not intended to limit the described embodiments (examples, options, etc.) or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable making or using the embodiments of the disclosure and are not intended to limit the scope of the disclosure. For purposes of the description herein, the terms "upper," "lower," "left," "rear," "right," "front," "vertical," "horizontal," and similar terms or derivatives thereof shall relate to the examples as oriented in the drawings and do not necessarily reflect real-world orientations unless specifically indicated. Furthermore, there is no intention to be bound by any expressed or implied theory presented in the following detailed description. It is also to be understood that the specific devices, arrangements, configurations, and processes illustrated in the attached drawings, and described in the following specification, are exemplary embodiments (examples), aspects and/or concepts. Hence, specific dimensions and other physical characteristics relating to the embodiments disclosed herein are not to be considered as limiting, except in the context of any claims, which expressly states otherwise. It is understood that "at least one" is equivalent to "a."

The aspects (examples, alterations, modifications, options, variations, embodiments, and any equivalent thereof) are described with reference to the drawings; it should be understood that the descriptions herein show by way of illustration various embodiments in which claimed inventions may be practiced and are not exhaustive or exclusive. They are presented only to assist in understanding and teach the claimed principles. It should be understood that they are not necessarily representative of all claimed inventions. As such, certain aspects of the disclosure have not been discussed herein. That alternate embodiments may not have been presented for a specific portion of the invention or that further alternate embodiments that are not described may be available for a portion is not to be considered a disclaimer of those alternate embodiments. It will be appreciated that many of those embodiments not described incorporate the same principles of the invention and others that are equivalent. Thus, it is to be understood that other embodiments may be utilized and functional, logical, organizational, structural and/or topological modifications may be made without departing from the scope and/or spirit of the disclosure.

Overview

In general, one innovative aspect of the subject matter described in this specification can be embodied systems, components, methods, and techniques that provide identifying and prioritizing results of a search query of a database of records, the records including a location. A user-submitted query generated by a user interface of a user device, the query including one or more search criteria is accessed; the search criteria is applied to search the records of database to identify a plurality of results for the query; each result corresponding to a record of the database satisfying the criteria; a first physical location associated with the user-submitted query and a second physical location based on a relation to the first physical location are determined. A priority for each of the plurality of results is determined, wherein a result is determined to have: a first priority when a physical location indicated by the record corresponding to the result matches the second location; a second priority when a virtual location indicated by the record corresponding to the result matches the second location; and a priority lower than the first or second priority when the physical location or the virtual location indicated by the record corresponding to the result does not match the second location; and the results are provided for presentation by the interface of the user device in an order based on the priority of each result.

Particular embodiments of the subject matter described in this specification can be implemented so as to realize one or more of the following advantages. For example, prioritizing the results as described herein reduces the likelihood that the user will be presented with extraneous information or become frustrated and ignore or become disinterested in the results returned in response to a query. This, in turn, allows the user to focus more quickly on resources and information that are more likely to satisfy the user's informational need. Moreover, a user will be presented with results that a user would not otherwise recognize as viable results based on a search of the records without the prioritization as described herein. Moreover, the user satisfaction may be increased by providing a resource that is better able to service the user in response to selection of a result or resource.

In particular, certain manufactured products and related parts that are made and branded by a manufacturer are not directly available from the manufacturer, but only through authorized entities. Moreover, there may be restrictions placed on the authorized entities by the manufacturer. For example, each authorized entity may be assigned a locality, a geographic region, or a territory that is serviced by the entity. For example, boat manufacturers often sell new boats and brand related products through authorized dealerships. The authorized dealership sells new boats based on an existing contract with the manufacturer, typically specifying the dealership as the distributor for the brand to a particular location or area. The dealership typically employs salespeople who are knowledgeable about the brands to sell their products. The dealership also may provide maintenance services, and employ technicians to stock and sell manufacturer authorized parts and process warranty claims.

As part of the contract with the dealership, the manufacturer may dictate or heavily influence how much inventory the dealership must take for a current model year. Production slots for new products assigned to the dealerships are negotiated between a manufacturer and their dealerships, where a manufacturing "slot" is established for a dealership, which will be filled with a corresponding new product from the manufacturer once the product is produced. Once these slots have been established, the dealership is more or less obligated to accept the product to fill the slot at later time without regard to changes in demand or sales. This may result in a surplus of inventory at a dealership, and the dealership may have inadequate storage for the additional inventory placing stress on the dealership to prematurely sell inventory or discount inventory or even take a loss. Moreover, inventory is managed by each dealership without knowledge of other dealer's inventory. This is further exasperated because of territory restrictions and service arrangements. As a result, inventory that could be sold where there is demand at other dealerships remains in a dealer's inventory. In addition, customer's looking for specific products may not be able to find desired products or may have to expend a lot of effort to do so, resulting in lost sales and surplus inventory for the merchant.

In addition, the explosion of Internet use has allowed niche e-commerce services to grow and reach the general consumer marketplace. Examples of such services include BoatTrader.com, iBoats.com, and Boats.com. However, these services are not affiliated with manufacturers and do not provide merchandise that is certified by the manufacturers. As a result, this merchandize often come with disclaimers. Furthermore, historical manufacturer information about the boats is not available. Nor is the consumer provided with any local authorized servicer of the merchandise for repairs or redress due to faulty parts or damaged merchandise. This leads to consumer confusion and lack of confidence when buying the manufacturers merchandise. In addition, manufacturer's branding may be harmed due to lack of proper maintenance or substitution of authorized OEM parts. Finally, these cites do not provide any relief of merchant excess inventory and its related problems.

However, because of the growth in online shopping and e-commerce sites, user's increasingly demand fast page creation and access to inventory regardless of location. Moreover, the generation of accurate and fast delivery to consumers of product information may be important because as page load times increase, consumers may be increasingly more likely to abandon the page. Accordingly, slow page loading or generating times on a merchant site may directly decrease overall sales and profitability. An inventory availability tracking system is typically an important component of any merchant site, for example, an e-commerce site, an m-commerce site, a store kiosk, or other types of online or electronic sales operations. Generally, an inventory management system may include functionality to track current inventory levels of merchandise offered for sale at the merchant site. However, as explained above, because of the nature of restrictions on dealerships, there is no sharing of inventory or related data between dealerships.

In one general aspect, the following description provides systems, components, methods, and techniques for optimizing automated inventory management of products and manufacturer production slots assigned to distinct and separate authorized entities servicing a corresponding assigned physical location, such as a locality, a geographic area, a region, or a territory. In addition, an automated, customizable user interface is provided that may be generated quickly with accurate information regarding available inventory from a manufacturer regardless the actual entity in possession of the product, the actual physical location of the product, or any manufacturer restrictions on locals, geographic regions, and/or territories assigned to the entities by the manufacturer.

As described above, in one general aspect, manufacturer production slots are negotiated between a manufacturer and one or more authorized merchants in advance of the actual manufacturing of a product. For example, the number of products accepted by a merchant for products having production years, such as, cars and boats, are often negotiated between the manufacturer and the merchant well in advance of the production of the actual product. As part of this negotiation, a "production slot" is established for a merchant that is filled with a new product from the manufacturer once the product is manufactured. Once the production slots have been established and assigned to the merchant, or at a point in time where production of the product cannot be cancelled, stopped, or otherwise easily reversed, the merchant is generally obligated to accept the newly manufactured product in their inventory when delivered to the merchant. However, because the production slots are predetermined, for example, months in advance, by the time the manufactured product is delivered to the merchant, the merchant may find that the new product does not sell as well as predicted and/or does not "fit in" with the merchant's physical location or established community of buyers. In addition, due to many different circumstances, the merchant also may find they do not have the physical space to store or sell the newly delivered product. Even prior to delivery, merchants often are able to determine that the new product corresponding to a production slot may not be desirable or profitable to the merchant. As a result, the merchant may be burdened with excess inventory, and even with foreknowledge, have limited means to address the issue.

In one example, the manufacturer may be a boat manufacturer, and the merchant may be a dealership. However, conventional boat and boat parts sales e-commerce systems have a technological limitation in that they do not provide the ability to search, manage, and move inventory between dealerships despite the fact the dealerships service the same manufacturer. In addition, there are currently no manufacturer-based online communities that provide dealerships with an automated system to make their inventory available through other dealerships. Furthermore, there is no system that allows dealerships to move manufacturer production slots assigned to one dealership to other dealerships before delivery of the new product to the dealer inventory. In addition, users often wish to search for products by manufacture. Currently, this would require the user to log into each dealer's website and look for products in that dealer's inventory in order to see a price and availability of the desired product. As a result, the current technology is lacking a solution to this problem.

Conventional boat and boat parts sales e-commerce systems also do not provide a direct relationship between the consumer and the actual manufacturer of the boats and boat parts that are being sold. Therefore, the data provided by conventional e-commerce sites do not originate directly from the manufacturer leading to consumer confusion and difficulty when servicing their products. In addition, due to the lack of any direct connection to the manufacturer's brand, the boats and parts sold by the e-commerce systems and web communities cannot be matched with any official manufacturer product data. For example, the e-commerce system and web communities cannot be associated with any official manufacturer brands, including all aspects of a boat and a boat part's definition, such as factory imagery, production history, and any and all other identifying information. This further adds to consumer confusion and frustration. In addition, because these sites are unable to create customized web interfaces for a specific manufacture that also allows the user to identify products of interest in different dealer inventories, potential sales or optimized use of inventories are not achieved.

The automated inventory system described herein implements various processes and systems enabling dealerships provide both in stock inventory, in addition to assigned production slots, for transfer to other dealerships regardless of territorial restrictions. The various processes and system also provide a technological solution to the processing deficiencies delivered by current distributed dealership inventory systems and manufacturer-dealer assigned inventory and production slots. As a result, a dealership is better able to automatically manage inventory, generate profits, and fill the needs of their particular customer base.

In another aspect of the automated system, consumers can search and view available inventory, products and parts that dealerships have marked available, regardless of the actual physical location of the dealerships and the inventory. The consumer can then transact between their local dealership and the dealership that holds the available product simply by indicating their interest in the product through user interface of the automated system. The system provided herein also implements processes to automate information management of boats and boat parts using data originating directly from the manufacturer, even when a boat is resold by a private party, to provide better service for consumers and branding for manufacturers.

System Overview

FIG. 1 illustrates an example of a system 100 for optimizing and facilitating inventory management including the management of production slots assigned from the manufacturer, moving products and parts in inventory between dealerships regardless of territory restrictions placed on a dealership, and sales of manufacturer products and parts. As shown in FIG. 1, the system 100 includes a number of components including: an inventory management system 101, a manufacturer system 110, one or more dealership systems 115, one or more content providers 120, and a plurality of user devices 130. The various components of the system 100 communicate or exchange data via any number of communications paths 135. The system 100 is described in greater detail below.

The system 100 includes at least one manufacturer (e.g., a boat manufacturer, such as Mastercraft, Sea Ray, Bayliner, Chris Craft, etc.). The manufacturer builds and/or distributes branded products (e.g., Mastercraft's Prostar or X-series line of boats) and associated authentic manufacturer or original equipment manufacturer (OEM) parts for use with the products. Typically, a manufacturer works directly with an authorized dealership to sell and service the manufacturer's products. Each manufacturer retains a significant amount of detailed information regarding each product and part including components, specifications, part numbers, identification numbers, dates of manufacture, service information, etc. In one example, a manufacturer system 110 of the manufacturer may store this information in one or more storage systems.

The system 100 also includes at least one dealership. A dealership is authorized by the manufacturer to sell the manufacturer's products. The dealership also is authorized to service the manufacturer's products and to sell authorized parts for use with the products. Typically, the dealership is assigned a locality, a geographic region, or a territory, which the dealership exclusively services for the manufacturer's products. Each dealership negotiates with a manufacture to determine its territory and to buy a certain amount of inventory from the manufacturer. During negotiations the dealership is assigned a predetermined number of production slots for various models of new inventory for one or more determined time periods (e.g., a specific date, a month, a quarter, a year, etc.). A production slot allocates a predetermined product built by a manufacture for a specific dealer to be shipped to a dealer at designated point in time. The cost of the product (e.g., an invoice amount) is predetermined between the dealer and the manufacturer. As mentioned above, dealerships generally service a particular territory, a region or a locality. Boat transport services are used to move the boats from the manufacturer's factory to the specified dealerships (or from dealership to dealership as described below). The cost of shipping is typically added to the cost of any boat sold by the dealership. The dealership inventory and its associated information may be stored in a dealership system 115 and/or within the automated inventory management system 101, as described below.

The system 100 may include one or more online content providers 120. Online content providers 120 provide content to users through an interface provided by a user device 130, such as a browser or mobile application interface. Examples of content providers 120 include e-commerce sites, third party classified sites, online auction sites, and online social media sites, to name but a few of content providers available on the world wide web.

The system 100 also includes one or more user devices 130. The user device 130 may be any type of interactive electronic device that presents, plays, or renders content, such as a web page accessed from the Internet or World Wide Web for a user. For example, the user device 130 may be a consumer electronics device, a mobile phone, a smart phone, a personal data assistant, a tablet computer, a hand held/mobile computer, a personal computer, a notebook or ultrabook computer, a work station, a vehicle computer, a game system, a set-top-box, or any other device that can implement a user interface and/or browser to communicate with, access, and present content from the Internet or World Wide Web to a user and/or communicate over a the communication path 135 to access any of the components of the system 100, such as the content providers 120.

The user devices 130 are used by individuals to access data and view content from any of the systems 101, 110, 115, and 120, although access to data and content may be different for different users based on levels of permissions and access. For example, consumers may access content about products for sale or to list their own products for sale. Dealers may access information about inventory and manage inventories. Manufacturers may access, add, and edit inventory. Other examples of interfaces for use with user devices 130 are provided below.

Each of the manufacturer systems 110, the one or more dealership systems 115, the one or more content providers 120, and the plurality of user devices 130 may be implemented using one or more special-purpose or general-purpose computers or data processing apparatuses capable of responding to and executing instructions in a defined manner. The computers or data processing apparatuses may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the computers or data processing apparatuses. In addition, storage devices and databases associated with the various system components may be implemented using one or more mass storage devices or memories. When these devices are programmed with specific instructions, they become configured to direct the data processing apparatuses to perform the operations and provide the functions detailed in the various flow diagrams, as explained in greater detail below.

As shown in FIG. 1, system 100 also includes an inventory management system 101 for optimizing and facilitating inventory management, transferring of products and parts between dealerships, and sales of products and parts despite restrictions on dealership service territories. The inventory management system 101 stores information that is received from the manufacturer about each product and/or part available for sale or trade by the system 100. In addition, the inventory management system 101 also stores all production slots assigned by the manufacturer to the dealerships within the system 100. A production slot allocates a predetermined product to be built by a manufacture for a specific dealership that is shipped from the manufacturer to the dealership at designated point in time. The inventory management system 101 also may store additional inventory offered for sale by the dealers (e.g., a dealership may offer used products for resale). In addition, the inventory management system 101 also may store products for sale by individual consumers (e.g., sale of a product owned by the individual).

Production slots and inventory may be transferred between dealerships using the automated inventory management system 101. The inventory management system 101 provides a system wide view of available inventory and production slots available for trade at any point in time. As such, it gives dealers with surplus inventory the ability to provide its inventory or productions slots to other dealers who might have better demand or need for a particular type of boat at that moment in time. The inventory management system provides one or more user interfaces offering automated processes that allow dealers to mark inventory and production slots as available for transfer, to search for inventory and production slots available for transfer, and to make offers and/or counter offers for transfer of the available inventory and production slots. As a result, the distribution from the manufacturer to authorized dealers is maintained, while inventory managed by the dealers may be optimized as per agreement between the dealers via the automated transfer of inventory provided by the system. In one example, dealers may make a trade offer or a purchase offer, decline or accept a trade offer, and may make counter offers for inventory and production slots processed by the inventory management system 101. In another example, dealerships may make a virtual transfer of inventory using the inventory management system 101, as explained in further detail below. A virtual transfer allows a dealer to list inventory of another dealer for sale without having to purchase the inventory from the other dealer. In addition, the inventory management system 101 may automatically notify a dealer of a private party product for sale through the inventory management system 101 within the dealer's territory. As such, a dealer may acquire the private party product and add the product to their inventory. This may result in overall better inventory management for the dealer and protect brand integrity for the manufacturer. In addition, the inventory management system 101 may process information about inventory and production slots to provide various metrics, analytics, and reports to users of the inventory management system 101.

The inventory management system 101 also provides one or more interfaces implemented on a user device 130 to present, interact with, and/or manipulate information within the inventory management system 101. An interface can be public (viewable by anyone on the Internet or connection to a network) or private (viewable only by persons who have provided identifiable information and have received a unique identification number or other authorization to access and use the system). As discussed in greater detail below, the inventory management system 101 provides an interface through which a dealership (or a consumer) can obtain information (e.g., a price and a physical location) about products and parts (e.g., a boat or an engine) and initiate a transfer or a sale of products and parts.

The inventory management system 101 includes one or more programmable data processing apparatuses that are able to respond to instructions in a well-defined manner and can execute instructions (such as found in an application, a program, or a software engine). The inventory management system 101 includes electronic and digital components, including hardware needed to implement the instructions and read/access data stored by the inventory management system 101 or accessed by the inventory management system 101 from a remote location. The inventory management system 101 includes a communication mechanism that is able to communicate with other devices through a communication path 135. In one example, the inventory management system 101 includes at least one server running an inventory management module and an inventory management database storing information used by at least the management module to facilitate transfers and sales between dealerships of parts and products certified by a manufacturer, among other things. As a result, in one general aspect, the inventory management system 101 optimizes dealership management of inventory and sales to consumers of authentic manufacturer branded products and parts.

Data and content may be exchanged between the various components of the system 100 using at least one communications interface to send and receive information through the communication paths 135. The communications paths 135 may be configured to send and receive signals (e.g., electrical, acoustic, electromagnetic, or optical) that convey or carry information representing various types of analog and/or digital data including programming, software, information, data, and other content, among others. For example, the communications paths may be implemented using various communications media and one or more networks comprising one or more network devices (e.g., network interface cards, fiber media converters, servers, routers, switches, hubs, bridges, repeaters, gateways, modems, processors, and storage devices). The one or more networks may include a local area network (LAN), a wide area network (WAN), an Ethernet, a global area network (GAN), a cloud network, a plain old telephone service (POTS) network, a digital subscriber line (DSL) network, an integrated services digital network (ISDN), a synchronous optical network (SONNET)/SDH, Passive and Active Optical Networks (PON or AON), a packet switched network, V.92 telephone network modems, IRDA, USB, Firewire, EIA RS-232, EIA-422, EIA-423, RS-449, RS-485, ITU, T1 and other T-carrier links, and E1 and other E-carrier links, varieties of 802.11, GSM Um radio interface, Bluetooth, IEEE 802.11x Wi-Fi, TransferJet, Etherloop, ARINC 818 Avionics Digital Video Bus, G.hn/G.9960, or a combination of two or more of these networks, to name a few examples.

In addition, the communications paths 135 may include one or more wireless links (e.g., microwave, radio, and satellite) that transmit and receive electromagnetic signals, such as, for example, radio frequency, infrared, and microwave signals, to convey information/data signals using any one of a number of communications protocols, for example, communications links may include IMT-2000, such as 2G (GSM, GPRS, EDGE, EDGE Evolution, CSD, HSCSD), 2.5G, 2.75G, 3G (W-CDMA, HSPDA, HSUPA, UMTS-TDD, FOMA), 4G, and IEEE 802.11 standards, such as Wi-Fi or WLAN, and HDTV and SDTV transmissions. In one example, a communications path 135 may include the Internet or World Wide Web or components found therein.

Data and content may be exchanged between the various system components through a communication interface communicating with the communication paths 135 using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose, the Internet Protocol (IP) defines addressing methods and structures for datagram encapsulation. Of course, other protocols also may be used. Examples of an Internet protocol include Internet Protocol Version 4 (IPv4) and Internet Protocol Version 6 (IPv6).

Inventory Management System

Figure 2:
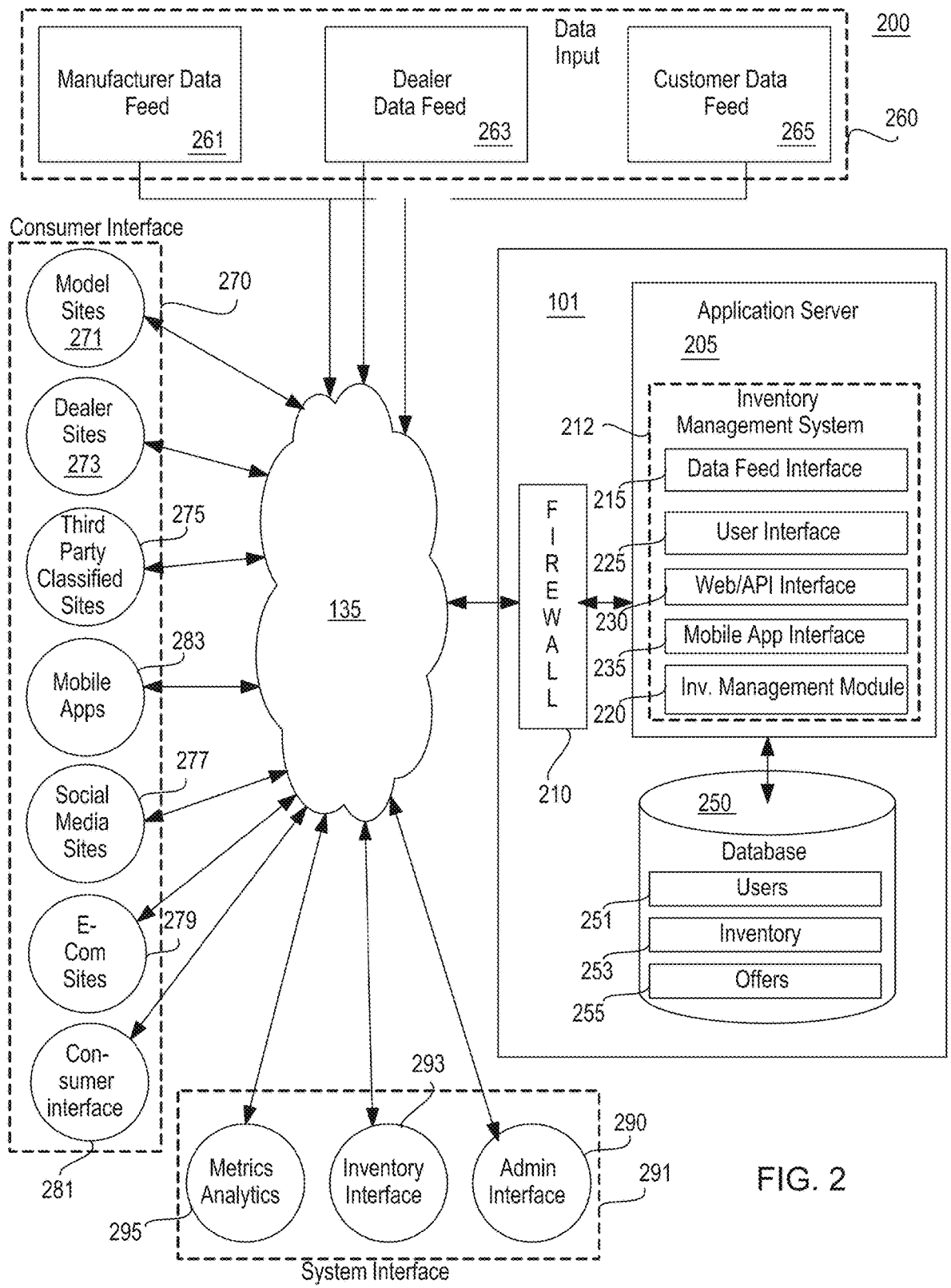
FIG. 2 illustrates an example of various aspects of an inventory management system.

Referring to FIG. 2, one general example 200 of the hardware components and information flow of the inventory management system 101 is shown. The inventory management system 101 includes one or more data processing apparatuses with supporting memory and communications infrastructure/interfaces that are able to communicate with the manufacturer system 110, the dealer systems 115, the content providers 120, and the consumer devices 130 via the communication paths 135.

In one example, the one or more data processing apparatuses may include one or more application servers 205. The one or more application servers 205 may be protected from the exterior networks and communication paths 135 by one or more security devices 210, such as a firewall. The application server 205 includes a combination of hardware and software to provide and implement the inventory management system 101 including various interfaces that communicate via the communication paths 135 and other system components. The application server 205 also can include a combination of memory and input/output devices, as described in further detail below.

Each application server 205 runs one or more applications to implement an inventory management service 212, such as, for example, a data feed interface 215, an inventory transfer module 220, a user interface 225, a web/API interface 230, and a mobile application interface 235. In one example, one or more of these applications may be implemented by one or more additional servers or other data processing apparatuses. Additionally, the application server 205 can be connected to one or more databases 250 that store data representing information used by the inventory management system, such as, for example, user information 251, inventory information 253, and transfer offers information 255, among others (e.g., metadata and reports generated by the inventory management system). The user information 251 may include data about users of the inventory management system 101, such as, for example, administrators, manufacturer, dealerships, and other private parties. Inventory information 253 may include data about manufacturer branded products, parts, and production slots, managed by the inventory management system 101, such as, for example boats and related OEM parts. The transfer offers information 255 may include data the inventory management system 101 uses to monitor and implement transfer of inventory between authorized manufacture dealerships. In one example, the database 250 can be one or more relational databases that store information about both the data and how it is related. For example, the data and relationships may be represented in a flat, two-dimensional table that preserves relational structuring. The inventory management system 101 includes software, for example, the data feed interface 215 and inventory transfer application 220 that manage the relational database and control reading, writing, modifying, and processing the information stored in the database 250.

The inventory management system 101 includes three primary interfaces that implement the inventor management service 212: a data input interface 260, a consumer interface 270, and a system interface 290. The data input interface 260 manages one or more data feeds that provide data about inventory managed by the inventory management system 101. In one example, a manufacturer feed 261, a dealership data feed 263, a customer data feed 265 provide data that is used by the inventory management system to populate fields of the inventory managed by the inventory management system 101, such as new inventory or productions slots received from a manufacturer, used inventory for resale by a dealership, and third party owner's listings of private sales of products.

The inventory management system 101 also includes one or more consumer interfaces allowing potential customers to view, interact with, and/or purchase inventory managed by the inventory management system 101. The consumer interfaces 270 may include one or more of model sites 271, dealer sites 273, third party classified sites 275, social media sites 277, e-commerce sites 279, a customer interface 281, and one or more mobile apps 283.

Figure 11:
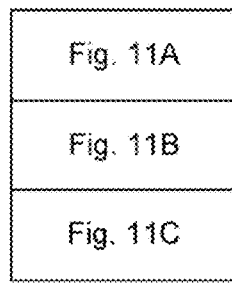
FIG. 11 comprises FIGS. 11A, 11B, and 11C, which show an example of a screen shot of an interface that may be provided by the consumer interface.
Figure 15:
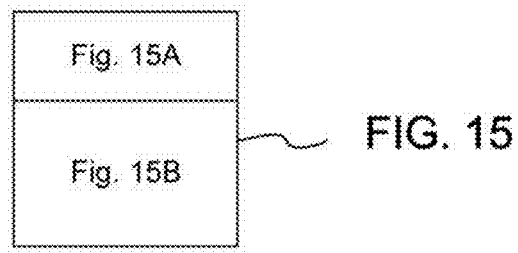
FIG. 15 comprises FIGS. 15A and 15B, which show an example of a screen shot of an interface that may be provided by the consumer interface.
Figure 15A:
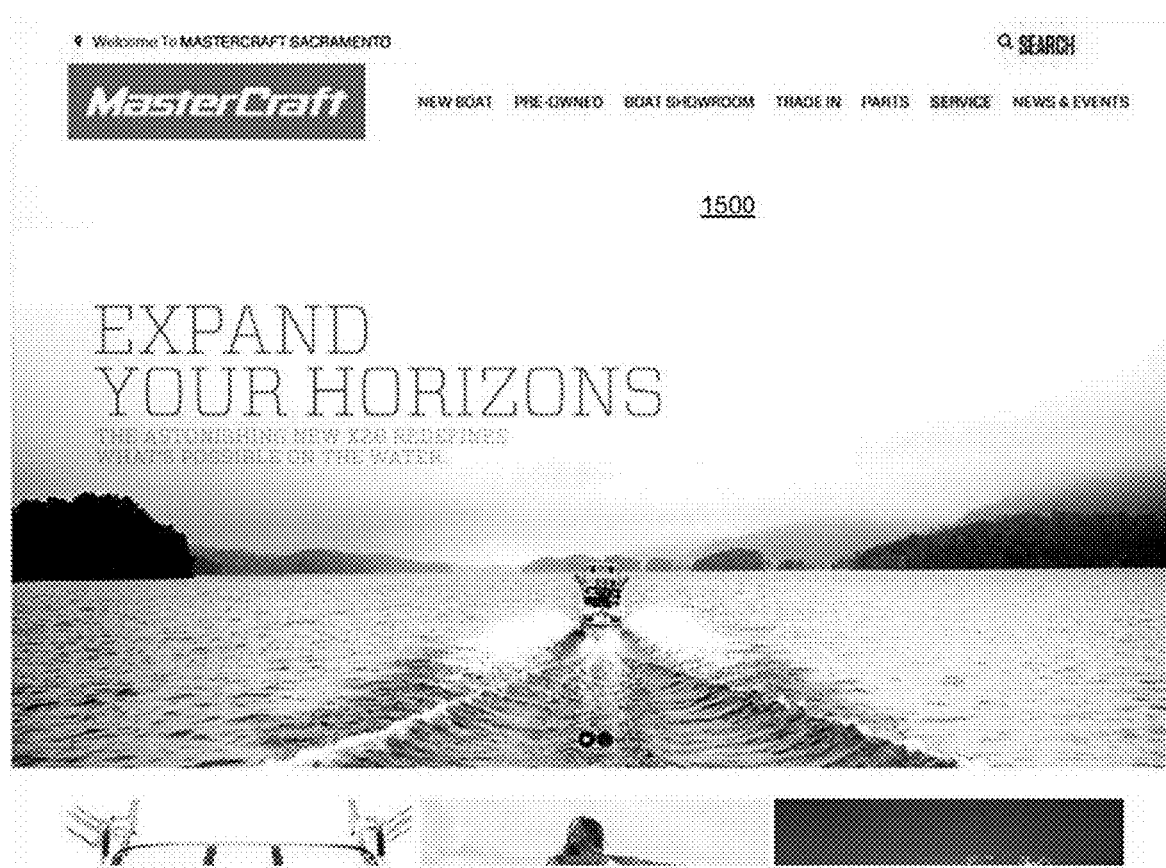
Figure 15B:
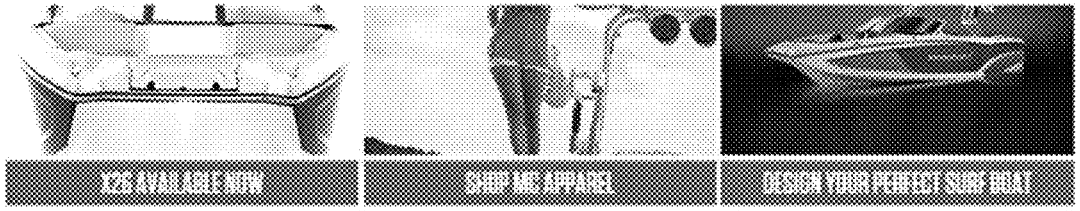

For example, the inventory management system 101 implements or interacts with one or more websites and/or web pages, such as a model site 271 or a dealer site 273. The model site 271 may be a manufacturer branded website and/or web page providing information regarding a particular model or line of product from the manufacture. In addition, the model site 271 can provide information about inventory available for purchase that is administrated by the inventory management system 101. An example of the model site interface is shown in FIG. 15. The dealer website 273 may provide information about a dealership and inventory available for purchase from the dealership. An example of the dealer site interface is shown in FIG. 11. In another example, the inventory management system 101 may host the model site or dealer site using one or more of the system application servers 205. Alternatively, the inventory management service 212 may provide a WEB/API interface that provides data from the relational database about products and inventory available through the inventory management system in a format specified by the sites. In addition, the trader service 212 may respond to queries from the sites regarding information in one or more of the databases 250. In these examples, a browser of a user device 130 may be used to communicate with, access, and present content from the model site 271 and dealer site 273.

The inventory management system 101 also interacts with one or more websites and/or web pages, such as third party classified sites 275 (e.g., Boattrader.com), social media sites 277 (e.g., Facebook), e-commerce sites 279 (e.g., E-bay). The trader service 212 may provide WEB/API interface 230 that provides data from the relational database about products and inventory available through the inventory management system 101 in a format specified by the sites. In addition, the interface may respond to queries from the sites regarding information in one or more of the databases 250 (e.g., search criteria or filtering of inventory for presentation or information about a specific product for sale). In these examples, a browser of a user device 130 may be used to communicate with, access, and present content from the sites 275, 277, and 279.

The inventory management system 101 interacts with one or more mobile apps 283 via a mobile app interface 235 to format data from the relational database about products and inventory available through the inventory management system 101 in a format specified by a particular mobile app.

The inventory management system 101 implements a customer interface 281 to interact with a browser of a user device 130 to communicate with, access, and present content regarding inventory for sale directly from the inventory management system 101.

The inventory management system 101 implements one or more system interfaces 290, such as an administrator interface 291, an inventory interface 293, and a metrics/analysis interface 295 that can be implemented using a browser of a user device 130 to communicate with, access, interact with, and present content from inventory management system 101.

Figures 17, 17D:
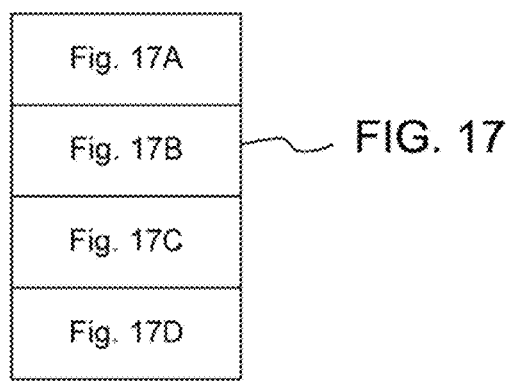
FIG. 17 comprises FIGS. 17A, 17B, 17C, and 17D, which show an example of a screen shot that may be provided by a system admin interface.
Figure 17A:
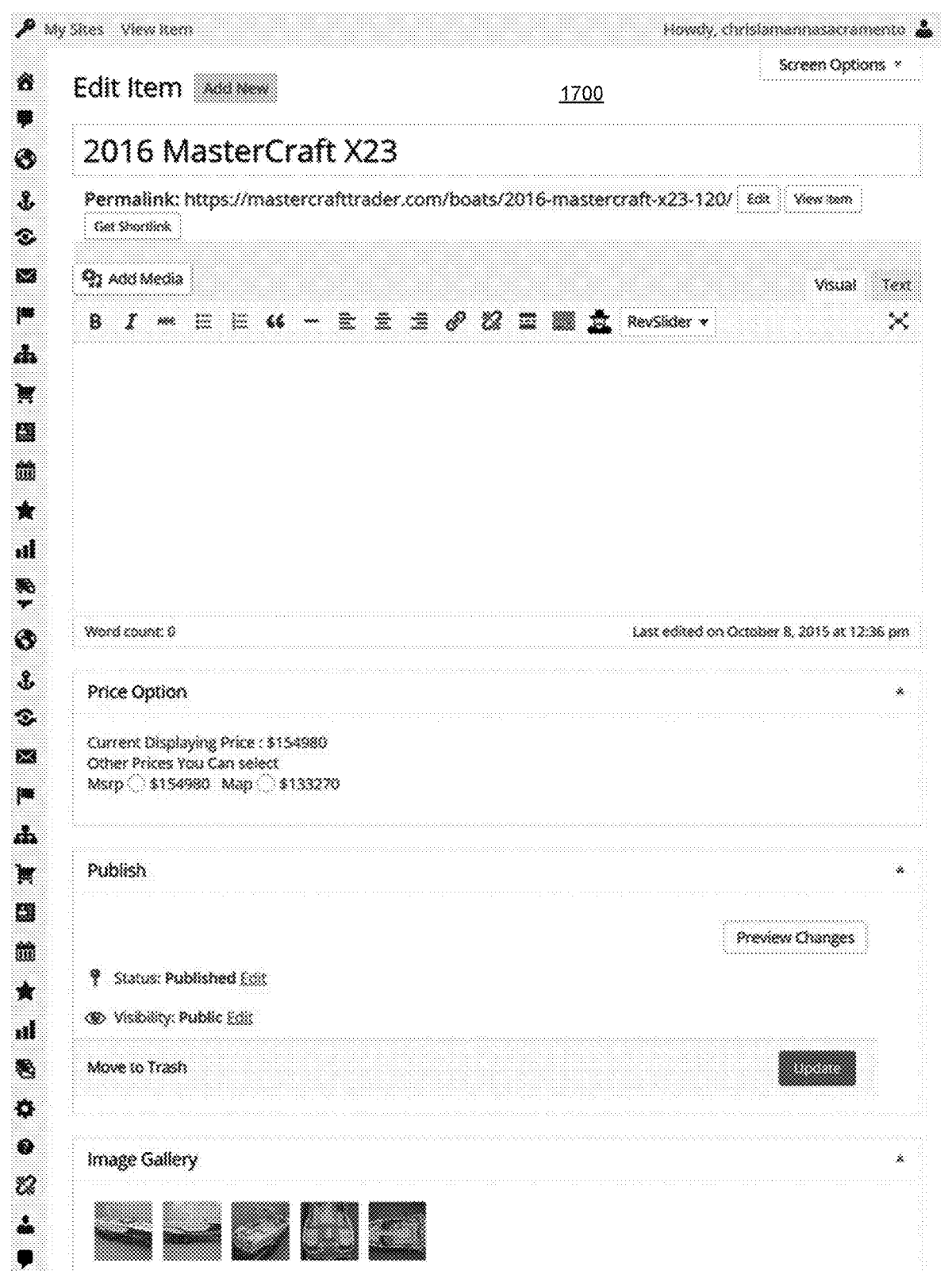

In particular, the system interface 290 includes an administrator interface 291. In one example, the administrator interface 291 may include one or more screens to view, access, edit and interact with inventory within the relational database 250. In another example, this interface may be a backend interface used by inventory management system administrators to access and maintain the inventory management system and application server 205. In another example, the admin interface may be used by manufacturers to access and edit manufacturer inventory and information available through the inventory management system 101. An example of a screen shot of the interface is shown in FIG. 17.

Figure 12:
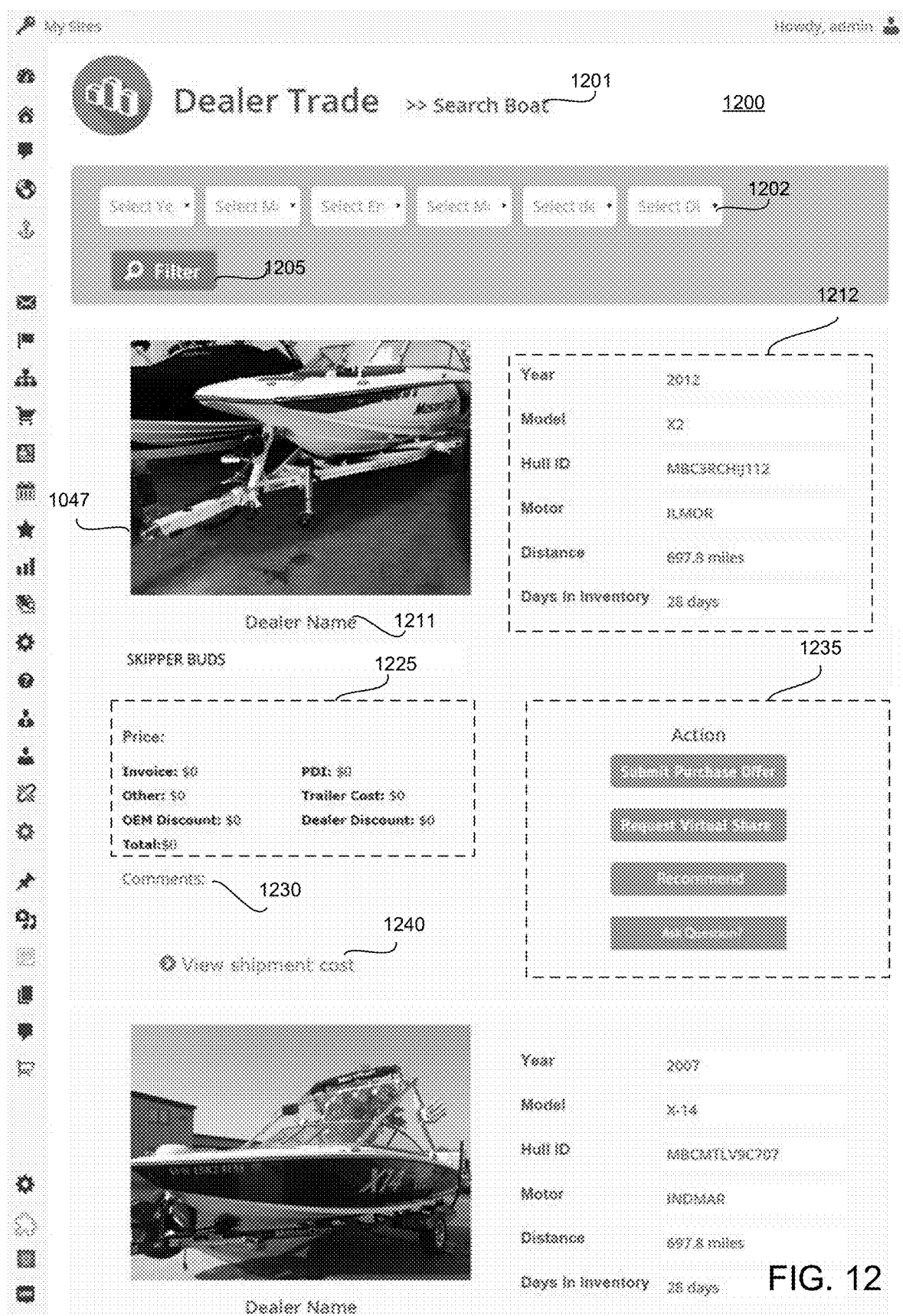
FIG. 12 shows an example of a screen shot that may be provided by a system interface.
Figure 18:
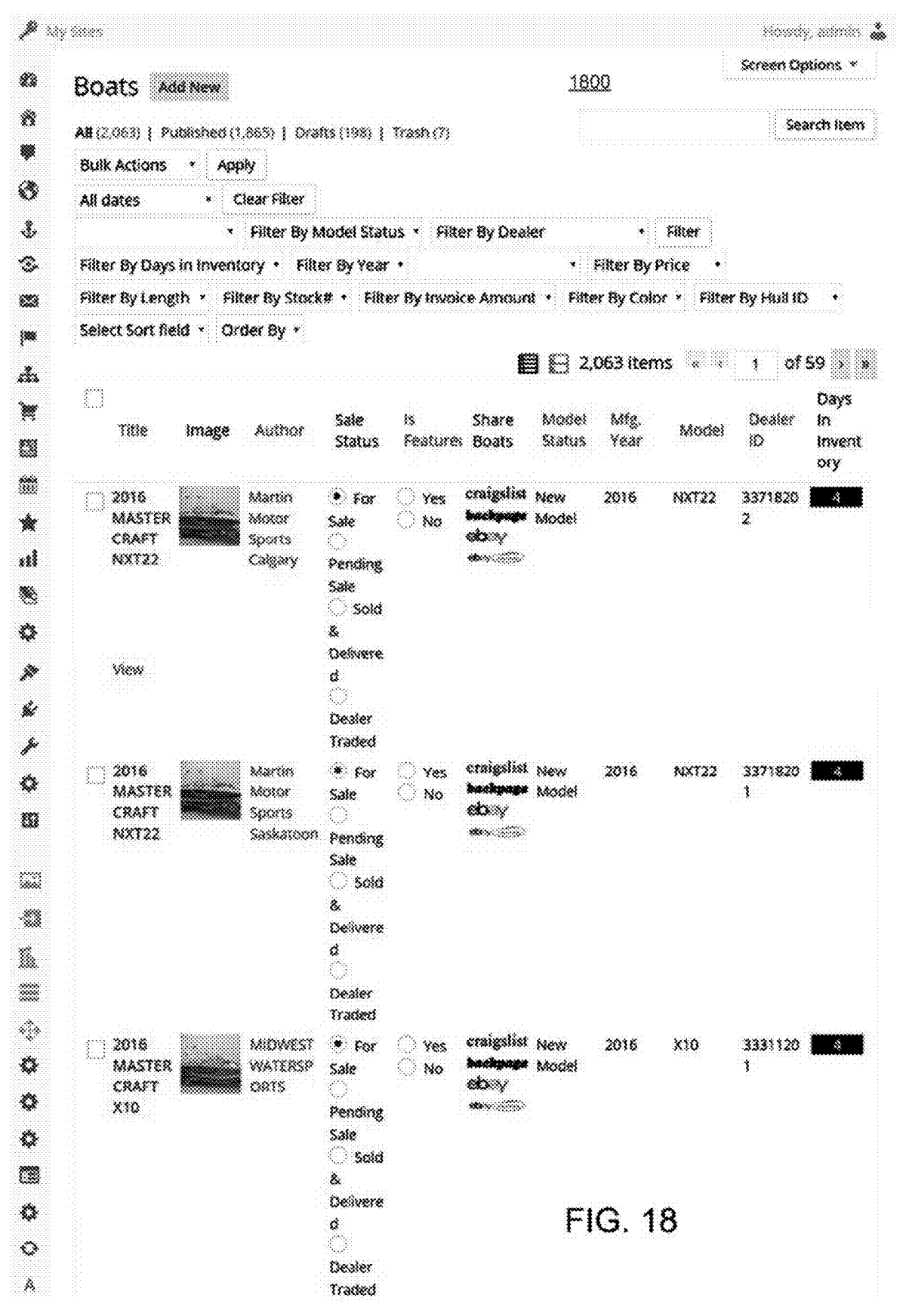

The system interface 290 also may implement an inventory transfer interface 293. In one example, the inventory transfer interface 293 is similar to the administrator interface 291; however, fewer screens and permissions are incorporated allowing the interface restricted access to the inventory. The transfer interface 293 may include one or more screens that allow a user, for example, a dealership to view their inventory and production slots, search for inventory of other dealerships, make transfer offers and counter offers for inventory and production slots, accept transfer offers, and send and receive messages. An example of screen shots of the transfer interface 293 is shown in FIGS. 12, 13, 18.

Figure 14:
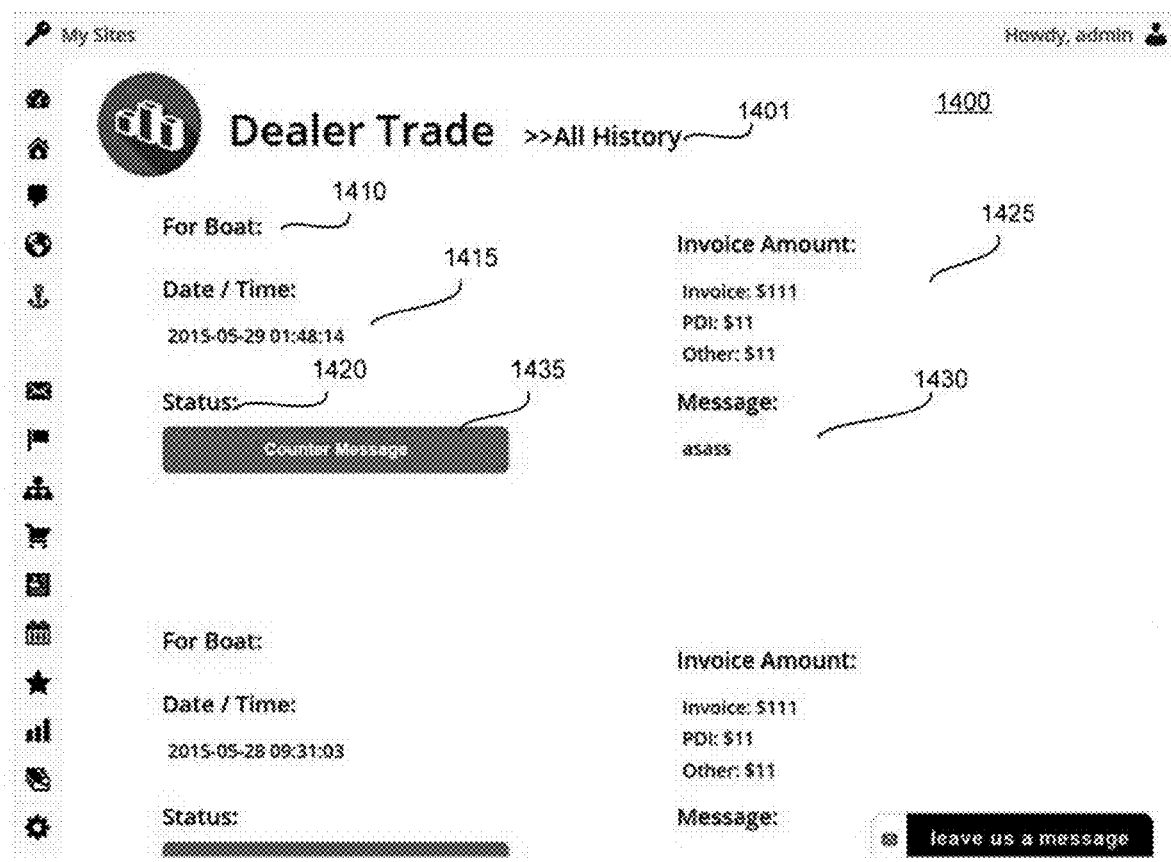
FIG. 14 shows an example of a screen shot that may be provided by a system admin interface, for example, an admin interface showing a trade history report.

The system interface 291 also may implement a metrics and analysis interface 295. The metrics and analysis interface may provide access to the inventory transfer application 220 and database 250 to analyze data and generate one or more reports. The inventory transfer application 220 implemented by the application server 205 accesses the relational database 250 to generate reports regarding the data stored in the database 250 and provide users with insight to the trading processes. The reports may be presented by a browser or other interface provided by a user device 130. In addition, the interface 295 may be incorporated in or provided as part of the admin interface 291 and/or inventory transfer interface 293. An example of a screen shot of the report interface is shown in FIG. 14. Examples of reports include: Inventory Unit Scarcity, Aging Inventory, Inventory Activity, Inventory Ordering Suggestions, Manufacture Production Suggestions, Current Inventory, Sold Inventory, Dealer Trades, Lost Opportunities, Turn Rate, and Website Metrics.

The Inventory Unit Scarcity report may be generated by the inventory management system to illustrate the scarcity of any specified product in a current market. This report allows manufacturers and dealers to make better business decisions regarding production, buying, selling, and trading of inventory based on any particular market.

The Aging Inventory report may be generated by the inventory management system to display how long any given inventory unit has been in-stock.

The Inventory Activity report may be generated by the inventory management system to show information regarding the types of actions that visitors have taken using one or more of the consumer interfaces when viewing a particular inventory unit, such as, for example, a purchase inquiry or a brochure download.

Inventory Ordering Suggestions report may be generated by the system to provide dealers with suggestion regarding the model type, the configuration, the coloring, and the quantity of the units that a dealer should order based on historical and real-time analytics.

The Manufacture Production Suggestions report may be generated by the inventory management system to provide manufacturers with recommendations on production types, timelines, and quantities of units for production.

The Current Inventory report allows dealers & manufactures to view current inventory models, configurations, and quantities within the inventory management system.

The Sold Inventory report may be generated by the inventory management system to display the number, timeline, and configuration of boats in the system that have the sales status of "Sold."

The Dealer Trades report may be generated by the inventory management system to provide information about dealer trade activities. For example, the report can provide: the number of offers received, the number of requests sent, the number of pending trades, and the number of completed trades.

The Lost Opportunities report may be generated by the inventory management system to provide the inventory configuration searches that ended up providing no matches for visitors using the consumer interface.

The Turn Rate report may be generated by the inventory management system to illustrate a ratio showing how many times a dealers/manufacturers inventory is sold and replaced over a period. The days in the period can then be divided by an inventory turnover formula to calculate the days it takes to sell the inventory on hand or "inventory turnover days."

The Website Metrics report may be generated by the inventory management system to display consumer interface metrics, such as: a number of visitors, a time on a site, sources of traffic, a bounce rate, and page views over a period of time.

In one example, manufacturers may have a discount budget line to help authorized dealerships move inventory, such as no current inventory. The discount is given to the dealership on a per inventory unit basis. The dealership uses the discount to market the inventory unit at a very competitive value in order to relieve the burden of paying curtailments on a depreciating asset. Curtailments are essentially loan payments a dealership pays to a flooring company (e.g., a bank) once an inventory unit has been in stock (or aged) for a determined number of days.

Using the inventory management system, a manufacturer and its authorized personal can access the user interface 225 to apply "OEM Discounts" to inventory units managed by the system. For example, when a discount is applied to a unit, the dealer owning the inventory unit receives an automated message from the system notifying the dealer that the dealer may access the system to adjust the retail price and/or wholesale price of the corresponding inventory unit up to the OEM discount. An example of a message is shown in Fig. X. In addition, a manufacturer and its authorized personal can access the user interface 225 to "Verify" a wholesale unit that has been made available for transfer so that dealers interested in acquiring the wholesale unit can do so with confidence of knowing the listed unit and wholesale price are accurate. When a dealer transfer inventory unit is "Verified" an automated message and/or notification is sent to selected dealers. Each authorized personal can use the user interface 225 to access a pre-established discount budget assigned to them by the Manufacturer within the system. The system tracks any discount applied to inventory units for reporting and analysis.

Relational Database

In one example, the database 250 can be implemented in one or more relational databases that store information about both the data and how it is related. The data and relationships may be represented in one or more flat, two-dimensional tables that preserve relational structuring. Each table includes a number of rows and columns. Each row may store a data record representing a data set for a single item, such as a unit of inventory managed by the system (e.g., a boat). Each column in the table may store and attribute or field of the data item (e.g., a HullID, invoice amount, etc.). The inventory management system 101 includes software to implement a standard query language (SQL) that manages the relational database and controls reading, writing, modifying, and processing the information stored in the databases. For example, the inventory transfer application 220 may provide a view or result set derived from any set of records or provide data reports from the database in response to a query.

Figure 3A:
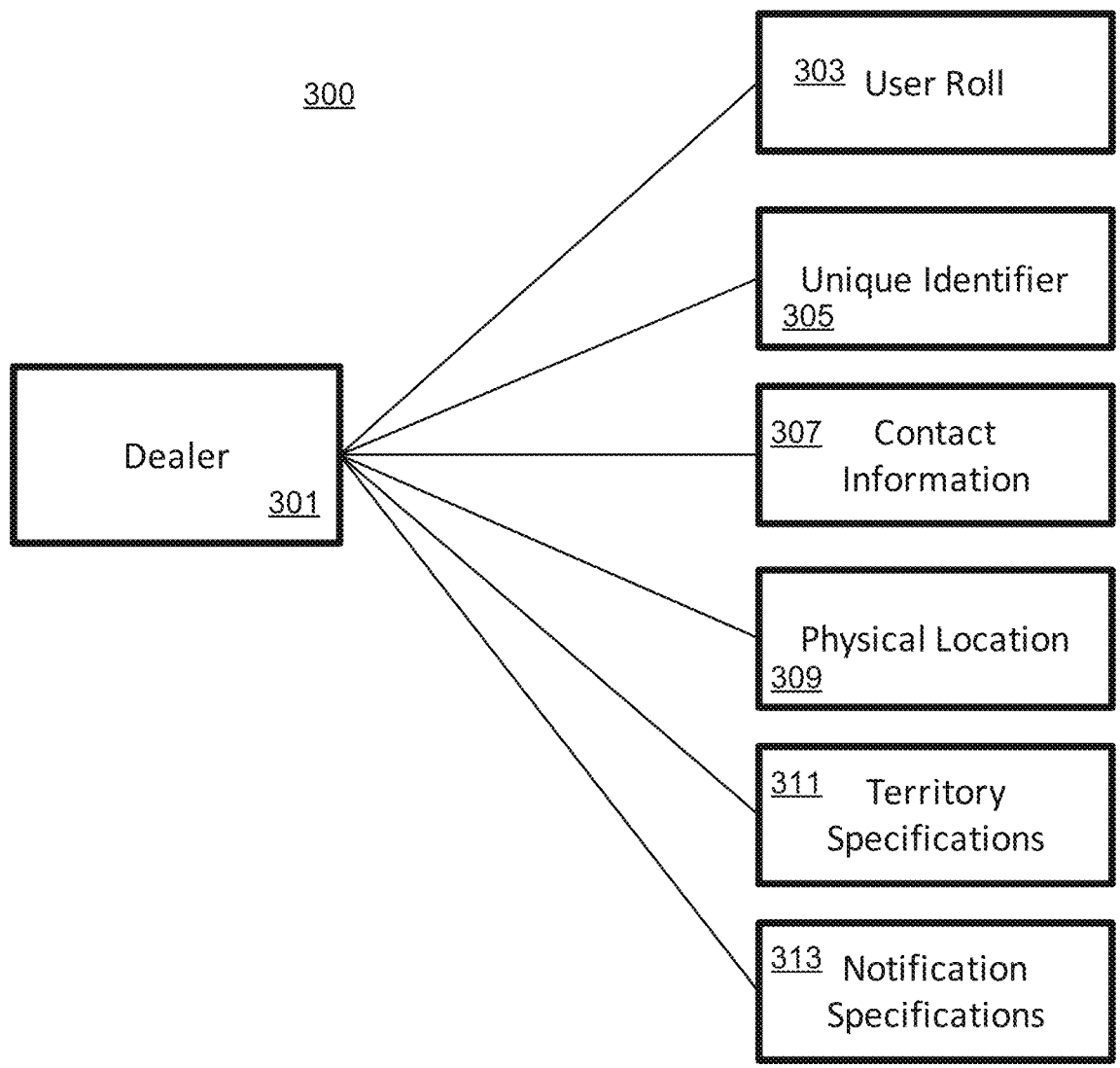
FIGS. 3A, 3B, 3C, and 3D illustrate examples of information used by the inventory management system.

As described above, the system database stores user information 251, inventory information 253, and offer information 255 among others (e.g., metadata and keys relating to stored records in the database). FIG. 3A illustrates an example 300 of the content of a user data record 301 for dealer information 251 stored by the inventory management system. For each dealer record 301, the system may store the following attributes: a user roll 303, a unique identifier 305, contact information 307, a physical location 309, a territory specification 311, and a notification specification 313. Of course, other information may be stored for any specific application. The user roll 303 for a dealer may be "contributor" to indicate permission level of the user. For example, a dealer may make trades and edit fields of inventory, such as whether a product is available for trade and a price, invoice, or wholesale amount. A unique identifier 305 may be used by the inventory management system to identify a dealership within the inventory management system. Contact information 307 may include a company name, an address, a dealer website, an electronic address, and one or more phone numbers, along with other information associated with contacting the dealer. In addition, the record 301 may store a physical location 309 of the dealership. The physical location 309 may be used by the system, for example, to determine shipping costs between dealerships among other things. The record 301 also may store a territory specification 311, for example, an identification of the area negotiated between manufacturer and the dealership which is exclusively serviced by the dealership. The record 301 also may store a notification specification 313 used by the inventory management system to notify a dealer when there is a private party listing of a product that falls within the dealer's territory.

Figure 3B:
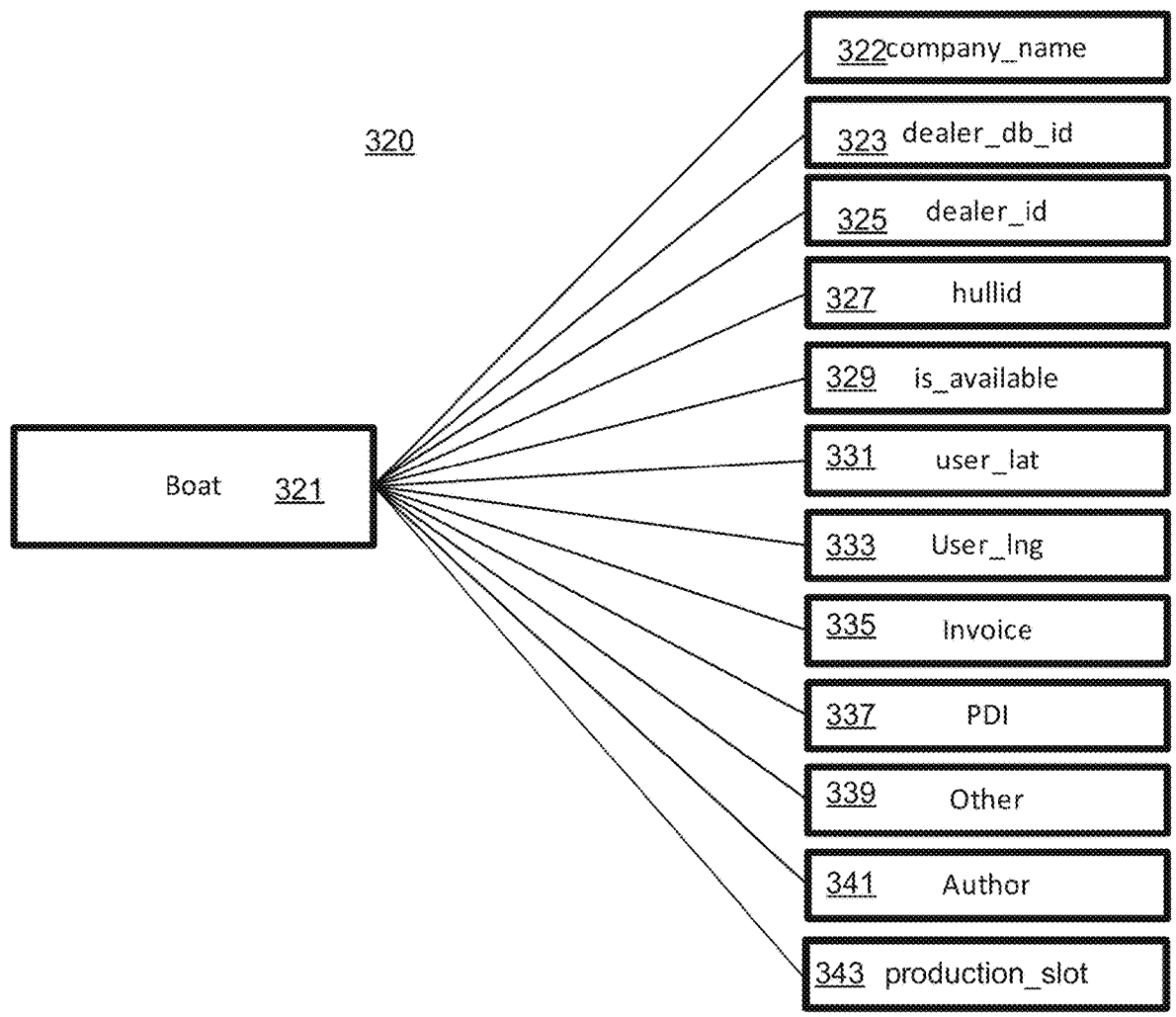

FIG. 3B illustrates an example 320 of the content of an inventory unit or product data record 321 for inventory information 253 stored by the inventory management system. For each product record 321, the inventory management system may store one or more of the following attributes: a company name 322, a dealer database ID 323, a dealer ID 325, a hull ID 327, whether a product is available 329, a user latitude 331, a user longitude 333, an invoice amount 335, a PDI amount 337, other information 339, an author 341, and a production slot ID 343. A company name 322 may be used to store the name a dealership that owns a product, such as a boat. A dealer database ID 323 may store an ID used by the system within the database to identify the dealer that owns the boat. A dealer ID 325 may be stored for an ID assigned to the dealer by the manufacturer. A hull ID 327 may store the official identification number of the boat used in bills of sale and registrations. A field 329 may be used to indicate whether an inventory unit, such as a boat is available for transfer or trading with other dealerships. A user latitude 331 and a user longitude 333 may store the latitude and longitude for the physical location of the inventory unit or boat (e.g., which may be used by the system to determine relationships to a territory, for notification purposes, and to calculate shipping). In other alternatives, a zip code, an address, or other form of physical location identification may be provided instead of or in addition to the latitude and longitude. An invoice amount 335 may be used indicate the price of the inventory unit. A PDI field 337 may store the amount associated with the pre-delivery inspection cost of the boat. The other information field 339 may store other information relating to the inventory unit (e.g., cost and listing of equipment installed by a dealership after delivery from the manufacturer). The author field 341 may store an identification of the user who created the data record. The production slot ID 343 may store an indication of whether the inventory unit or product designates a production slot or whether the product has been manufactured. The ID also may be used to track the product during the manufacturing process.

Other information not shown that also may be stored includes: the state of a dealer who owns the boat, an engine description, and engine mode, a length, a make, a model, a previous owner, a primary color, a sales status, a search radius, a title, a description, one or more images, a featured image, a category, various tags, and a year the boat was manufactured.

Although an example of a unit of inventory or product is given, it will be understood that the inventory records also may be used in a similar manner to store information about OEM parts from the manufacturer.

Figure 3C:
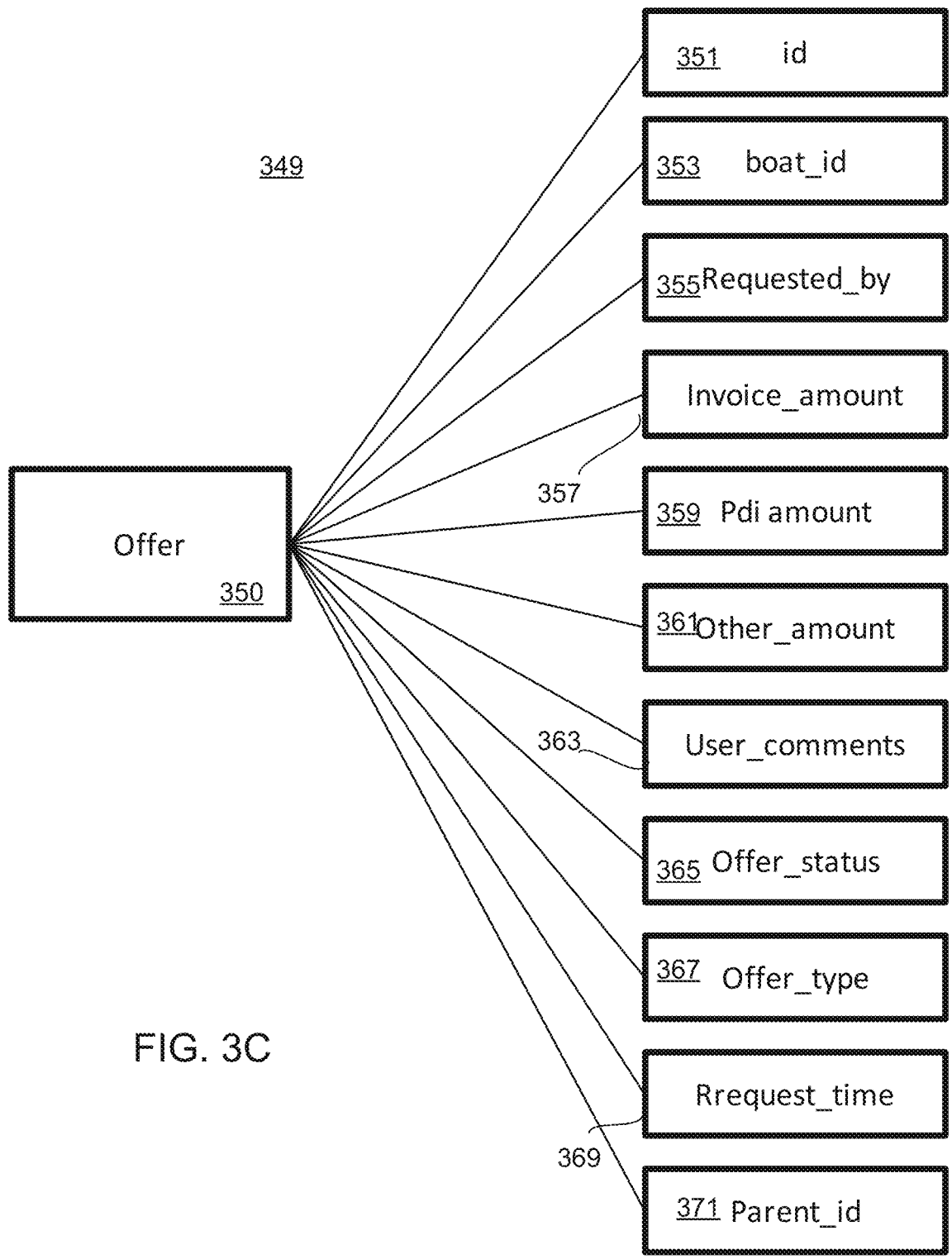

FIG. 3C illustrates an example 349 of the content of a transfer, acquisition, or offer data record 350 for inventory transfer information 255 stored by the inventory management system for an offer to acquire or transfer a unit of inventory from another entity. For each offer record 350, the system may store one or more of the following attributes: an ID 351, an inventory unit or product ID, such as a boat ID 353, a requested by 355, an invoice amount 357, a PDI amount 359, an other amount 361, user comments 363, an offer status 365, an offer type 367, a request time 369, and parent ID 371. An ID field 351 may store an identification of an offer within the system. A boat ID field 353 may store information identifying the inventory unit or product, such as a boat for which the offer is being made. A requested by field 355 may store information identifying the requestor of the acquisition, transfer, or trade. An invoice amount field 357 may store information identifying the amount offered for the trade. A PDI amount field 359 may store the amount associated with the pre-delivery inspection cost of the boat being traded. An other amount field 361 may store another amount associated trade of the boat (e.g., cost of equipment installed by a dealership after delivery from the manufacturer or a manufacturer applied discount or incentive). The user comments field 363 may store user comments regarding the offer communicated between dealers. An offer status 365 may be stored information about the status of a trade, such as pending, accepted, declined, or counter. An offer type field 367 may store the type offer such as trade, counter offer, or virtual trade. A request time field 369 may store a time stamp associated with when the offer was made, which may be used by the system to determine whether an offer is expired or for historical analysis and report generation. A parent ID field 371 may store a parent ID to identify a related offer, for example, an offer for which a counter offer corresponds.

Figure 3D:
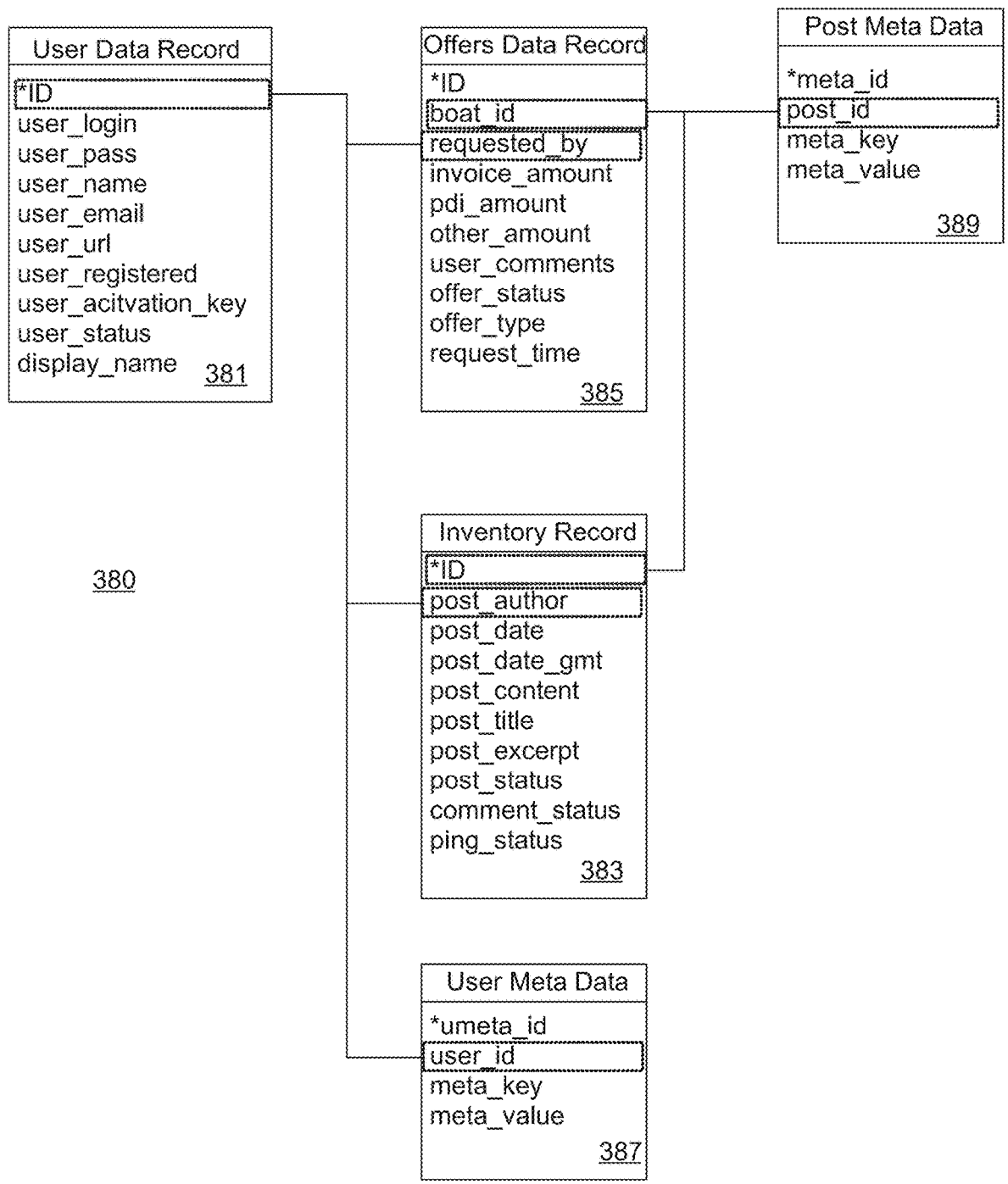

FIG. 3D illustrates one example 380 of the relation between several data elements in a relational database for a user record 381, an inventory record 383, and an offer record 385 with corresponding user metadata 387 and post meta data 389 that may be used in a WordPress implementation of the database 250 of the inventory management system 101.

System Processes

Figure 4:
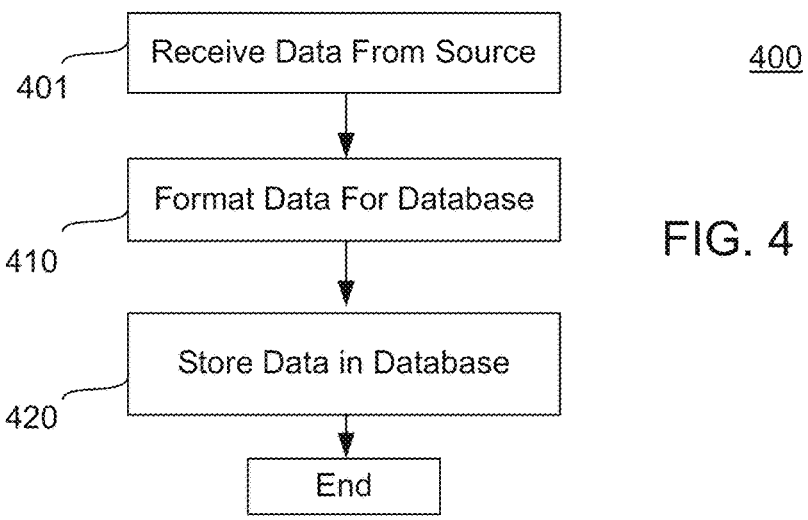
FIG. 4 is a flow chart illustrating an example of a data feed.

FIG. 4 is a flow chart illustrating an example 400 of a data feed. The process may be implemented by the data feed interface 215 and/or as part of the inventory transfer application 220, the user interface 225, the web/API interface 230, and the mobile application interface 235. According to the process, the inventory management system 101 receives data from a source, such as the manufacturer, a dealer, or a private party (401). For example, the inventory management system may receive product and/or part data in a feed 251 from the manufacturer of the product or part. In once example, the inventory management system 101 may periodically execute a script to generate an HTTP request to the manufacturer system 110. The manufacture system 110 responds to the request with data regarding the manufacturer's inventory, which is received by the inventory management system 101. In another example, the information, and related data, received by the inventory management system may relate to used inventory received from a dealer system 115 or input by a dealer using the inventory interface 293. In yet another example, the data may be data received as input by a third party, such as, a boat for sale by a private owner. The information and related data may include inventory information described above with regard to FIG. 3B. The inventory management system 101 then formats data for storage in the relational database (410), and the inventory management system 101 writes the data to a corresponding table or data record in the database (420).

Figure 5:
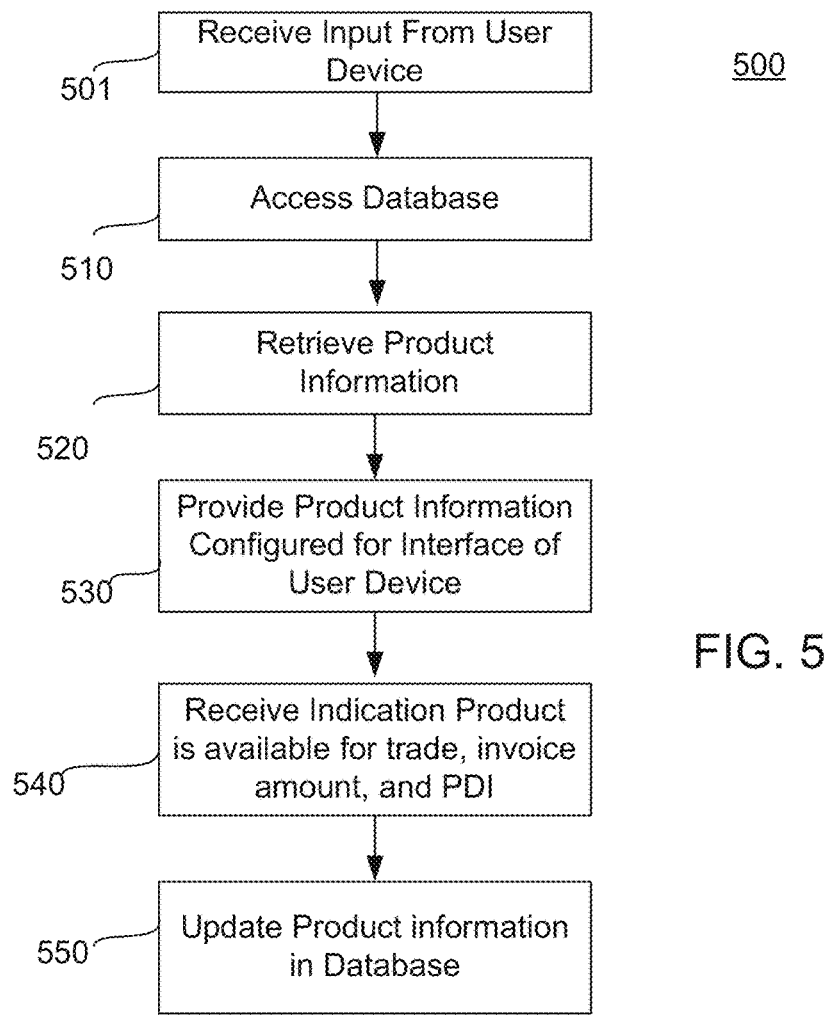
FIG. 5 is a flow chart illustrating an example of an inventory management process.

FIG. 5 is a flow chart illustrating an example 500 of an inventory management process. The management process may be implemented by the inventory transfer application 220 as part of the inventory interface 293.

According to the process, the inventory management system 101 receives input from a user device 130 (501). For example, a user interface (e.g., an admin interface 291 or an inventory interface 293) provided by a user device 130 accessing the inventory management system 101 may display a screen and/or window, for example, of a webpage using a browser or a mobile interface or version of web content of a mobile app running on the user device 130. The interface may provide various options for user selections and/or prompts to input data, such as one or more of a user ID, a password, a URL, and search criteria that is used by the system.

In response, the inventory management system 101 accesses the relational database 250 (510), and retrieves product information (520), and provides the product information configured for presentation by the interface of the user device 130 (530). For example, the inventory transfer application 220 may execute an SQL operation to access one or more tables or records stored in the database 250. The accessed information may be processed by the user interface software 225 or mobile apps software 235 to provide the information in a format that may be rendered by the browser or mobile application of the user device 130 providing the user interface. For example, the user interface may present a webpage configured to show a listing of one or more boats associated with the inventory of a particular dealer (e.g., as shown in FIG. 13). The listing may be filtered by one or more of a category, a model type, number days listed, age of inventory, among others to facilitate manipulation of any returned list. The listing may include an input, such as a toggle, a button, or a tick box, or other input allowing the dealer to indicate that the unit is available for trade. In response to the input, or in an additional input provided by the interface, the dealer may provide additional information regarding the trade, such as a trade price that the dealer is willing to accept, a PDI cost, and an additional amount associated with equipment installed post-delivery from the manufacturer to name a few, and/or comments.

The inventory management system 101 receives the data from the user device 130 including the indication that product is available for trade, an indication of the unit (e.g., a hull ID or record ID) and/or additional information regarding the trade, such, the invoice amount and the PDI cost (540).

In response to receiving the information, the inventory management system 101 updates the product information in relational database 250 to indicate the product is available for trade. (550). For example, the inventory transfer application 220 may execute one or more SQL operations to access a record in the database corresponding to a HULL ID and write an indication in the field is available showing the boat is available for trade. As a result, inventory unit information and availability may be updated in real-time or near real-time to facilitate fast and accurate webpage or other interface generation allowing consumers to see and/or acquire inventory from an entity that services the locality, region, or territory where the consumer is located, regardless of the actual physical location and/or ownership of the inventory unit.

Figure 6:
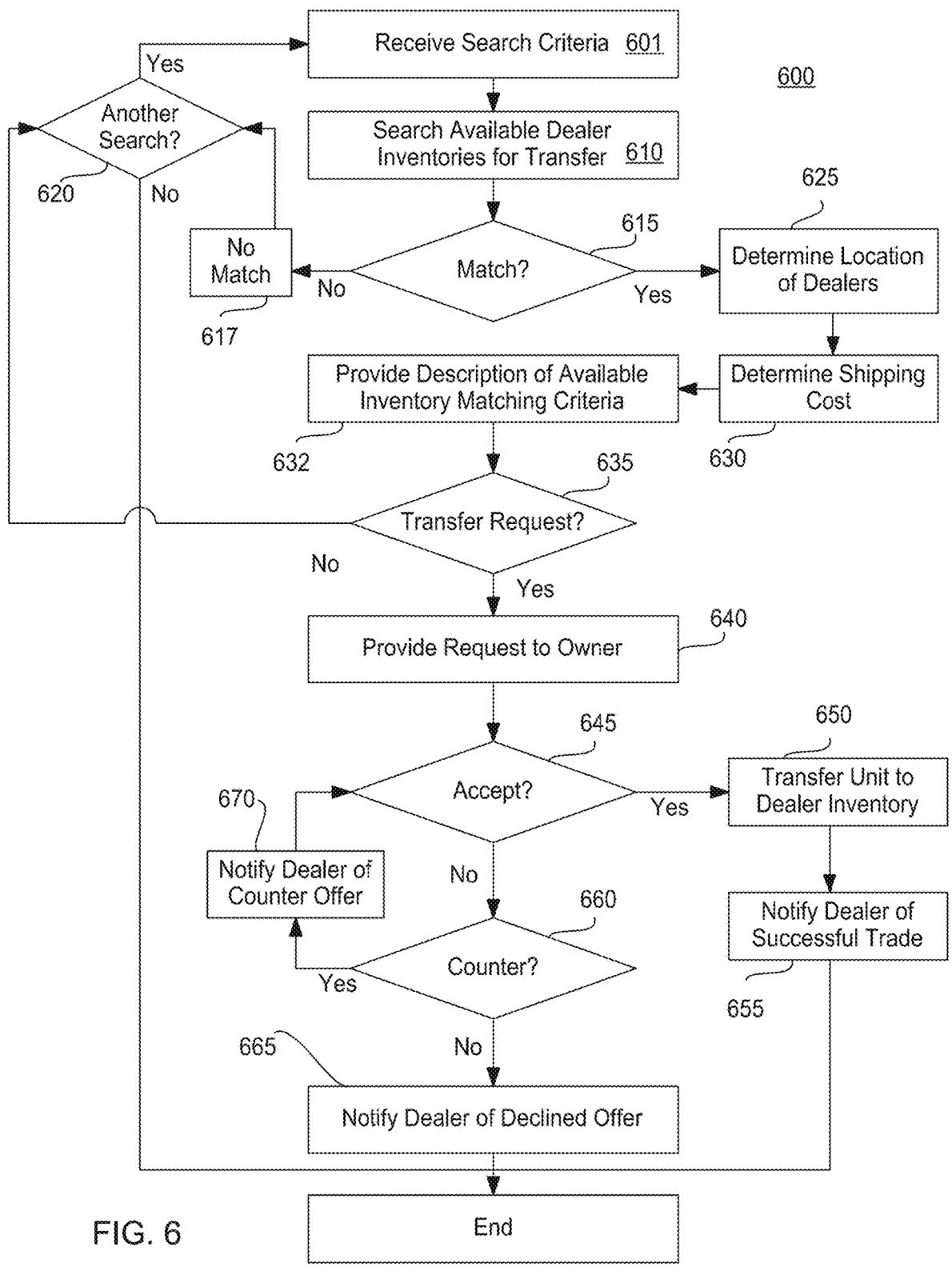
FIG. 6 is a flow chart illustrating an example of a transfer process.

FIG. 6 is a flow chart illustrating an example 600 of an automated computer implemented inventory unit transfer, acquisition or trade process 600. The process 600 may be implemented by a server or data processing apparatus executing the inventory transfer application 220. The inventory management system 101 receives search criteria (601). For example, inventory interface 293 may present an input, such as a window, a drop down menu, a data field, or other input allowing a dealer to specify a search criteria, such as a category, a model type, a location, among others, using a data input device associated with the user device 130 providing the interface 293. In response, a data processing apparatus of the user device 130 formats and transmits the data corresponding to the criteria to the inventory management system 101 where it is processed by server executing the inventory transfer application 220.

The inventory management system 101 searches the available dealer inventory unit records for a trade (610). For example, the inventory transfer application 220 accesses the database 250 to compare fields of the inventory unit data records with the received data corresponding to the received search criteria.

The inventory management system then determines whether one or more fields of the data records match or otherwise fulfill the search criteria (615). The system may search all records of inventory including any production slots available. If no records match, the inventory management system 101 provides information to the inventory interface 293 indicating the search resulted in no match being found (617) and determines whether the trader wishes to make another search (620). For example, the inventory transfer application 220 may send data configured to display the result of the search to the inventory interface 293 of the user device 130. If another search is to be made, the inventory management system 101 receives new search criteria (601) and proceeds from there as described above.

If the inventory management system 101 determines there is a match of one or more data fields in the records of the database 250, for each record that matches the search criteria, the inventory management system 101 determines the physical location of a dealer associated with the record (625). For example, the inventory transfer application 202 may access a location data item stored in the database 250 for the dealer records, such as a geographic location (e.g., an address and/or a zip code) or a map location (e.g., the user_latt and user_lng fields 333, 335 of the product record) to determine a corresponding physical location of the inventory unit or product.

The inventory management system 101 then determines for each matching record a shipping cost from the location of the dealer possessing the inventory to the location of the dealer making the search request (630). For example, the inventory transfer application 220 accesses the location of the dealer requesting the trade from the physical location field 309 of dealer's record in the user database 251 and calculates a distance from the requesting dealer's location to the product's physical location and accesses a look-up table or shipping calculator to automatically determine a corresponding shipping amount to cover transportation of the product to the requesting dealer.

The inventory management system 101 then provides a description of any available inventory matching the search criteria (632). For example, the inventory transfer application 220 may send data configured to show a listing of one or more boats or production slots meeting the search criteria to the inventory interface 293 of the user device 130 rendering a webpage or portion thereof showing the search results. The listing may provide information, such as identifying information about the boat, including the dealer possessing the boat, the location of the dealer, the type of boat, an image of boat, and an invoice amount, a PDI amount, and a shipping cost. A hyperlink, a popup or hover window or other user interface tool, also may be provided to supply a more detailed description about any particular boat in the listing in response to a user input of the user device 130.

The system determines whether the dealer wishes to request a trade (635). For example, the inventory interface 293 may provide an input to provide a trade request to the dealership possessing the boat. The input can include an invoice amount or may simply allow the requesting dealer to accept the amount posted by the dealership. Execution of the input causes the user device to send trade request data to the inventory transfer application 220. If no trade is requested, the interface may provide the option to perform another search (620), as described above. If the system determines the user wishes to make a trade request, the inventory management system provides the request to owner of the corresponding product for which a trade is requested (640). For example, the inventory transfer application 220 creates an offer record 350 for the boat, such as that shown in FIG. 3C. The inventory transfer application 220 also causes an electronic message to be created addressed to the dealer possessing the product with the trade request. For example, the electronic message may be presented in a field, a tab, or a window on an Inventory interface 293 corresponding to the dealership, or an email and/or an short message service (SMS) message created by an communication application (not shown) that receives the information regarding the request may be directed to the an account or an address associated with the dealer stored in a field of the user record 301 stored in the user database 251.

The inventory management system then determines whether the dealer accepts the offer (645). For example, the dealer receiving the request may use a corresponding user device to access and provide the inventory interface 293 to access the inventory transfer application 220 to accept the request in response to the message.

If the offer is accepted, the inventory management system invoices the requesting dealer and transfers the unit to the purchasing dealer's inventory (650). For example, the inventory transfer application 220 may write to the corresponding product record in the database updating the company name, dealer_db_id, dealer ID, is_available field, and user_lat and user_long fields. The inventory transfer application 220 also can generate an invoice and cause an electronic message to be sent to the requesting dealer with the invoice. In another example, the inventory transfer application 220 may provide window or other area in the inventory interface 293 of the requesting dealer to receive payment information that is provided to a third-party merchant services or bank payment process, such as Pay Pal to finalize the transaction. In addition, the accepting dealership may take the necessary steps to beginning the shipping process and title transfer after the invoice has been processed and/or payment received.

In addition, the inventory management system notifies the dealer possessing the product of the successful trade (655). For example, the inventory transfer application 220 can cause create electronic message or notification presented in a field, a tab, or a window on an Inventory interface 293 corresponding to the dealership, or cause an email and/or SMS message to be sent to the dealer possessing the product indicating acceptance of the trade and attaching a copy of the invoice or receipt from the third party merchant services or bank.

If the dealer possessing the product doesn't wish to accept the offer, the inventory management system can determine whether the dealer wishes to supply a counter offer to the requesting dealer (660). If dealer does wish to make a counter offer, the inventory management system notifies the requesting dealer of the declined counter offer (665). For example, the notification may be presented in a field, a tab, or a window on an Inventory interface 293 corresponding to the dealership, or an email and/or an SMS message created by an communication application (not shown) this receives counter offer information regarding the request and directs it to the an account or an address associated with the dealer stored in a field of the user record 301 stored in the user database 251.

If the dealer possessing the product wishes to make a counter offer, the inventory management system notifies the requesting dealer of the counter offer (670) and then determines whether the requesting dealer wishes to accept the counter offer (645) repeating the processes as necessary for any acceptance of further counter offers (e.g., 650, 655, 660, 665 and 670 645, etc.).

In one additional example, if the dealer owning the product does not respond to the request within a predetermined amount of time, the offer can be automatically rescinded by the system and the requesting dealer notified (665). In addition, a provision can be made for through the trader interface to rescind an offer after it has been made prior to the offer being accepted (not shown).

Figure 7:
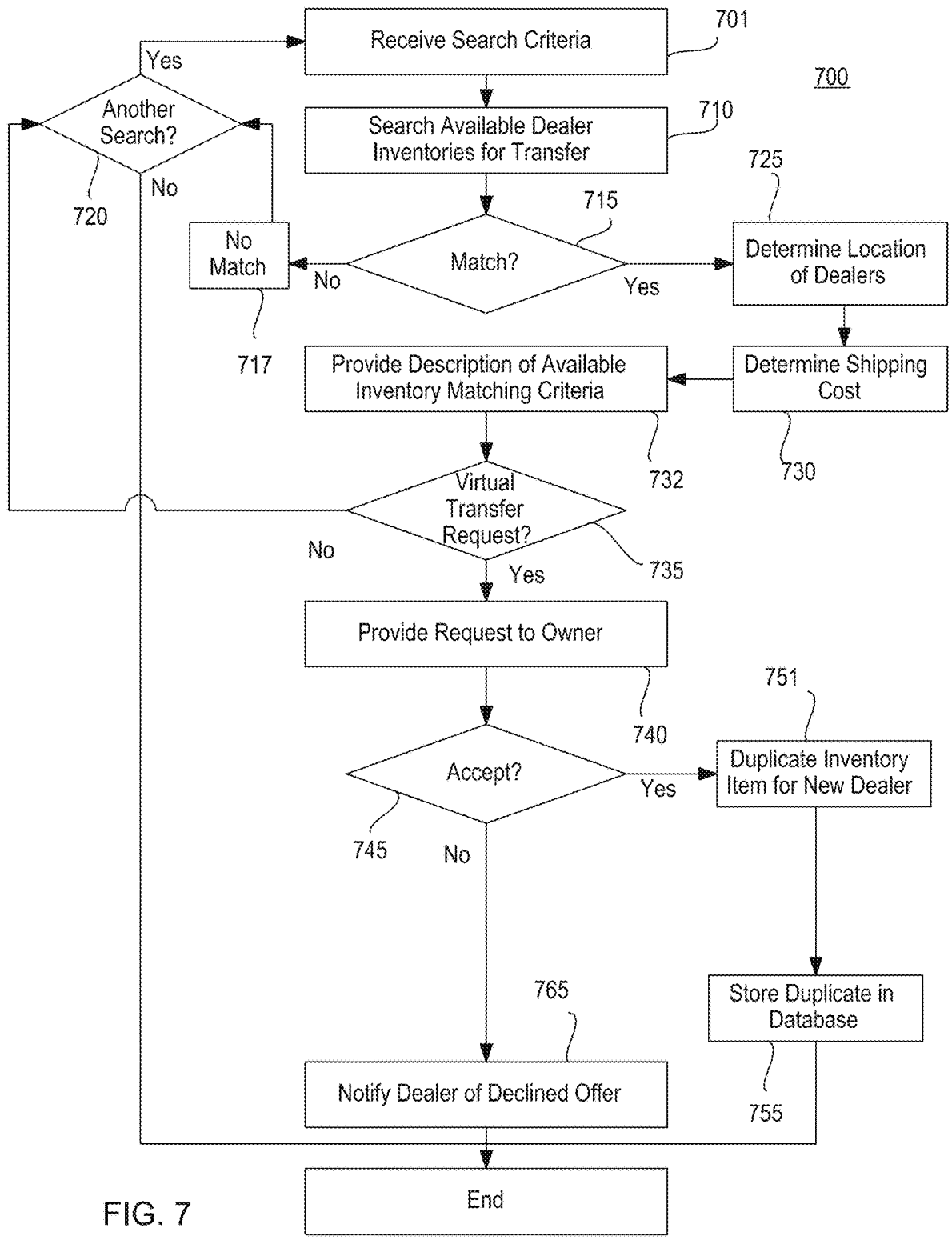
FIG. 7 is a flow chart illustrating an example of a virtual transfer process.

FIG. 7 is a flow chart illustrating an example 700 of a virtual inventory unit transfer process. The process 700 may be implemented by the inventory transfer application 220. The inventory management system 101 receives search criteria (701). For example, inventory interface 293 may present an input, such as a window, a drop down menu, a data field, or other input allowing a dealer to specify a search criteria, such as a category, a model type, a location, among others, using a data input device associated with the user device 130 providing the interface 293. In response, a data processing apparatus of the user device 130 formats and transmits the data corresponding to the criteria to the inventory management system 101 where it is received by the inventory transfer application 220.

The inventory management system 101 searches the available dealer inventory records for a transfer, acquisition, or trade (710). For example, the inventory transfer application 220 accesses the database 250 to compare fields of the data records with the data corresponding to the received search criteria.

The inventory management system then determines whether any of fields of the data records match the search criteria (715). If no records match, the inventory management system 101 provides information to the inventory interface 293 indicating the search resulted in no match being found (717) and determines whether the dealer wishes to make another search (720). For example, the inventory transfer application 220 may send data configured to display the result of the search to the inventory interface 293 of the user device 130. If another search is to be made, the inventory management system 101 receives new search criteria (701) and proceeds as described above.

If the inventory management system 101 determines there is a match of one or more data fields in the records of the database 250, for each record that matches the search criteria, the inventory management system 101 determines the location of dealer associated with the record (725). For example, the inventory transfer application 202 may access a location data item stored in the database 250 for the dealer records, such as a geographic location (e.g., an address and/or a zip code) or a map location (e.g., the user_latt and user_lng fields 333, 335 of the product record) to determine a corresponding physical location of the inventory unit or product.

The inventory management system 101 then determines for each matching record a shipping cost from the location of the dealer possessing the inventory to the location of the dealer requesting the search (730). For example, the inventory transfer application 220 accesses the dealer's location requesting the trade from the physical location field 309 of dealer's record in the user database 251 and calculates a distance from the location of the requesting dealer to the location of the product location and accesses a look-up table or shipping calculator to automatically determine a corresponding shipping amount to cover transportation of the product to the requesting dealer.

The inventory management system 101 then provides a description of any available inventory matching the search criteria (732). For example, the inventory transfer application 220 may send data configured to show a listing of one or more boats meeting the search criteria to the inventory interface 293 of the user device 130 rendering a webpage or portion thereof showing the search results. The listing may provide information, such as identifying information about the boat, including the dealer possessing the boat, the location of the dealer, the type of boat, an image of boat, and an invoice amount, a PDI amount, and a shipping cost. A hyperlink, a popup or hover window, or other user interface tool, also may be provided to supply a more detailed description about any particular boat in the listing in response to a user input of the user device 130.

The system then determines whether the dealer wishes to request a virtual transfer or trade of a unit of inventory (735). For example, the inventory interface 293 may provide an input to provide a virtual trade request to the dealership possessing the boat. Execution of the input causes the user device to send trade request data to the inventory transfer application 220. If no trade is requested, the interface may provide the option to perform another search (720), as described above. If the system determines the user wishes to make a virtual trade request, the inventory management system provides the virtual trade request to the owner of the corresponding product for which the virtual trade is requested (740). For example, the inventory transfer application 220 creates an offer record 350 for the boat, such as that shown in FIG. 3C. The inventory transfer application 220 also causes an electronic message to be created addressed to the dealer possessing the product with the virtual trade request. For example, the electronic message may be presented in a field, a tab, or a window on an Inventory interface 293 corresponding to the dealership, or an email and/or an SMS message created by an communication application (not shown) that receives the information regarding the request may be directed to the an account or an address associated with the dealer stored in a field of the user record 301 stored in the user database 251.

The inventory management system determines whether the dealer accepts the virtual trade request offer (745). For example, the dealer receiving the request may use a corresponding user device 130 to provide an inventory interface 293 to access the inventory transfer application 220 to accept the request.

If the offer is accepted, the inventory management system creates a duplicate virtual inventory record for the item in the database (751) allowing searches for inventory by consumers to treat the inventory item, for example, a boat, as being in the requesting dealer's the inventory for purposes of providing listing information to any of the consumer interfaces.

In addition, the inventory management system notifies the dealer possessing the product of the successful virtual trade (755). For example, the inventory transfer application 220 can cause create electronic message or notification presented in a field, a tab, or a window on an Inventory interface 293 corresponding to the dealership, or cause an email and/or SMS message to be sent to the dealer possessing the product indicating acceptance of the virtual trade.

If the dealer possessing the product doesn't wish to accept the virtual trade offer or a predetermined amount of time passes without response for the dealer, the inventory management system notifies the requesting dealer of the declined virtual trade offer (765). In addition, a provision can be made for through the trader interface to rescind an offer after it has been (not shown).

Figure 8:
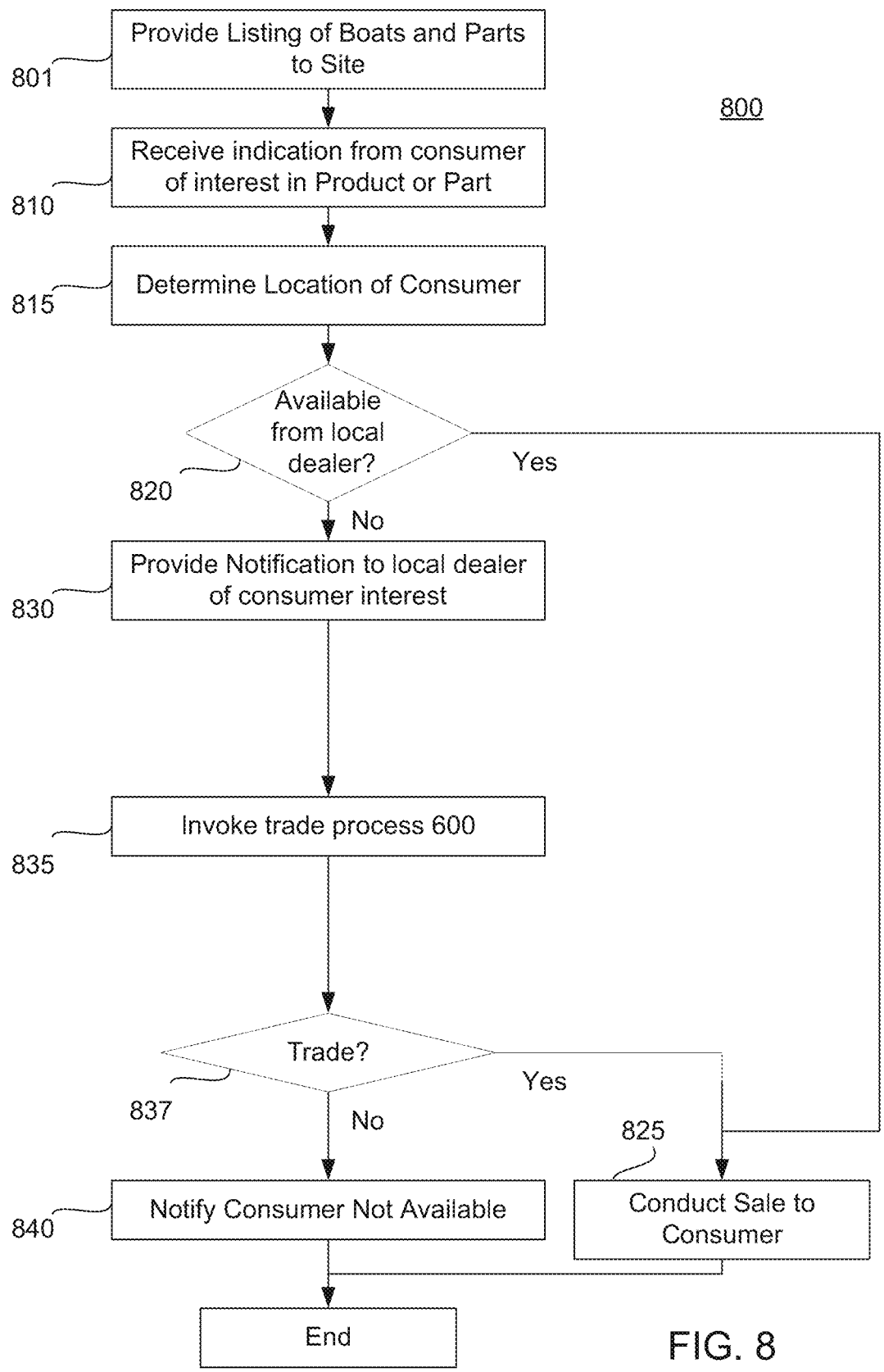
FIG. 8 is a flow chart illustrating an example of private party sale process.

FIG. 8 is a flow chart illustrating an example 800 of private party transaction process.

The inventory management system provides a listing of inventory available for purchase by consumers, such as boats and parts via one of the consumer interfaces (801). For example, the user interface 215, web/API interface 230, or mobile app interface in conjunction with the inventory transfer application 220 may provide information to be presented in a web browser or mobile app of a user device of a potential customer.

The inventory management system receives an indication from the consumer of interest in product or part (810). For example, the system may determine a consumer is interested in a particular boat from search criteria. The inventory management system determines the physical location of consumer (815). For example, the system may be provided with metadata, an IP address, cookie and/or GPS information from the user device 130, or a user profile of by the third party being accessed by the consumer interface 270 from which a user's location or a location of a device associated with the user may be determined. Alternatively, the consumer may input the location data (e.g., an address or zip code) using an input of the user device, which is then received by the inventory management system.

The inventory management system uses the location information to determine whether the product, for example, a boat, is available from local dealer (820). If the boat is available from the local dealer, the information is provided to the consumer and the inventory management system may conduct sale to the consumer using an automated payment system, such as merchant services or online bank, such as a Pay-Pal account (825).

If the product is not available from the local dealer, the inventory management system may provide notification to the local dealer of consumer interest in the product (830). In response to the interest, the dealer may invoke the trade process 600 (835) to determine if a trade with another dealer for the product can be made (837). If a trade cannot be arranged with another dealer, the inventory management system notifies the consumer that the desired product is not available at this time (840).

If a trade can be arranged, the information is provided to the consumer and the inventory management system may conduct sale to consumer using an automated payment system, such as merchant services or online bank, such as a Pay-Pal account or payment may otherwise be directly arranged with the dealer (825).

The system also provides a dealer centric search feature that optimizes inventory management by attempting minimize out of territory selling. For example, when a consumer does a search for a unit of inventory, the search algorithm identifies the dealer(s) who own that territory and displays the contact information of that dealer regardless of the actual boat owner. If a consumer wishes to purchase the item an automated process allows the dealers to transact to transfer the inventory to complete the sale. FIGS. 9A, 9B, 9C, and 9D detail various processes that implement this feature.

Figure 9A:
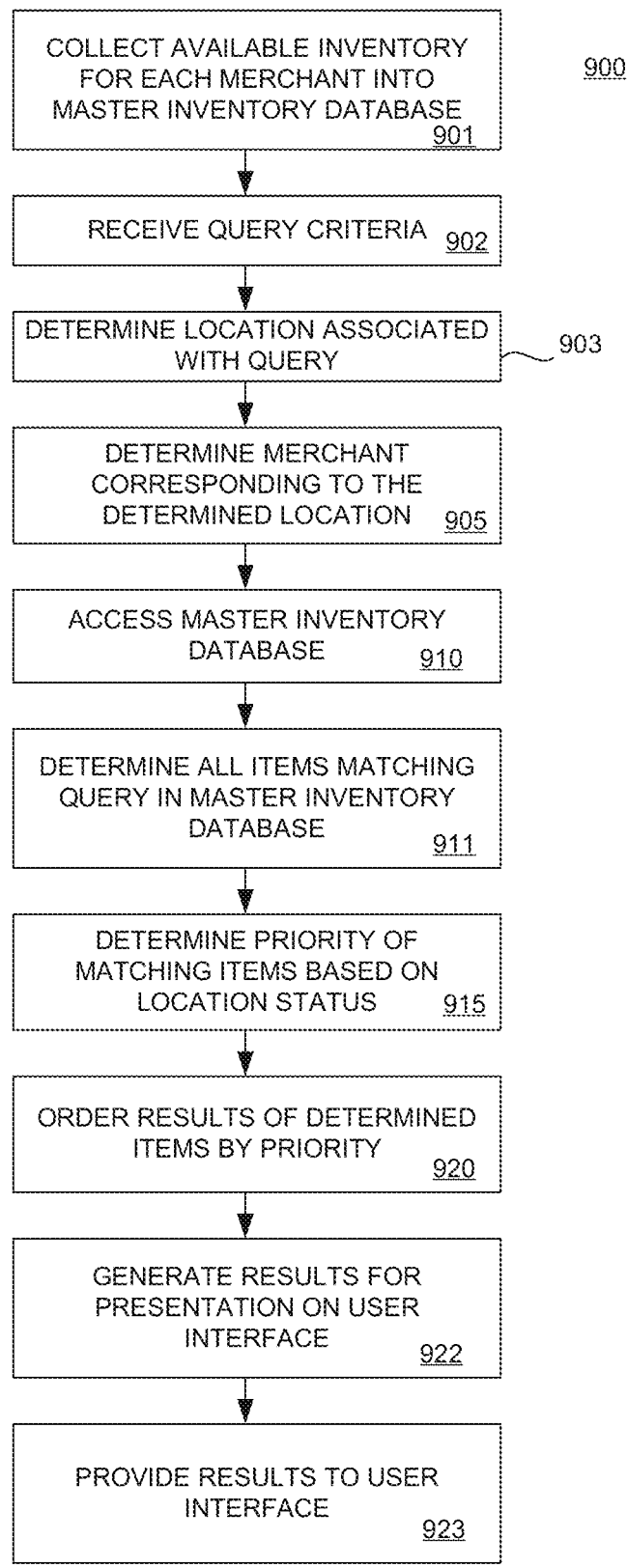
FIG. 9A is a flow chart illustrating an example of an inventory search process.

FIG. 9A shows an example of a flow chart implementing a dealer centric search process.

Available Inventory is collected for each merchant into master inventory database (901). For example, the automated inventory management system may create a database from various data feeds, such as the manufacture data feeds 261, dealer data feeds, 263 and customer data feeds 265, and through entries from the user interface using processes such as 400 and 500 shown in FIGS. 4 and 5.

The automated system receives a search query (902). For example, a search query is data that a user submits to a search engine to find information to satisfy the user's informational needs or criteria. The search queries are usually in the form of text, e.g., one or more query terms or other criteria selected by a user (e.g., items or filters selected from one or more provided inputs or menus). For example, the automated system provides various public and private interfaces to facilitate a user search. As part of the public interface, the system can provide fields and/or menus to input information to help identify inventory items, such as products and parts, stored by the database. For example, criteria may include one or more of: a manufacturer, a price, a model, a year, a make, an engine, a motor, a length, a color, and a stock number, among others. Selection and/or input of the criteria via the interface is then processed by a user device and sent to the automated system as a search query.

Figure 21:
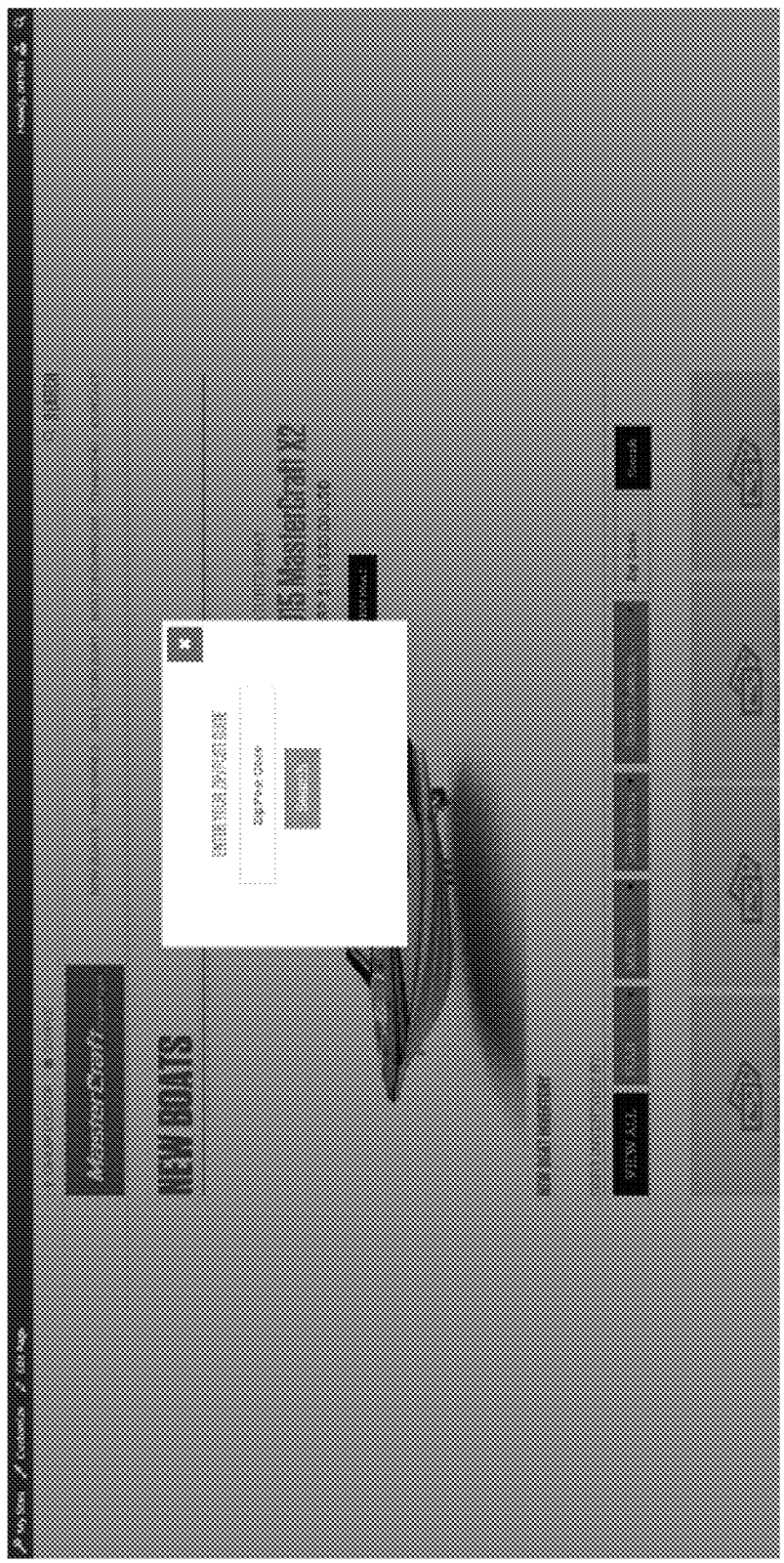
FIGS. 21, 22, 23, 24, and 25 show examples of screen shots that may be provided by a consumer interface implemented the processes shown in FIGS. 9A-9D.

The system determines a first physical location associated with search query (903). For example, the system may be provided with metadata, an IP address, cookie or GPS information from the user device 130, or a user profile of by the third party being accessed by the consumer interface 270 from which a user's location or a location of a device associated with the user may be determined as the first physical location. Alternatively, the consumer may input location data (e.g., an address or zip code) using an input of the user device, which is then received by the inventory management system and used as the first physical location. FIG. 21 shows an example of a popup window of a consumer interface allowing entry of a zip or postcode to input a location. The data used by the system to determine the physical location may be provided with the query or requested by the system (e.g., from the user interface, the user device, or a database storing a location indicated as being associated with the user or a user ID).

The system determines a second physical location (905), such as, for example, a merchant having a relation to the first physical location (905). For example, the system accesses the dealer physical location information stored in the database, such a territory or postcodes serviced by a dealer to determine a match with the first physical location received or otherwise obtained by the system in conjunction with the search query. Alternatively, if the first physical location is not specifically serviced or assigned to a dealer, the closest dealer to the determined first physical location may be selected by the system.

The system accesses the master inventory database (910), such as database 250, and search the database to determine all data records corresponding to items or merchandise matching the search query that are stored in the master inventory database (911). For example, the system may submit an SQL query to determine records stored in the database that match the criteria received from the consumer interface. In other examples, a search engine or information retrieval processes that identify resource relating to a search query. For example, an information retrieval process uses queries, (e.g., formal statements of information needs), such as search strings in web search engines. In information retrieval, a query may uniquely identify a single object in the collection, and instead, several objects may match the query, perhaps with different degrees of relevancy.

An object or resource is an entity that is represented by information in a content collection or database. User queries are matched against the database information. However, as opposed to classical SQL queries of a database, in information retrieval the results returned may or may not match the query, so results are typically ranked. This ranking of results is a key difference of information retrieval searching compared to database searching.

Depending on the application the data objects or resources may be, for example, text documents, images, audio, mind maps, or videos. Often the documents themselves are not kept or stored directly in the information retrieval system, but are instead represented in the system by document surrogates or metadata.

The system determines a priority of for the results returned in response to the search query based on a location and/or status stored in association with the records (915). For example, inventor in a local dealer's inventory that matches the query may be given priority over another dealer's inventor matching the query. One example of a processes for determining priority is shown in FIG. 9B.

The system orders the results of the query of determined merchandise by the determined priority for the inventory item (920). For example, if the query determines multiple items match the query the order in which the results are presented in the consumer interface may be based on the priority where results having a higher priority are presented before other results. In addition, if there are multiple items with the same priority, then the results have the same priority may be ordered using other criteria. For example, distance from the physical location of the item to the first physical location (e.g., the location of the user) may be used. FIG. 9C shows some examples of ordering.

Figure 22:
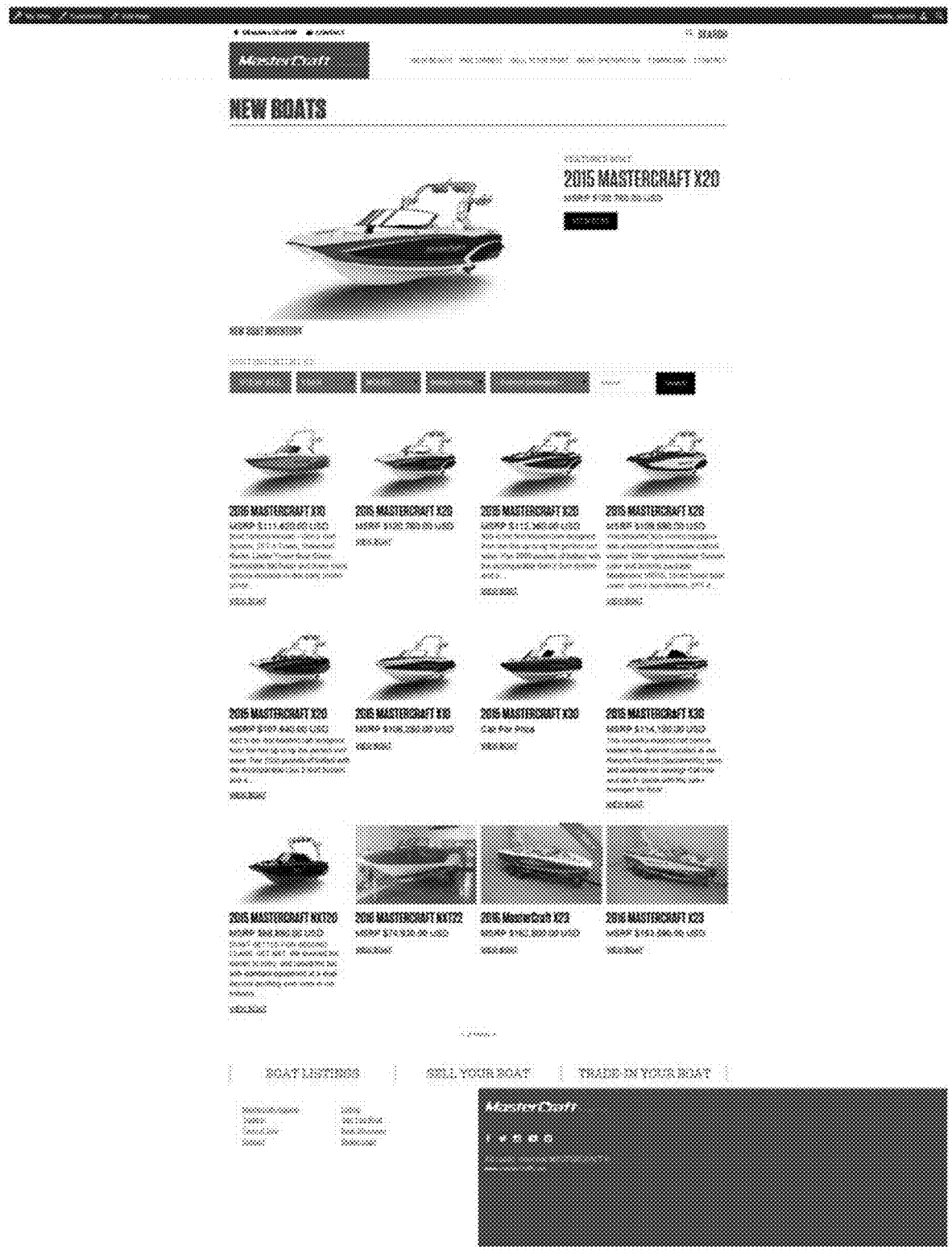
Figure 23:
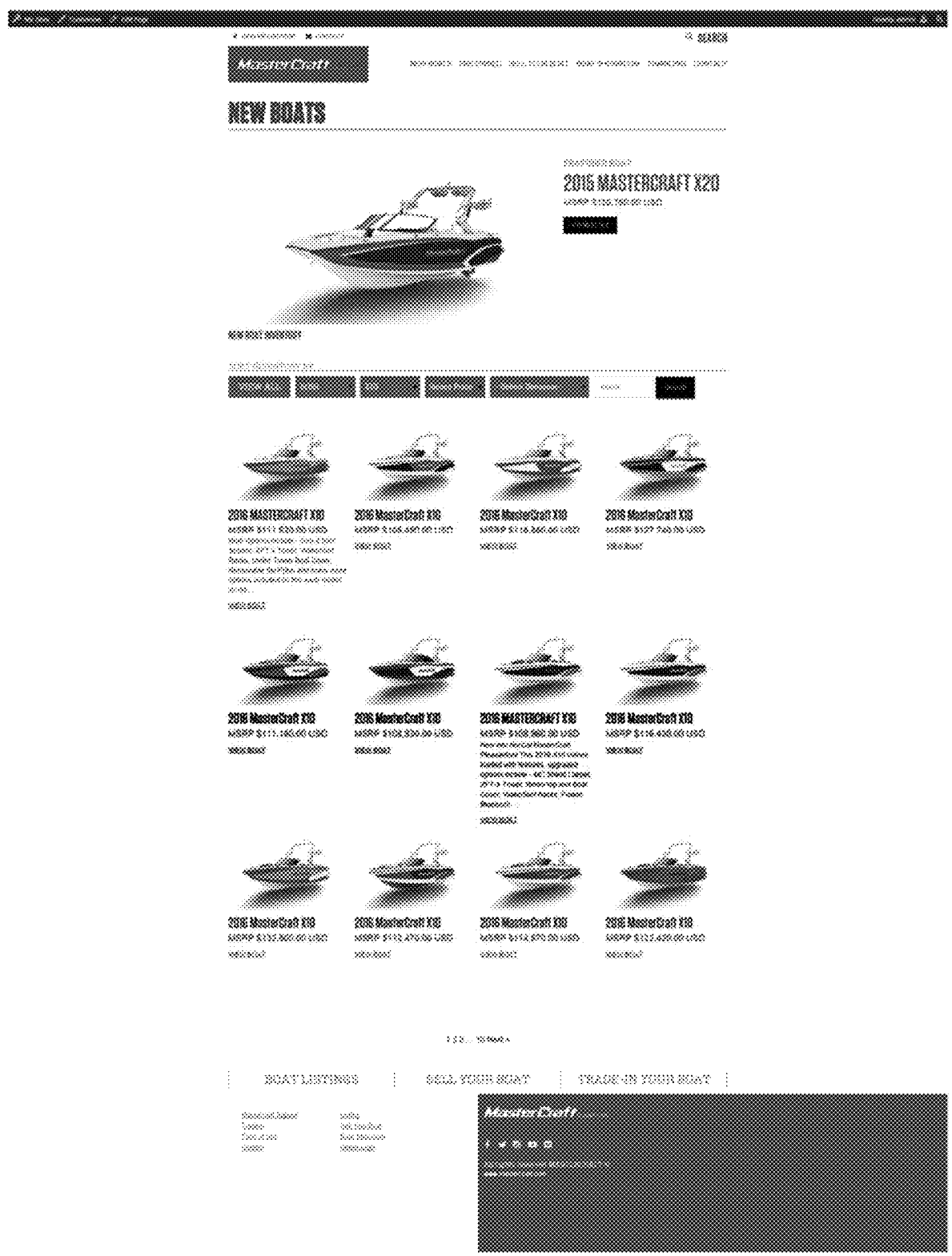
Figure 24:
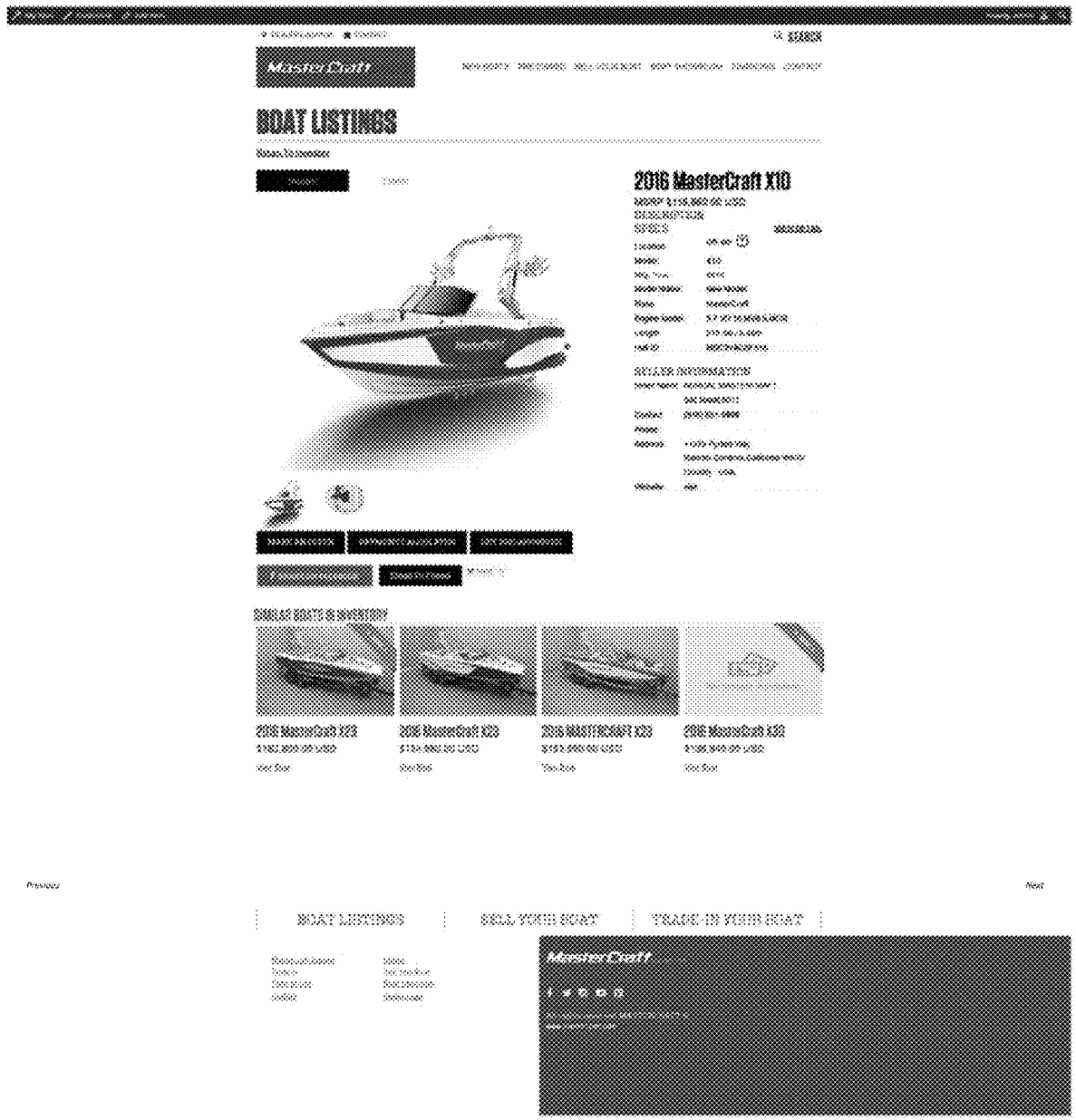
Figure 25:
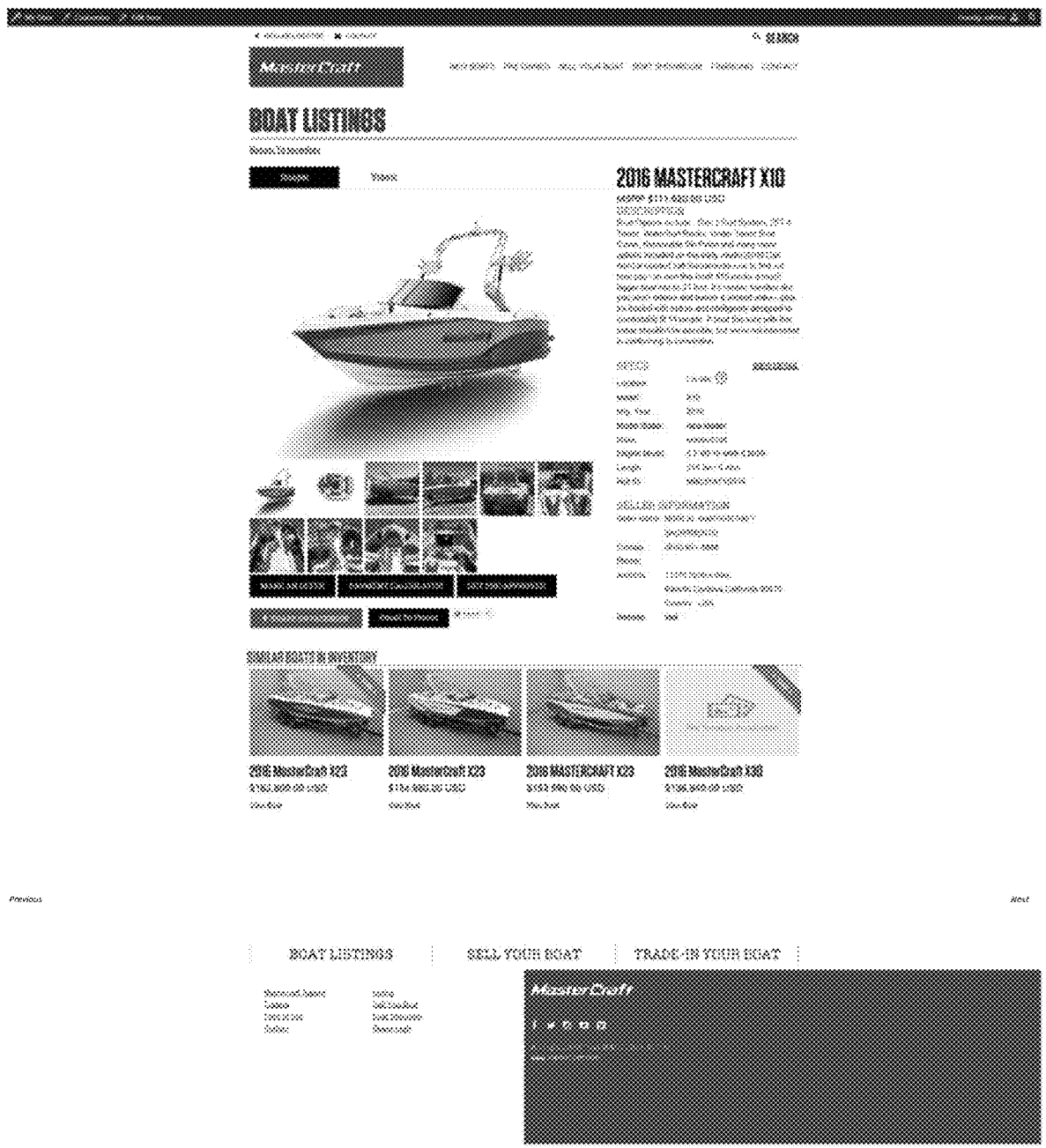

The system generates results for presentation on user interface (922), and provides the results to user interface (923) for presentation to the user. For example, a webpage or response to an HTTP request from the consumer interface may respond with the data used by the user device customer interface to show the ordered results within the interface. FIGS. 22 and 23 show examples of a user interface providing results. When the user selects a result, a new page as shown in FIGS. 24 and 25 may be provided.

Figure 9B:
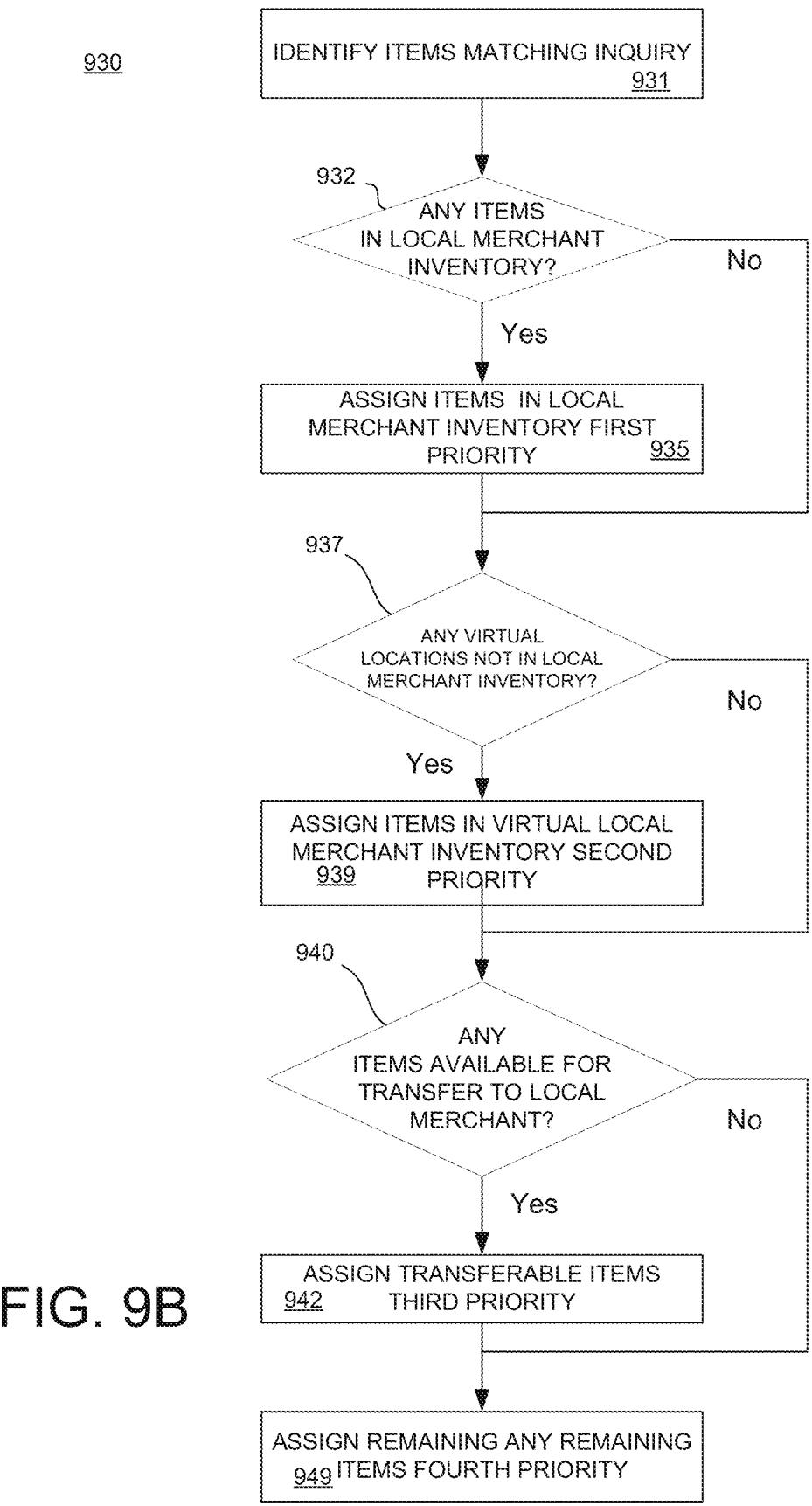
FIG. 9B is a flow chart illustrating an example of an inventory priority ranking process.
Figure 9C:
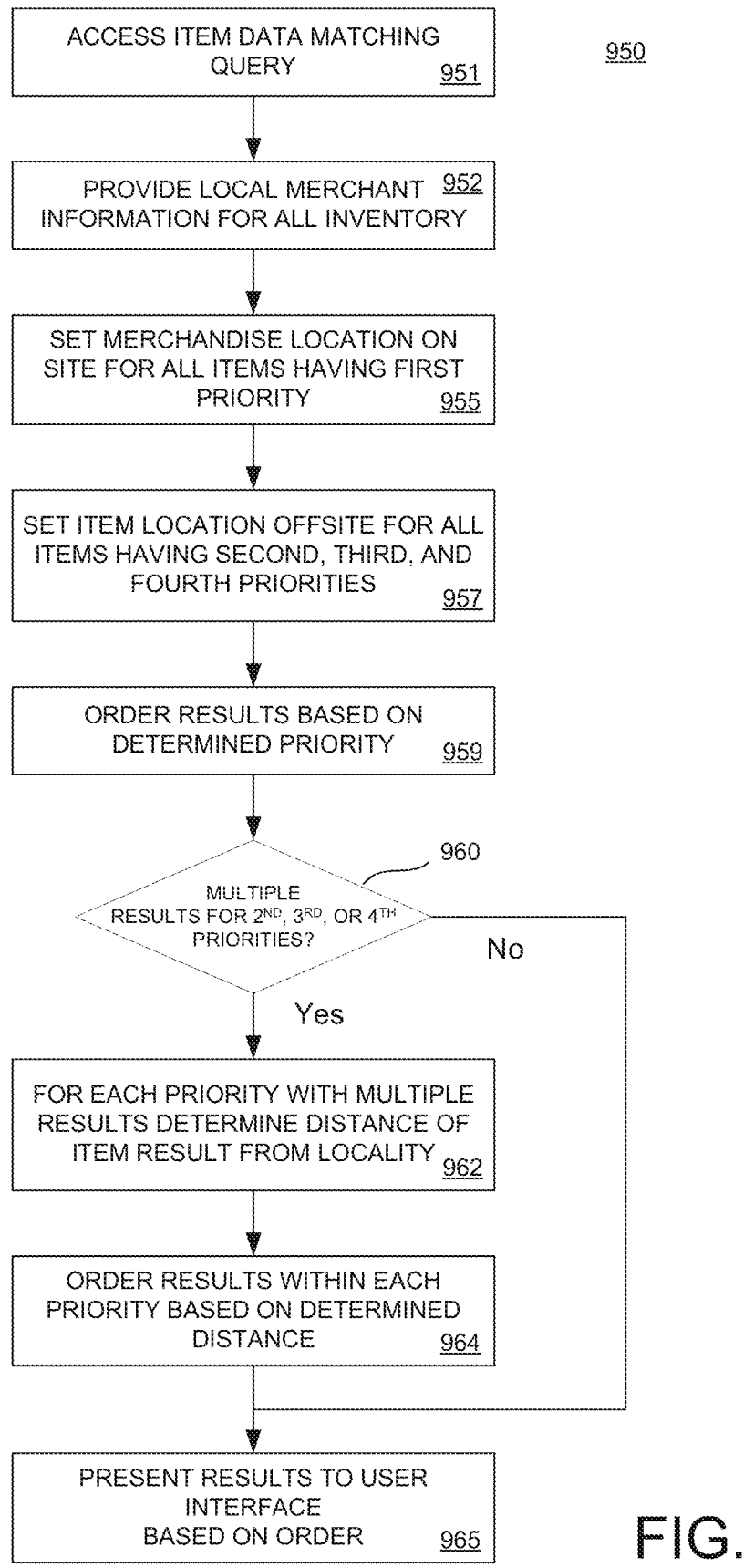
FIG. 9C is a flow chart illustrating an example of process to generated consumer interface optimizing results for presentation.

FIG. 9B shows an example of a flow chart for a process 930 establishing priority of inventory items returned in response to a search of inventory items matching criteria, such as, for example, provided in association with FIG. 9A.

As shown in FIG. 9B, the system receives merchandise matching query (931). For example, the system executing the process 900 shown in FIG. 9A returns results of items in the inventory database matching a query received from the consumer interface.

The system determines whether any of the items or merchandise returned in the results is physically located in the inventory associated with a local merchant inventory (932). For example, as part of the process 900 the system determines a physical location of the consumer and assigns a dealer to service the consumer. The system then determines whether any of the results matching the query are physically located at the second physical location. For example, the system determines if a data record for an item or merchandise indicates the item or merchandise is physically located in the inventory of the assigned dealer. The system assigns merchandise physically located in the inventory of the assigned dealer first priority (935).

The system determines whether any of the items or merchandise returned in the results is virtually located in the in local merchant's inventory (e.g., not physically location in the local merchant's inventor but rather virtually shared with the local merchant as explained above) (937). The system checks the database records corresponding to the results to determine whether any of the records indicate the items or merchandise are stored as virtual inventory shared with the local merchant but physically located in the inventory of a second merchant located elsewhere. The system assigns virtually shared items or merchandise a second priority (939).

Next, the system determines whether any of the item or merchandise returned in the results are available for transfer to the second physical location (e.g., transfer to the location of the local merchant) (940). For example, the system checks the database records to determine whether any of the results indicate the items or merchandise are stored as inventory that may be shared with the local merchant but are physically located in the inventory of a second merchant located elsewhere and have not been indicated for virtual sharing. The system assigns sharable merchandise a third priority (942).

The system then assigns any remaining merchandise returned in the results a fourth priority (949).

The priorities may be used by the system to order the results that are presented to the user. For example, results may be order by presenting any first priority results; followed by any second priority results, followed by any third priority results, followed by any fourth priority results.

FIG. 9C shows an example of a flow chart for a process 950 of generating the results returned from an inquiry for presentation in a consumer interface. For example, the process 950 may be used in conjunction with the processes 900 and 930 to generate a consumer interface present the results of a query to the user.

First, the system accesses merchandise data for the results matching a query (951), such as the query 902 shown in FIG. 9A. The system provides local merchant information for all inventory returned matching the query (952). For example, a local merchant is determined as described above in determination 903. The merchant information returned for the inventory items matching the query is shown as the determined local merchant regardless of the actual physical location of the merchandise.

The system sets the merchandise location as "on site" for all merchandise having first priority (955). The system sets merchandise location as "offsite" for all merchandise having second, third, and fourth priorities (957).

The system orders results for presentation in the consumer interface based on determined priority (959). For example, if there are multiple results, the system orders the results in the order of the determined priorities. In this example, results having the first priority or highest priority are shown before results having the second priority, which are shown before results having the third priority, which are shown before results having the fourth or lowest priority.

The system also determines whether there are multiple results having 2nd, 3rd, or 4th priorities (960). For each of the 2nd, 3rd, or 4th priorities having multiple results, the system determines the distance of merchandise result from the locality of the consumer (962). For example, the system determines the locality associated with the query in operation 903 of the process 900. In one example, the location may be a post code. The system may then calculate the distance from the determined location or post code associated with the query to the physical location stored in the database record of an inventory item corresponding to a search result.

The system orders results within each priority based on determined distance (964). For example, the system may present the result in order of lowest to greatest distance for all items returned having the same priority level.

The system presents the results to user interface based on the determined order (965). For example, a results page shows the results returned in response to the query. The results are ordered for highest to lowest priority and by ascending distance within each priority level. For example, assume a query for a 2015 Master craft X 20 returns matching boats 1-. Boat 1 is located in the inventory of a local dealer, boat 2 at dealer 100 miles away from the consumer, boat 3 available for sharing from a dealer 50 miles from the consumer, boat 4 available for sharing from a dealer 20 miles from the consumer; boat 5 at a dealer 75miles from the consumer, boat 6 at a local dealer and boat 7 located at a dealer 50 miles from the consumer but virtually shared with the local dealer. The system may order the result for presentation to the viewer as: boat 1, boat 6, boat 7, boat 4, boat 3, boat 5, and boat 2. In addition, the results are always shown as being provided by the local dealer regardless of the actual location or ownership of the items. When the item is selected for viewing or a transaction, the item will either be shown as offsite, as shown in FIG. 24 or on site as shown in FIG. 25.

Figure 9D:
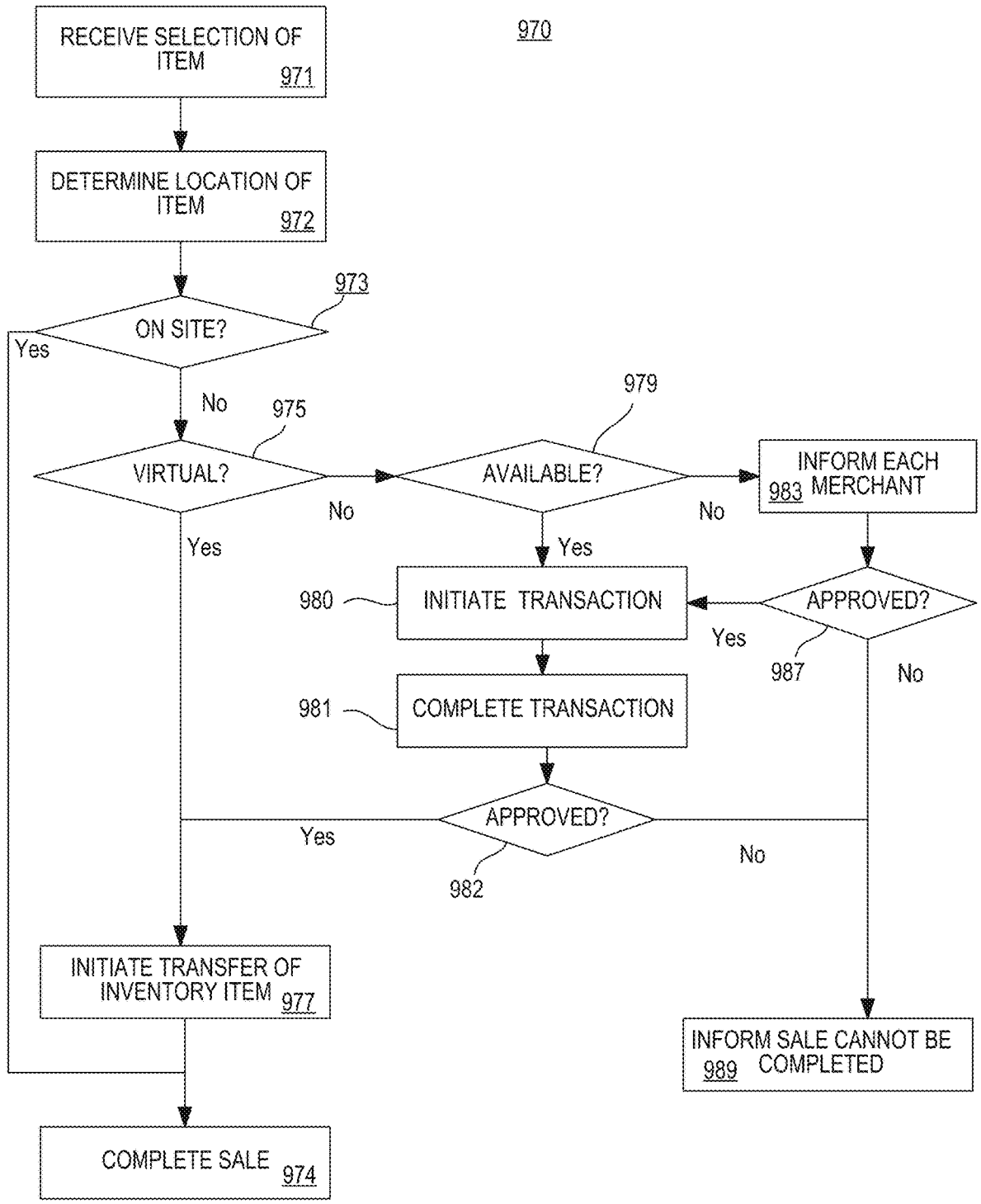
FIG. 9D is a flow chart illustrating an example of inventory transaction process.

FIG. 9D shows an example of a flow chart showing a process 970 for a transaction based on the presentation of the results for the process in FIG. 9A.

The system receives selection of merchandise (971). For example, the user selects a boat from the results presented in the consumer interface using an input device connected to the user device presenting the consumer interface. The selection is formatted and communicated from the user device to the system.

The system determines the location of merchandise corresponding to the selection (972). For example, the system accesses the data record in the database corresponding to the selected item.

The system determines whether the item is "on site" at the merchant (973). For example, the system accesses the data record to determine if the item is located at the local merchant, such as the boats 1 and 6 given in the example above.

If the boat is on site, the system completes sale (974). For example, if the boat is available from the local dealer, the system may present an interface to the consumer to conduct a sale to the consumer using an automated payment system, such as merchant services or online bank, such as a Pay-Pal account.

If the item in not on site, the system determines whether the system is a virtual inventory item (975). For example, the system accesses the data record to determine if the item is an item virtually shared with the local merchant, such as the boat 7 given in the example above. If virtual, the system initiates transfer of inventory item (977). For example, the system may invoke process 800 and complete the sale in operation 974.

If the item is not virtual, the system determines whether the item is available for transfer to the local merchant (979). For example, the system accesses the data record to determine if the item is indicated as available for transfer to the local merchant, such as the boats 3 and 4 given in the example above.

If available, the system initiates a transaction to transfer the item (980) and the system attempts to complete the transaction (981). For example, the system can invoke the trade process 600. If the transaction is approved (982), the system initiates transfer of inventory item 977 and completes the sale 974. If the transaction is not approved, the system informs the consumer that the sale cannot be completed (990).

If the item is not transferable, the system informs each merchant (983). For example, the system can provide a notification to the local merchant and the merchant with the item in its inventory. The system can then invoke process 800 to determine if the item can be transferred to the local merchant. The system determines whether the transfer is approved (987). If approved, the system initiates a transaction to transfer the item and complete transaction. If not approved, the system can inform the consumer the sale cannot be completed (989).

Figure 9E:
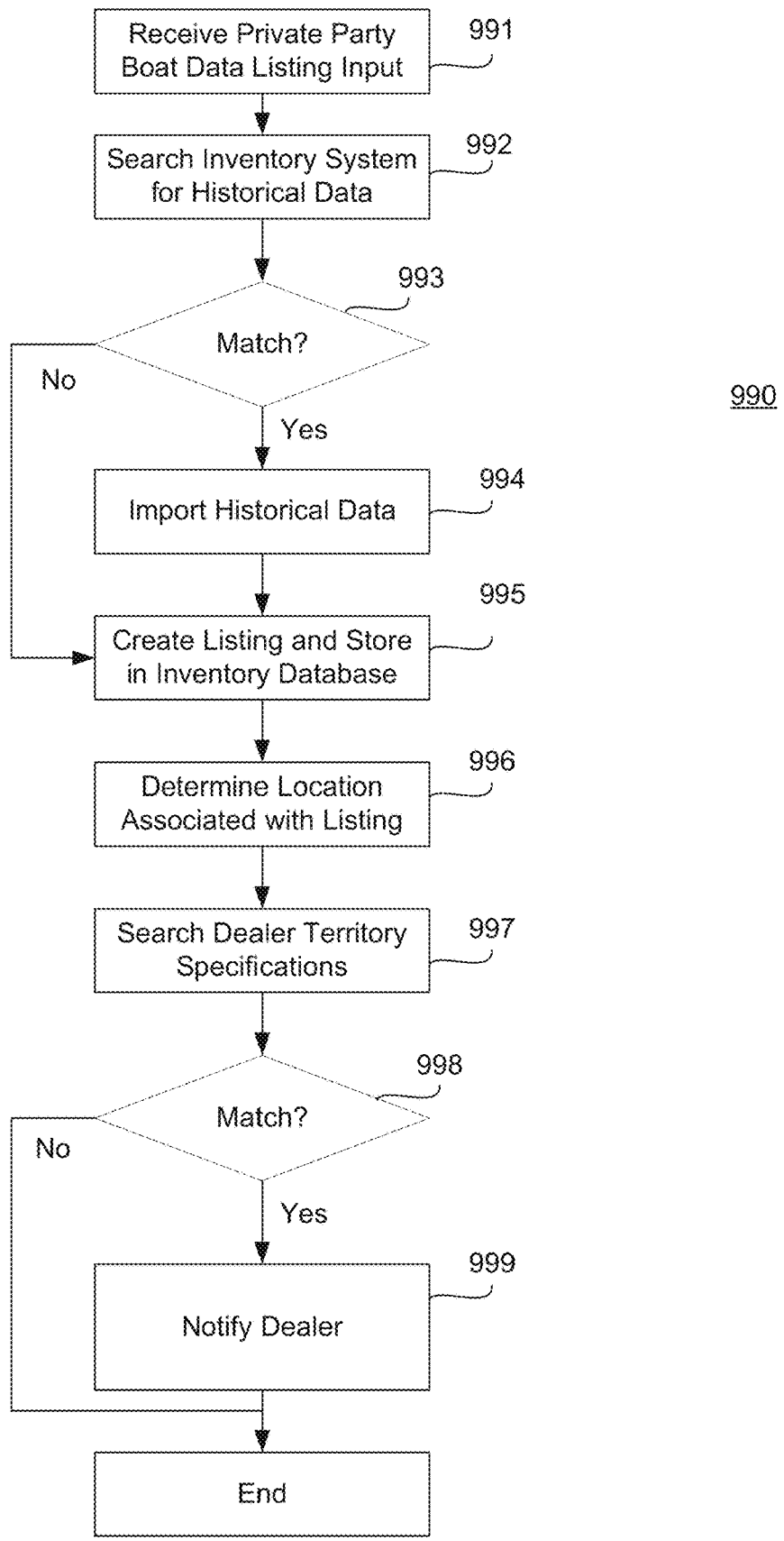
FIG. 9E is a flow chart illustrating an example of private party listing process.

FIG. 9E is a flow chart illustrating an example 990 of private party listing process. The inventory management system receives a private party boat data listing input to the inventory management system via a customer interface 281 (991). The inventory management system searches the inventory of the inventory management system for historical data that may correspond to the boat listing (e.g., using a hull ID associated with the boat) (992) to determine if there is a match for of any data records stored in the system (993). If there is a match, the inventory management system imports or links the historical data (994) and creates a new product record for the listing and stores the record in the inventory database 253 (995).

The inventory management system determines a location associated with listing record (996), and searches the dealer records in the user database 251 for any matching territory, location, or notification specifications (997). The inventory management system determines whether the listing matches any territory, location, or notification specifications (998).

If the inventory management system determines there is a match for the listing, the system notifies the dealer (999). As a result, the dealer can contact the consumer and arrange for purchase of the product to add to the dealer's inventory.

System Architecture

Figure 10:
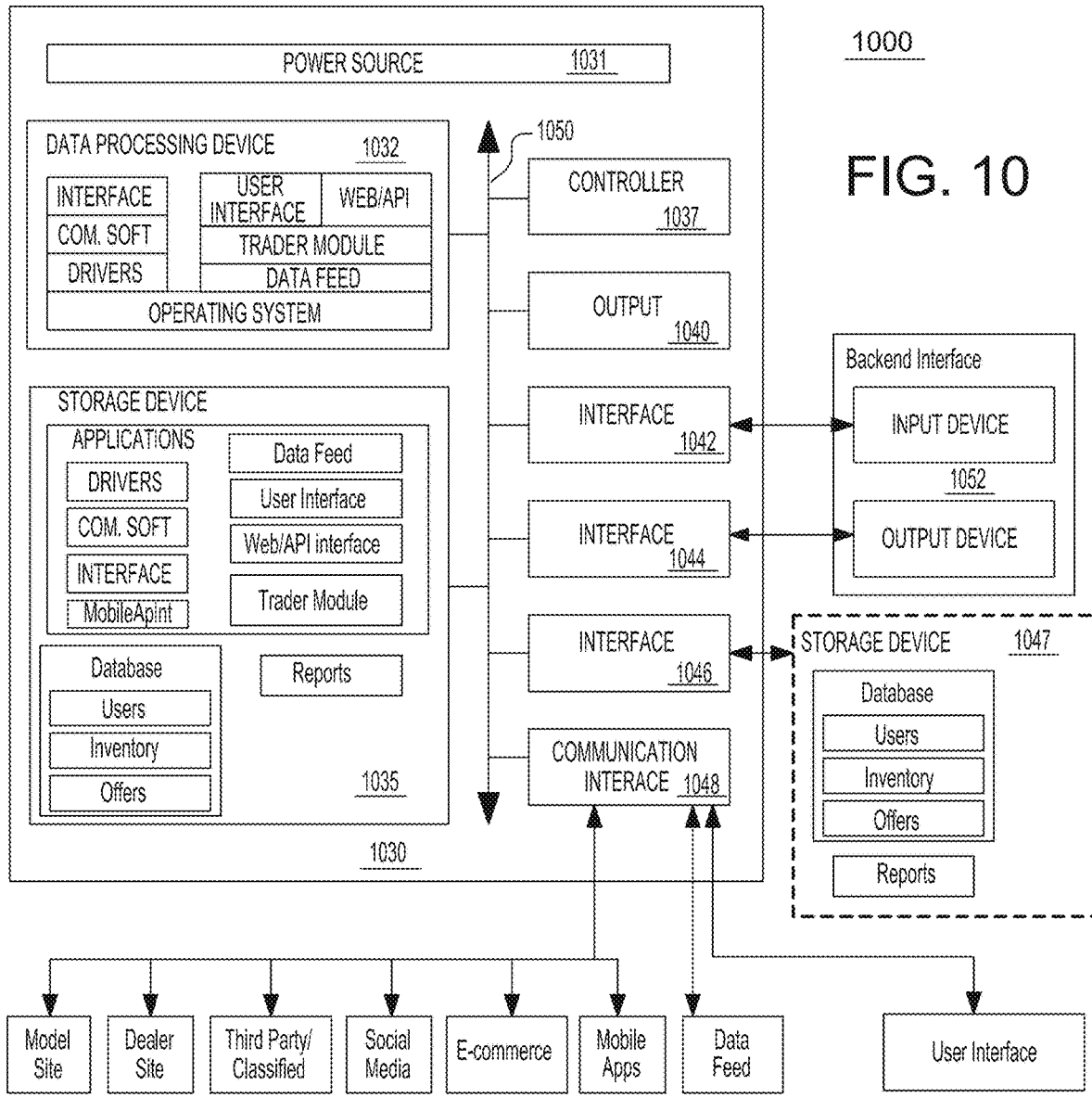
FIG. 10 shows an example of one configuration of components of an inventory management system.

FIG. 10 shows an example 1000 of one configuration of components of an inventory management system 101. FIG. 10 shows one example an inventory management system a including an inventory management server 1030. The server 1030 may include a power source 1031, one or more data programmable data processing apparatuses 1032, an internal storage device 1035, one or more controllers 1037, an output device 1040, one or more interfaces 1042 for communication with external input devices (e.g., touch screens/pads, keyboards, pointer or mouse), one or more interfaces 1044 from communication with external output devices (e.g., touch screens, displays, monitors, projection devices), one or more interfaces 1046 for communication with an external memory device 1047, and one or more communications interfaces 1048 configured to send and receive data to and from the communications paths 135. In addition, one or more internal communication links or busses 1050 may be provided in order to connect the various components and allow reception, transmission, manipulation, and storage of data and programs.

The communications interface may send and receive data via API calls, messages, and HTTP requests among others via a communications path 135. For example, the communications interface may send and receive data from model sites, dealer sites, third party classified sites, social media sites, e-commerce sites, mobile apps, data feeds (manufacturer, dealer, and third party), and one or more user interfaces (e.g., a customer interface and a system interface).

The data processing apparatus 1032 may include one or more processors running an operating system. In addition, the data processing apparatus may run various drivers, communications software, interface software, in addition to applications for the inventory management service, such as, for example, at least one inventory transfer application, at least one data feed interface, at least one a user interface, at least one a web/API interface, and at least one a mobile app interface to implement the processes 400, 500, 600, 700, 800, and 900, among others.

The server 1035 also may include one or more internal memory devices 1035 for storing the software and applications, such as the software for drivers, communications, and interface, in addition to the at least one inventory transfer application, the at least one data feed interface, the at least one a user interface, the at least one a web/API interface, and the at least one a mobile app interface. The internal memory device 1035 also may store data files used or generated by the inventory management service, such as, for example, the database 250 and any reports generated by the system. One or more additional external storage devices 1037 may be provided to back up or store data files used or generated by the inventory management service, such as, for example, the database 250 and any reports generated by the system.

In addition, one or more interfaces maybe provided to communicate with backend interface 1052 used by system administrator to maintain the server system and database.

It will be appreciated that due to the vast territories serviced by dealers of a manufacturer and the huge amount of inventory and production slots available from a manufacturer, combined with the logistics that the inventory units are distributed and owned by separate entities with geographic and/or regional restrictions on their corresponding service area and the fleeting and ephemeral interest of consumers in locating and buying products, the inventory management system 101 cannot be implemented without the use of data processing apparatuses programmed to maintain the database 250, implement the processes describe above, and operate the interfaces to provide an overall picture of all inventory available from a manufacture at any point in time (which again may include millions of products distributed to thousands of dealerships over a large geographical area, such as a nation or a continent), search all available inventory and production slots in a timely manner, and initiate efficient transfers or listing of inventory between dealerships in a real time or a near real time frame needed to make such a system commercially viable.

In addition, without such an inventory management system, due to contracts between the manufacturer and dealerships that dealerships may only service an authorized area, production slots and inventory provided from a manufacture to the dealerships will not be optimized, and surpluses at any particular dealership and deficits at others will result. Therefore, the inventory management system 101 provides a technical solution with concrete and tangible results that include the physical management, sale and transport of actual articles of manufacture from one dealership having inventory to another dealership having need of inventory as a result of the inventory management system overcoming the technically challenging and historic barriers preventing manufacturer authorized dealerships from collaborating and/or directly transacting with each other in a real-time manner.

Furthermore, the automated inventory management system and/or management service provides a dealer centric search feature that optimizes inventory management by attempting minimize out of territory selling. For example, when a consumer does a search for a unit of inventory, the search results identify a dealer(s) who owns the territory or is otherwise chosen to service the location associated with a consumer. The results are prioritized base on locations (e.g., physical, virtual, or transferable), and the results are displayed with the contact information of the identified dealer regardless of the actual item owner or location. If a consumer wishes to purchase the item, an automated process allows a dealer to transact to transfer any inventory not located in the dealer's physical inventor to complete the sale. The helps the brand manufacturer by providing a competent merchant to interface with the buyer resulting in better brand promotion and goodwill. Merchants benefit as being able to better manage inventor and service consumers closest to the merchant's location, resulting in higher consumer satisfaction and possible repeat business from consumers. In addition, consumers benefit by being provided with results that match their criteria, protection against problems associated with the purchase of an item, and are most easily available for purchase and servicing without any additional inquiries or effort on the part of the consumer.

User Interface

FIGS. 11, 12, 13, 14, 15, 16, 17, 18, 19, and 20 show examples of screen shots associated with interfaces provided by the inventory management system.

Figure 11A:
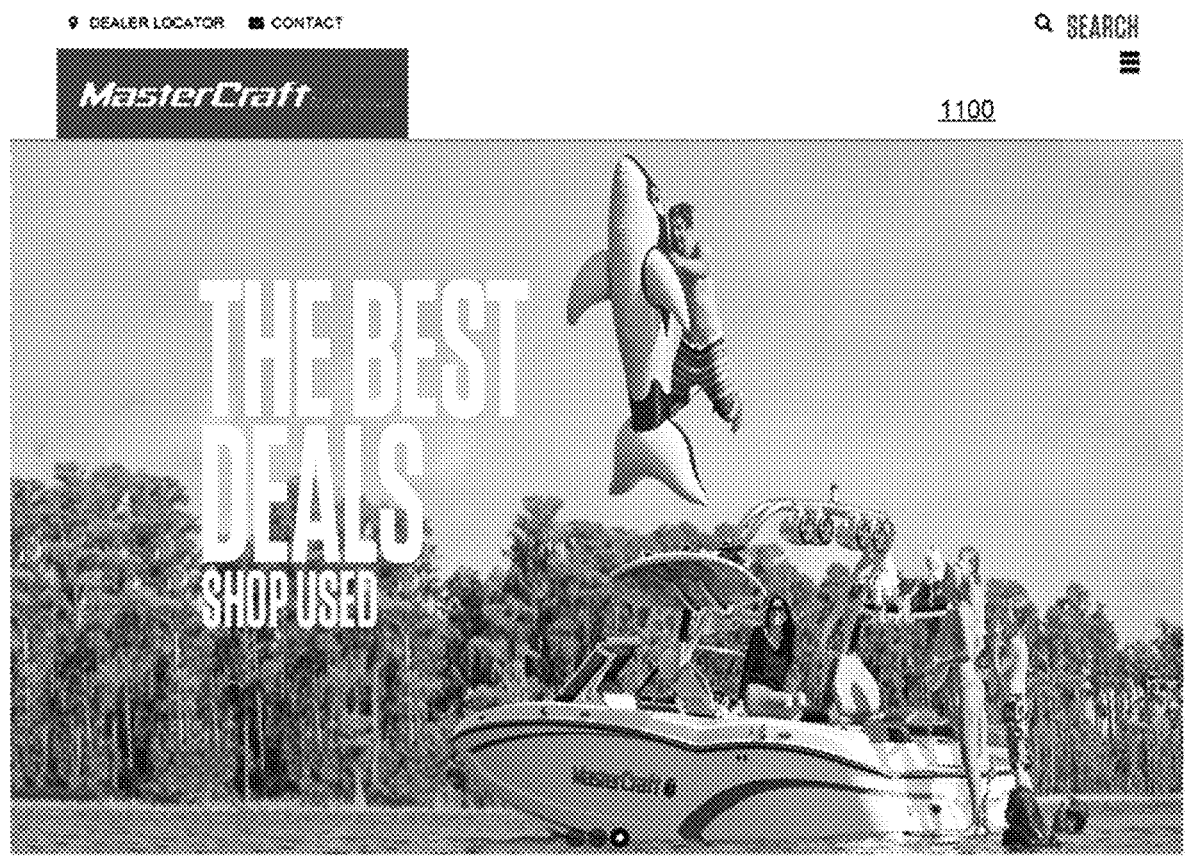

FIGS. 11A, 11B, and 11C shows an example of a screen shot of an interface provided by the consumer interface 270, for example, on a dealer website. The website provided and interactive customer experience and includes dealer identification, advertising and images, tabs for selling a boat, browsing inventory, and finding a local dealership. The page includes a featured boat with image, prices, and input to view details about the featured boat. In addition, the interface includes a recently added inventory section including images, prices, and input links to view details about the corresponding boat. The page also includes a featured preowned boat with image, prices, and input to view details about the featured preowned boat. The interface also includes a recently added preowned inventory section including images, prices, and input links to view details about the corresponding preowned boats.

FIG. 12 shows an example 1200 of a screen shot provided by a system interface, for example, an inventor management interface for dealer trade search. The interface includes a search input 1201 and pull-down menus 1202 to select year, a model, an engine model, a motor, a dealer, and a distance. A filter input button 1205 may be selected to filter the inventory for one of more of the selected pull-down menu inputs. Results are listed below the filters. The results include one or more inventory items matching the search criteria and/or filter settings. For each inventory item presented by the interface, the interface inserts an image 1210, a dealer name 1211 and information 1212 about the inventory item including a year, a model, a hull ID, a motor type, a distance, and days in inventory. In addition, the interface presents cost information 1225 including: a price, an invoice amount, a PDI, a trailer cost, a dealer discount, and OEM discount, an other amount, and a total. In addition, there is a section 1230 to present any comments. An input section 1235 include several input buttons for dealer actions. For example, input buttons are provided to submit a purchase offer, request a virtual share or transfer; recommend, or submit a question or comment. In addition, an input 1240 is provided to request calculation of the shipment cost for the item.

Figure 13B:
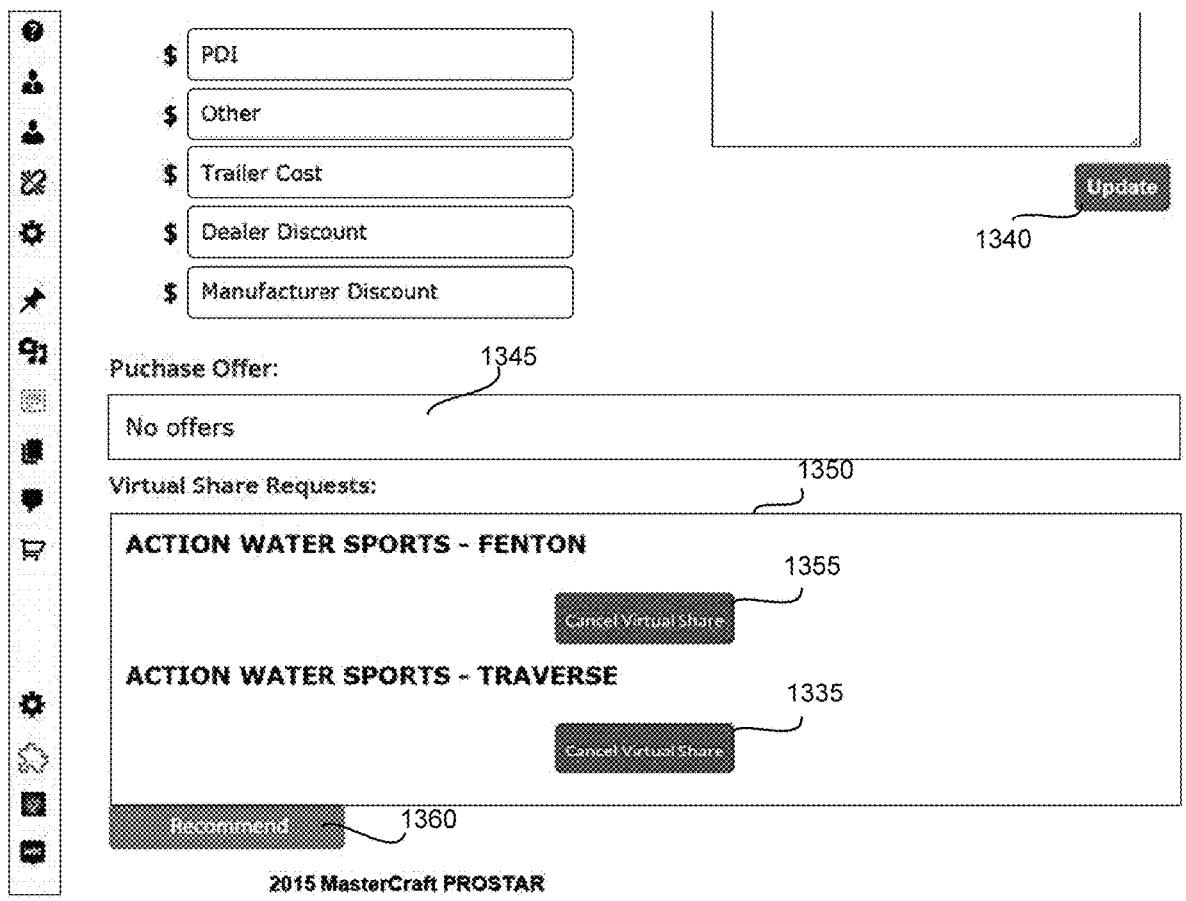
FIG. 13 comprises FIGS. 13A, 13B, and 13C, which show an example of a screen shot that may be provided by a system transfer interface, for example, a trader interface for dealer trade inventory listing.
Figure 13C:
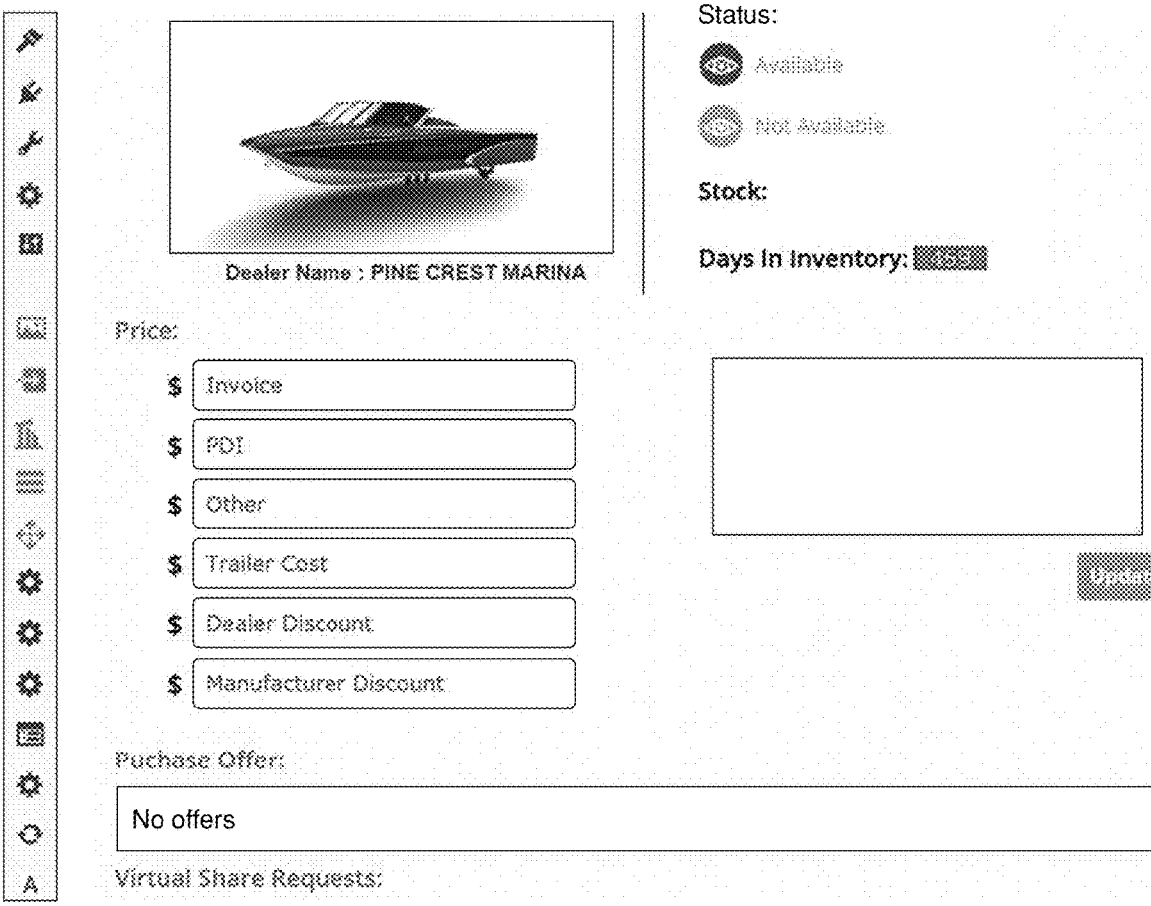

FIGS. 13A, 13B, and 13C show an example of a screen shot 1300 that may be provided by a system interface, for example, a trader interface for dealer trade inventory listings. The interface includes a search input 1301 and pull-down menus 1302 to filter inventory items and select year, a model, an engine model, a dealer, and days in inventory. A filter input button 1305 may be selected to filter the inventory for one of more of the selected pull-down menu inputs. Results are listed below the filters. The results include one or more inventory items matching the search criteria and/or filter settings. For each inventory item an identification 1310 is shown, such as a year and model type paired with an image 1315 associated with the item. In identification 1320, such as a name of the dealer who owns the inventor item also is shown. A status section 1325 allows the dealer input a status of the inventor item, such as available or not available. An indication 1330 of the days in inventory is also shown. A price section 1335 includes several input fields or boxes in which a user can input an invoice amount, an invoice amount, a PDI, a trailer cost, a dealer discount, and OEM discount, an other amount. An update input button 1340 allows a user to submit data corresponding to any input fields entered by the user. A section 1345 including a field indicates whether there are any purchase offers available. A final section 1350 indicates any virtual share requests. In one example, there are two share requests to "action water sports" dealerships in "Fenton" and "Traverse." A cancel request input button 1355 is provided for each share request. A recommend input button 1360 is also provided.

FIG. 14 shows an example of a screen shot 1400 that may be provided by a system interface, for example, an admin interface showing a trade history report. The report may be filtered by a time or complete history. For the filter setting 1401 (e.g., all history is shown) a listing of all inventory items involving dealer trades is shown. For each inventory item an item identifier 1410 is provided along with a date/time stamp 1415 of the transaction. A status section 1420, an invoice amount section 1425, and a message section 1430 provide details of the transaction. In addition, an input 1435 for a counter message is provided.

FIG. 15 shows an example of a screen shot 1500 of an interface that may be provided by the consumer interface 270, for example, on a model website. The interface includes a search entry field, tabs for searches for new boats, pre-owned boats, a show room showing boat models, a trade-in valuator, parts, service, and news and events. Advertising and images may be provided. The landing page may be used by users to search for inventory items from the manufacture regardless of what dealership has the inventory.

Figure 16B:
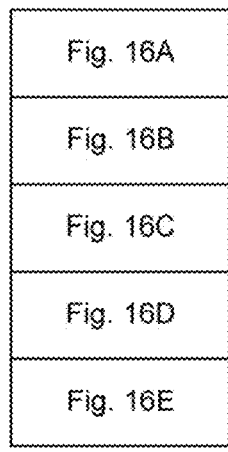
FIG. 16 comprises FIGS. 16 A, 16B, 16C, 16D, and 16E, which show an example of a screen shot that may be provided by a system admin.
Figure 16A:
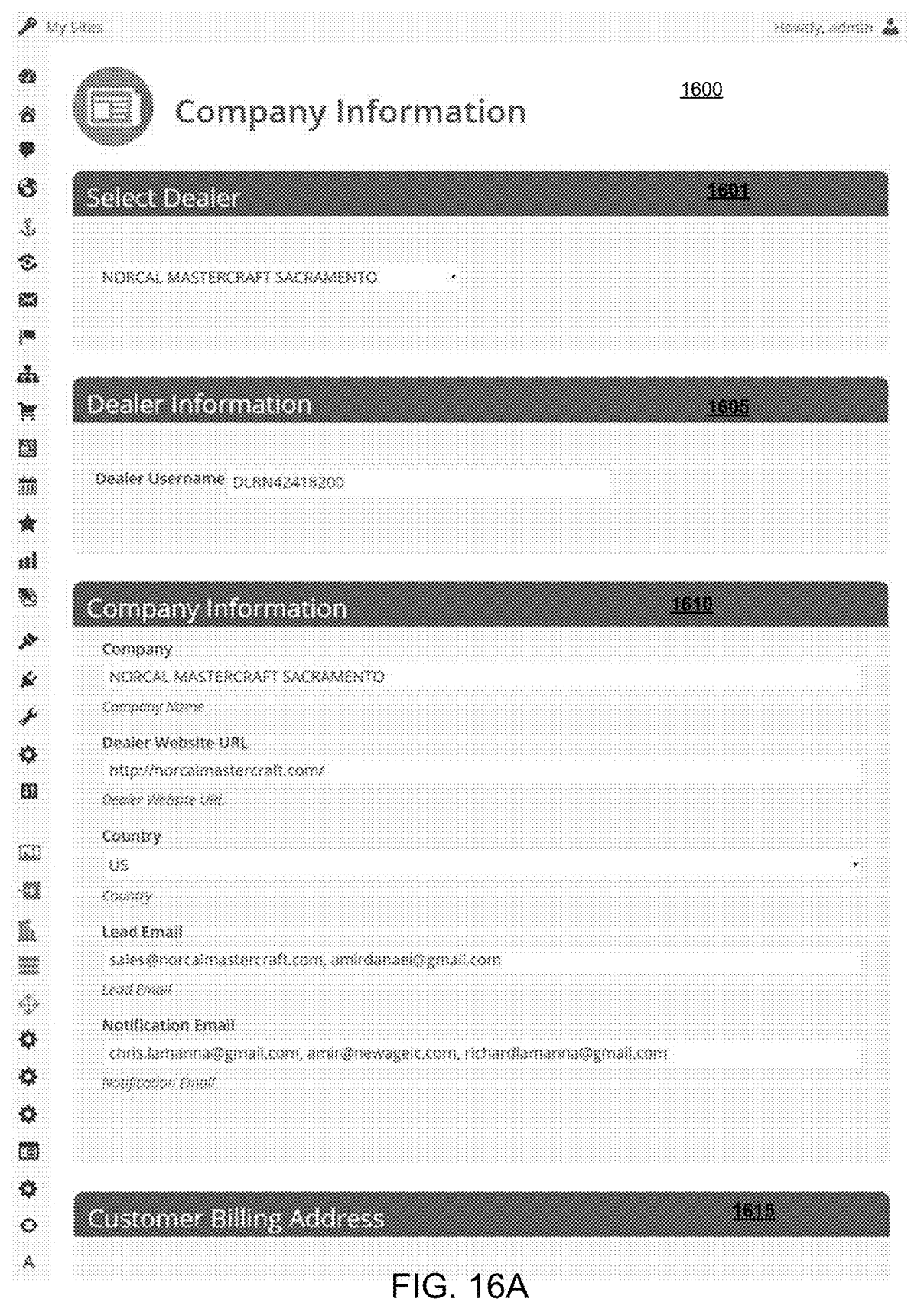
Figure 16D:
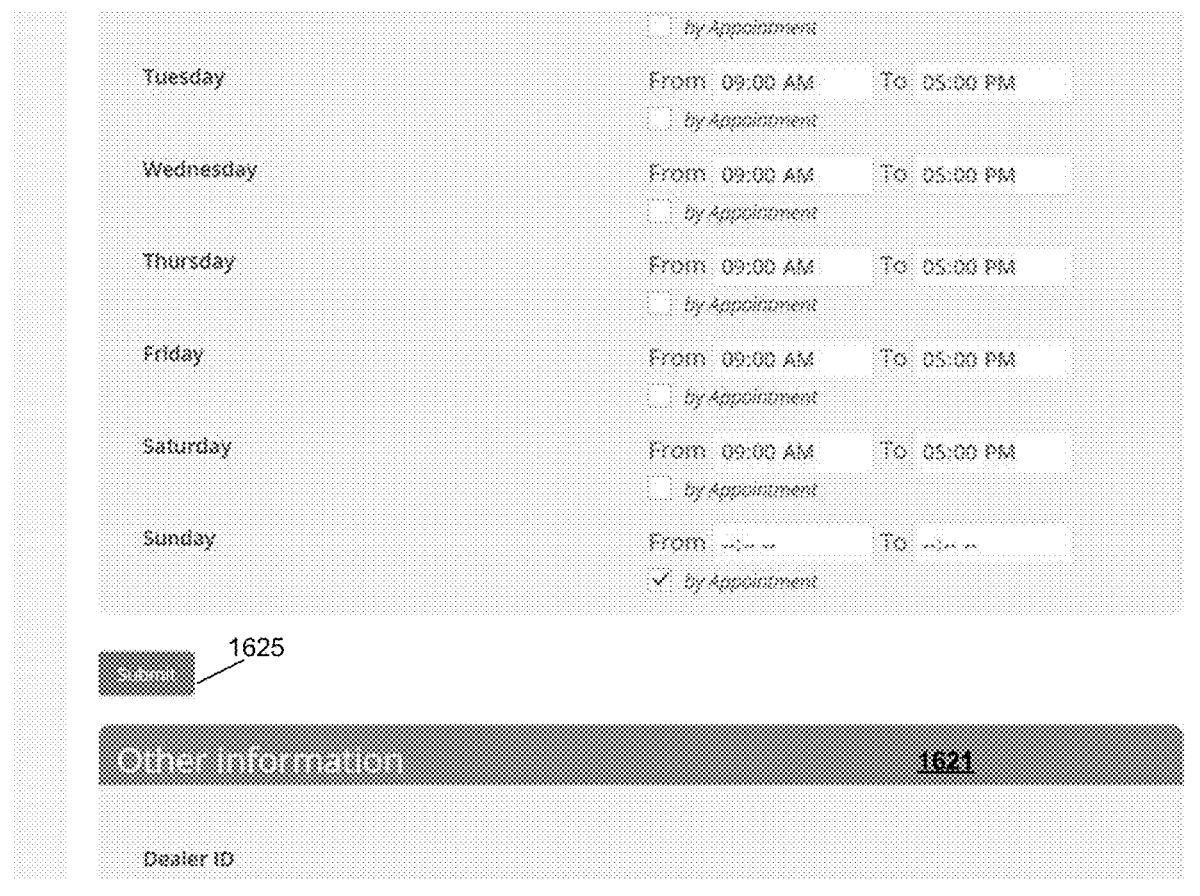
Figure 16E:
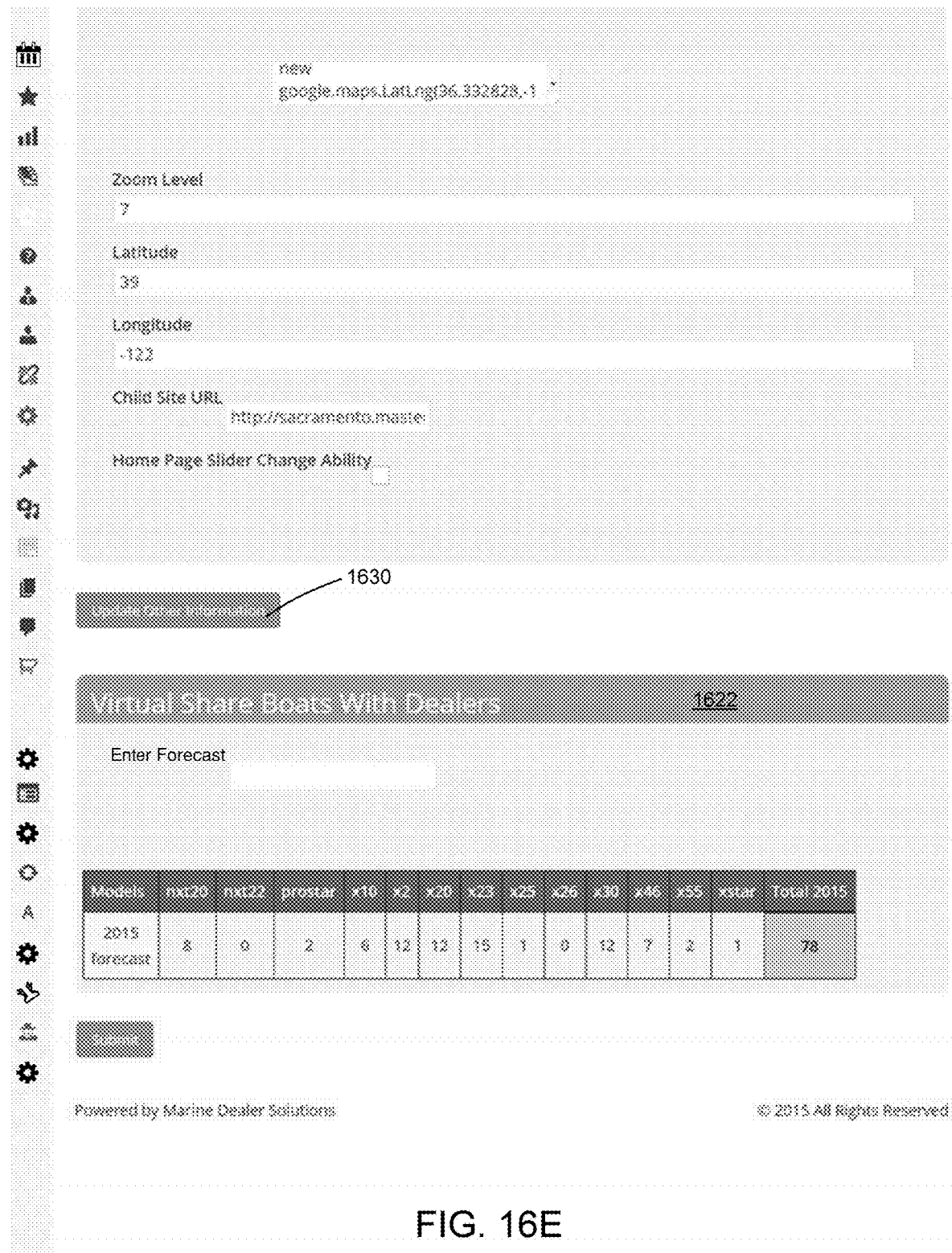

FIG. 16 shows an example of a screen shot 1600 that may be provided by a system interface, for example, an admin interface showing a user edit page. The interface includes sections to select a dealer 1601, show dealer information 1605, company information 1610, customer billing address 1615, hours of operation 1620, other information 1621, and a virtual share boats with dealer information 1622. Each section includes various information that corresponds to records in the database. The section 1601 includes a drop-down menu to select a dealership. The dealer information includes the dealer username used to access the system. The company information includes fields for company name, dealer website URL, country, email address for leads, and notifications. The customer billing address includes a street, city, country, postcode, and billing phone number, sales phone number, fax number, and social media information. The hours of operation include lists days of the week with from and to hours for each day and tic boxes for by appointment. A submit button 1625 may be used to update or enter information filled out in the fields. The other information includes information of location, including fields for Dealer ID map info, a zoom level for the map, a latitude, a longitude. An update other information button 1630 may be used to update or enter information filled out in the fields.

FIG. 17 shows an example of a screen shot that may be provided by a system interface, for example, an admin interface showing a product edit page. The interface includes an "add new" button to generate a fresh page to input item information for a new item to add to the database. The interface includes an item identification field, an item link URL, and an item description field. A field for price options also is provided. A publish button allows the item to be made available and a visibility status indicates whether it is available for public view or private viewing. An image gallery is provided to add images for the item including a featured image. Fields for price, model status (new or used), year of manufacture, model, length, color, engine description, engine model, engine hours, stock number, pdf URL, contact name, zip code, dealer ID, video, additional features, sales status, video embedded codes, and hull ID number.

FIG. 18 shows an example 1800 of a screen shot that may be provided by a system interface, for example, a trader interface for dealer trade inventory listing. The interface incudes inventory listing of all items in the database that may be filtered using various drop-down menus, including dates, a model status, a dealer, days in inventory, a model year, a price, among others, such as item description information. The listing includes an item title, an image, an author of the listing (e.g., a dealership) a sale status (e.g., for sale, pending sale, sold, delivered, dealer traded), whether the item is featured (e.g., yes or no), whether the items is shared via social media, model status (new or used), year of manufacture, model, dealer ID, and days in inventory. A tic box is provided. Once checked the item may be accessed for action in another interface.

FIG. 19 shows an example of a screen shot 1900 that may be provided by a system transfer interface manufacturer discount report. The report includes a total budget for discounts, a remaining budget, and a list of discounted inventory. The list includes model status, year, make, dealer name, hull id, and the manufacturer discount.

Figure 20:
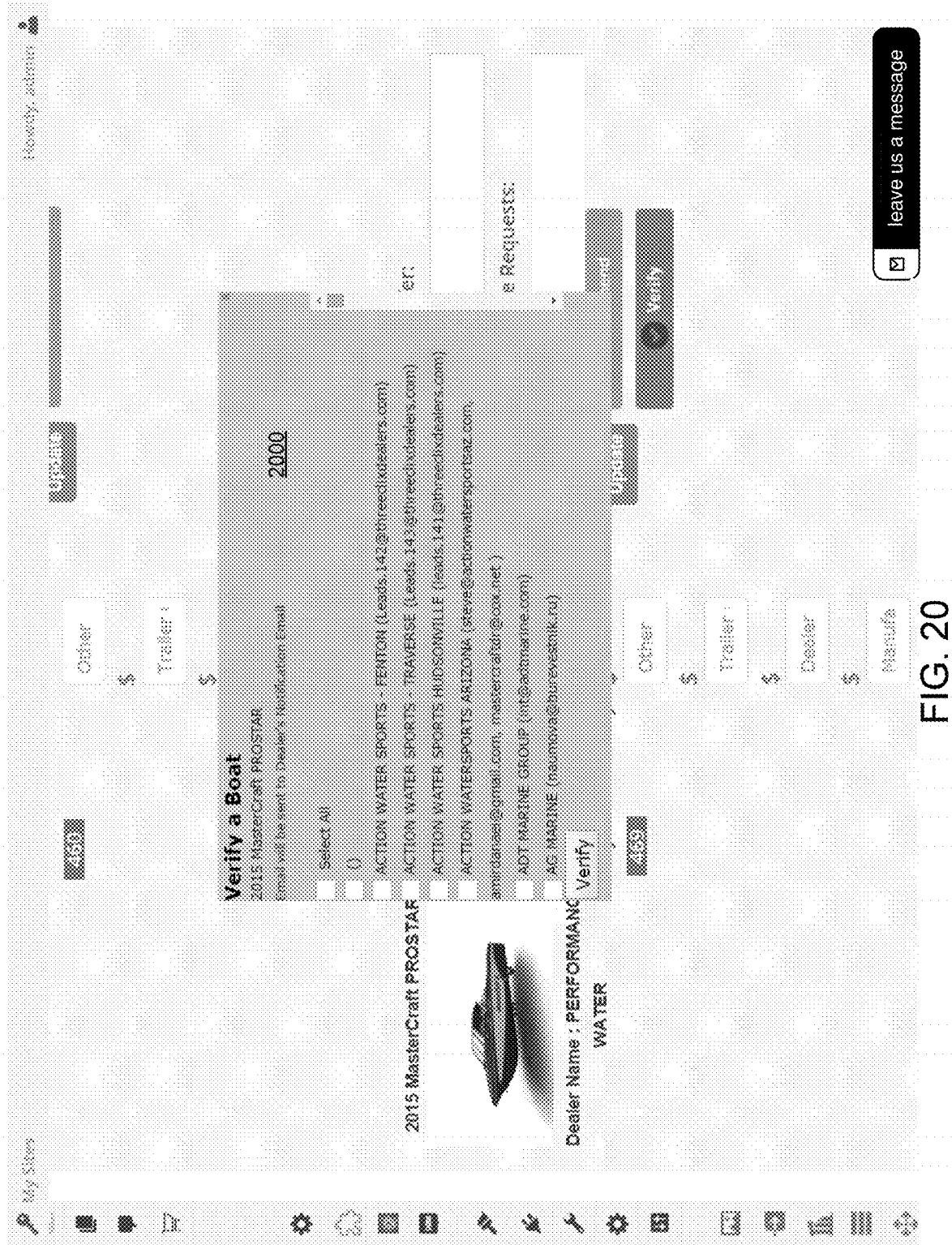
FIG. 20 shows an example of a screen shot a verified dealer trade message notification.

FIG. 20 shows an example of a screen shot 2000 a verified dealer trade message notification. The notification is shown in a pop-up window. The window includes boat identification information, and dealers for which the boat is listed. Tick boxes for each dealer is provided and a "verify" submit button is provided to submit an input corresponding to any boxes that are ticked to verify the trade status.

ALTERNATIVE EMBODIMENTS

It will be appreciated that the examples given above are for illustrative purposes only, and that many different configurations, combinations of devices, and numbers of devices may be provided for any particular implementation of a system. For example, in FIG. 1 three dealers 115, three content providers 120, and seven user devices 130 are shown. However, it will be appreciated that in an actual implementation of the system, there may be hundreds of dealers, thousands of content providers, and millions of user devices.

Similarly, although a single server and database are shown for the inventory management system 101 in FIGS. 1, 2, and 10, in practice, multiple servers and data processing apparatuses, including banks of servers, may be used and arranged in various configurations to receive, send, and process data for any number of reasons, such as redundancy, load balancing, volume, and processing requirements, to name but a few. In addition, although the inventory management system 101 is shown in the drawing as a single entity or location, it will be appreciated that although the inventory management system 101 may be configured to provide a location that appear centralized and/or remote from the perspective of any one user of the system, a central location, for example, may be one physical location, such as a room, building, or campus providing the hardware components of the inventory management system. However, in reality the central location also may be virtual or distributed wherein the trader services are provided, content is accessed from, and data are stored over a number of distributed systems, components and/or geographic locations. In other words, although the trader service and inventory management systems are shown in FIGS. 1, 2, and 10 as being a single entity, other configurations wherein the applications, processing, services, content, and data are distributed both in terms of devices and geographical location are within the meaning of the trader service or trader provider systems. Additionally, the trader service or and trader provider system may use third parties to host data and provide processing including initiating services as needed on demand, for example, using cloud computing techniques, wherein the locations and structure providing the services change size, and physical location, distribution, and even equipment dynamically over time.

In addition, other configurations of the system are possible. For example, the inventory transfer application 220 may be distributed within an e-commerce site, and/or one or more dealerships. In this scenario the inventory transfer applications connect with and obtain a data from a relational database that his hosted by an inventory management system. However, in other configurations the entire trader service 212 may be distributed within, for example, one or more e-commerce systems and one or more dealerships. In this example, a database is maintained by each ecommerce and dealer system providing the trader service and data is synched periodically between the systems or when changes are made to one system.

Furthermore, although specific examples given herein relate primarily to boats and OEM boat parts, the system can be implemented for any product and OEM parts that are provided from a single manufacturer and that are distributed by exclusive dealerships or brand franchises. For example, cars, appliances, and other products and associated parts may be used in association with the systems, components, methods, and techniques described herein.

In addition, a data processing apparatus, as described above, may be implemented using one or more general-purpose or special purpose computer, such as, for example, a processor, a controller and an arithmetic logic unit, a digital signal processor, a microcomputer, a field programmable array, a programmable logic unit, a microprocessor or any other device capable of responding to and executing instructions in a defined manner. The data processing apparatus may run an operating system (OS) and one or more software applications that run on the OS (e.g., controllers, drivers, communication applications, etc.). It will be appreciated by one of ordinary skill in the art within the context of the applications described herein that, any or each of the above-mentioned functions may be implemented as a separate application or combined into a single application a required. The data processing apparatus also may access, store, manipulate, process, and create data in response to execution of the applications. For purpose of simplicity, the description of a data processing apparatus herein is used as singular; however, one skilled in the art will appreciated that a data processing apparatus may include multiple processing elements or devices and multiple types of processing elements or devices. For example, a data processing apparatus may include multiple processors or a processor, registers or buffers, a memory, and a controller. In addition, different processing configurations are possible, such as serial processers, parallel processors, a quad processor, a main processor and a display processor or caching processor, among others.

As used herein, a data processing apparatus configured to implement a function A includes a processor programmed to run specific software. In addition, a data processing apparatus configured to implement a function A, a function B, and a function C may include configurations, such as, for example, a processor configured to implement both functions A, B, and C, a first processor configured to implement function A, and a second processor configured to implement functions B and C, a first processor to implement function A, a second processor configured to implement function B, and a third processor configured to implement function C, a first processor configured to implement function A, and a second processor configured to implement functions B and C, a first processor configured to implement functions A, B, C, and a second processor configured to implement functions A, B, and C, and so on.

The software or applications implemented by the data processing apparatus may include a computer program, a piece of code, an instruction, or some combination thereof, for independently or collectively instructing or configuring the data processing apparatus to operate or perform functions as desired. Examples of software applications include: an operating system, drivers to control and/or operate various components of the user device (e.g., display, communications interface, input/output devices, etc.). The applications may be resident in the data processing apparatus, loaded from a storage device, or accessed from a remote location or a storage device (e.g., using a communications interface). Additional applications may be provided to implement on or more of the processes 400, 500, 700, 800, or 900 shown in any of FIG. 4, 5, 6, 7, 8, or 9. The processes 400, 500, 600, 700, 800, and 900 can be performed by one or more programmable data processing apparatuses or processors executing one or more computer programs to perform the functions of the techniques described above by operating on input data and generating output. Method steps and techniques also can be implemented as, special purpose logic circuitry, e.g., an FPGA (field programmable gate array) or an ASIC (application-specific integrated circuit). Once the applications are loaded in or executed by the data processing apparatus, the data processing apparatus becomes a specific machine or apparatus configured to perform functions, such as to provide an automated inventory system among others. That is to say an apparatus with a data processing apparatus programmed in a certain way is a physically different machine than that of an apparatus without such programming as its memory elements are differently arranged and/or configured.

The software, applications, content, and data may be embodied permanently or temporarily in any type of machine, component, physical or virtual equipment, computer storage medium or device, or in a propagated signal wave capable of providing instructions or data to or being interpreted by the data processing apparatus. In particular, the software, applications, content, or data may be stored by one or more non-transitory computer storage devices or mediums including volatile and non-volatile memories that store digital data (e.g., a read only memory (ROM), a random access memory (RAM), a flash memory, a floppy disk, a hard disk, a compact disk, a tape, a DROM, a flip-flop, a register, a buffer, solid state devices, an SRAM, DRAM, SSD, PROM, EPROM, OPTROM, EEPROM, NOVRAM, or RAMBUS), such that if the storage device is read or accessed by the data processing apparatus, the specified steps, processes, and/or instructions are performed and/or data is accessed, processed, and/or stored. The computer storage device may include an I/O interface, such that data and applications may be loaded and stored in or accessed or read from the computer storage device allowing the applications, programming, and data to be used, updated, deleted, changed, augmented, or otherwise manipulated. The computer storage device may be removable, such as, for example, a disk drive, a card, a stick, or a disk that is inserted in or removed from the user device. The processor and the memory can be supplemented by, or incorporated in special purpose logic circuitry.

Functional programs, codes, code segments, and software for implementing the examples disclosed herein can be constructed by a programmer skilled in the art to which the examples pertain once guided by the drawings and their corresponding descriptions as provided herein.

Software or instructions for controlling a data processing apparatus to implement a software component may include a computer program, a piece of code, an instruction, or some combination thereof, for independently or collectively instructing or configuring the data processing apparatus to perform one or more desired operations. The software or instructions may include machine code that may be directly executed by the data processing apparatus, such as machine code produced by a compiler, and/or higher-level code that may be executed by the data processing apparatus using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the data processing apparatus. The software or instructions and any associated data, data files, and data structures also may be distributed over network-coupled computer systems so that the software or instructions and any associated data, data files, and data structures are stored and executed in a distributed fashion.

Data and content may be exchanged between the various components of the system using at least one communications interface to send and receive information through the communication network paths. The communications network paths may be configured to send and receive signals (e.g., electrical, acoustic, electromagnetic, or optical) that convey or carry information representing various types of analog and/or digital data including programming, software, information, data, and other content, among others, as described above.

The preceding detailed description is merely exemplary in nature and is not intended to limit the described embodiments (examples, options, etc.) or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described above are exemplary implementations provided to enable making or using the embodiments of the disclosure and are not intended to limit the scope of the disclosure. Furthermore, there is no intention to be bound by any expressed or implied theory presented in the preceding technical field, background, brief summary or the preceding detailed description. It is also to be understood that the specific devices and processes illustrated in the attached drawings, and described in this specification, are exemplary embodiments (examples), aspects and/or concepts. It is understood that "at least one" is equivalent to "a." The aspects (examples, alterations, modifications, options, variations, embodiments, and any equivalent thereof) are described with reference to the drawings; it should be understood that the descriptions herein show by way of illustration various embodiments in which claimed inventions might be practiced and are not exhaustive or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further alternate embodiments not described that may be available for a portion is not to be considered a disclaimer of those alternate embodiments. It will be appreciated that many of those embodiments that are not described incorporate the same principles of the invention and others that are equivalent. Thus, it is to be understood that other embodiments may be utilized and functional, logical, organizational, and structural modifications may be made without departing from the scope and/or spirit of the disclosure.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer implemented method performed by one or more data processing apparatuses of identifying and ordering results of a search query of a database of records, the records including a location data field or attribute, the method comprising:
   accessing a first user-submitted query generated by a first user interface of a user device, the first user-submitted query including one or more first search criteria;
   applying the one or more first search criteria to search the records of the database to identify one or more results for the first user-submitted query, each result for the first user-submitted query corresponding to an original record of the database satisfying the one or more first search criteria;
   determining a first physical location corresponding to a location associated with a first user or the user device generating the first user-submitted query;
   determining a second physical location indicated by the location data field or attribute of an original record of the database corresponding to at least one of the results for the first user-submitted query;
   creating a duplicate of the original record corresponding to the at least one of the results for the first user-submitted query in the database of records, wherein a location indicated by a data field or attribute of the duplicate record is written with a virtual location corresponding to the first physical location;

accessing a second user-submitted query generated by a second user interface of another user device, the second user-submitted query including one or more second search criteria;

applying the one or more second search criteria to search the records of the database to identify a plurality of results for the second user-submitted query, each result of the plurality of results for the second user-submitted query corresponding to a record of the database satisfying the one or more second search criteria;

determining a third physical location corresponding to a location associated with the second user or the user device generating the second user-submitted query; and providing the plurality of results for the second user-submitted query for presentation by the second user interface in an order based on a comparison of the third physical location matching a physical location indicated by the location data field or attribute of any original data record corresponding to the plurality of results for the second user-submitted query and a comparison of the third physical location matching a virtual location indicated by the data field or attribute of any duplicate data record corresponding to the plurality of results for the second user-submitted query.

2. The method of claim 1, wherein providing the plurality of results for the second user-submitted query includes presenting results for the second user-submitted query corresponding to original records having a location data field or attribute that matches the third physical location before any results for the second user-submitted query corresponding to a duplicate record records having a location data field or attribute that matches the third physical location.

3. The method of claim 1, wherein providing the plurality of results for the second user-submitted query includes presenting results for the second user-submitted query in an order where:

any results for the second user-submitted query corresponding to an original record having a location data field or attribute that matches the third physical location is provided before any results for the second user-submitted query corresponding to a duplicate record having a location data field or attribute that matches the third physical location and any results for the second user-submitted query corresponding to a record having a location data field or attribute that does not match the third physical location; and any results for the second user-submitted query corresponding to a duplicate record having a location data field or attribute that matches the third physical location is provided before any results for the second user-submitted query corresponding to a record having a location data field or attribute that does not match the third physical location.

4. The method of claim 1, wherein the first physical location and the second physical location are different.

5. The method of claim 1 further comprising:

providing search results for the first user-submitted query in response to a subsequent query of the database of records that are ordered based on:

a physical location indicated by the location data field or attribute of any original data record corresponding to the search results for the first user-submitted query; and a virtual location indicated by the data field or attribute of any duplicate data record corresponding to the search results for the first user-submitted query.

6. The method of claim 1, wherein creating a duplicate record further comprises:

generating a query corresponding to duplication of the record; and receiving a positive response to the query.

7. The method of claim 1 further comprising:

determining whether a physical location indicated by the location data field or attribute of any original data record corresponding to the plurality of results for the second user-submitted query or a virtual location indicated by the location data field or attribute of any duplicate data record corresponding to the plurality of results for the second user-submitted query matches the third physical location; and providing any results for the second user-submitted query for presentation by the second user interface of the user device having a matching third physical location.

8. The method of claim 1, wherein a physical location is one of a locality, a geophysical region, a territory, or an address.

9. A system configured to identify and order results of a search query of a database of records, the records including a location data field or attribute, the system comprising:

one or more data processing apparatuses; and one or more non-transitory computer readable storage mediums in data communication with the one or more data processing apparatuses storing instructions executable by the one or more data processing apparatuses and that upon execution cause the one or more data processing apparatuses to perform operations comprising:

accessing a first user-submitted query generated by a first user interface of a user device, the first user-submitted query including one or more first search criteria;

applying the one or more first search criteria to search the records of the database to identify one or more results for the first user-submitted query; each result for the first user-submitted query corresponding to an original record of the database satisfying the one or more first search criteria;

determining a first physical location corresponding to a location associated with a first user or the user device generating the first user-submitted query;

determining a second physical location indicated by the location data field or attribute of an original record of the database corresponding to at least one of the results for the first user submitted query; and creating a duplicate of the original record corresponding to the at least one of the results for the first user-submitted query in the database of records, wherein a location indicated by a data field or attribute of the duplicate record is written with a virtual location corresponding to the first physical location;

accessing a second user-submitted query generated by a second user interface of another user device, the second user-submitted query including second one or more search criteria;

applying the second one or more search criteria to search the records of the database to identify a plurality of results for the second user-submitted query, each result for the second user-submitted query corresponding to a record of the database satisfying the second one or more search criteria;

determining a third physical location corresponding to a location associated with the second user or the user device generating the second user-submitted query;

determining whether a physical location indicated by the location data field or attribute of any original data record corresponding to the plurality of results for the second user-submitted query or a virtual location indicated by the location data field or attribute of any duplicate data record corresponding to the plurality of results for the second user-submitted query matches the third physical location; and providing any results for the second user-submitted query for presentation by the second user interface of the user device having a matching third physical location.

10. The system of claim 9 wherein one or more non-transitory computer readable storage mediums further store instructions executable by the one or more data processing apparatuses and that upon such execution causes the one or more data processing apparatuses to perform operations comprising:

providing the plurality of results for the second user-submitted query for presentation by the second user interface in an order based on a comparison of the third physical location matching a physical location indicated by the location data field or attribute of any original data record corresponding to the plurality of results for the second user-submitted query and a comparison of the third physical location matching a virtual location indicated by the data field or attribute of any duplicate data record corresponding to the plurality of results for the second user-submitted query.

11. The system of claim 10, wherein providing the plurality of results for the second user-submitted query includes presenting results for the second user-submitted query corresponding to original records having a location data field or attribute that matches the third physical location before any results for the second user-submitted query corresponding to a duplicate record records having a location data field or attribute that matches the third physical location.

12. The system of claim 10, wherein providing the plurality of results for the second user-submitted query includes presenting for the second user-submitted query results in an order where:

any results for the second user-submitted query corresponding to an original record having a location data field or attribute that matches the third physical location is provided before any results for the second user-submitted query corresponding to a duplicate record having a location data field or attribute that matches the third physical location and any results for the second user-submitted query corresponding to a record having a location data field or attribute that does not match the third physical location; and any results for the second user-submitted query corresponding to a duplicate record having a location data field or attribute that matches the third physical location is provided before any results for the second user-submitted query corresponding to a record having a location data field or attribute that does not match the third physical location.

13. The system of claim 9, wherein the first physical location and the second physical location are different.

14. The system of claim 9, wherein one or more non-transitory computer readable storage mediums further store instructions executable by the one or more data processing apparatuses and that upon such execution causes the one or more data processing apparatuses to perform operations comprising:

providing results for the first user-submitted query in response to a subsequent query of the database of records that are ordered based on:

a physical location indicated by the location data field or attribute of any original data record corresponding to the results for the first user-submitted query; and a virtual location indicated by the data field or attribute of any duplicate data record corresponding to the results for the first user-submitted query.

15. The system of claim 9, wherein creating a duplicate record further comprises:

generating a query corresponding to duplication of the record; and receiving a positive response to the query.

16. The system of claim 9, wherein a physical location is one of a locality, a geophysical region, a territory, or an address.

17. A non-transitory computer readable storage medium storing instructions executable by one or more data processing apparatuses to identify and order results of a search query of a database of records, the records including a location data field or attribute and that upon such execution causes the one or data processing apparatuses to perform operations comprising:

accessing a first user-submitted query generated by a first user interface of a user device, the first user-submitted query including one or more first search criteria;

applying the one or more first search criteria to search the records of the database to identify one or more results for the first user-submitted query; each result for the first user-submitted query corresponding to an original record of the database satisfying the one or more first search criteria;

determining a first physical location corresponding to a location associated with a first user or the user device generating the first user-submitted query;

determining a second physical location indicated by the location data field or attribute of an original record of the database corresponding to at least one of the results for the first user submitted query;

creating a duplicate of the original record corresponding to the at least one of the results for the first user-submitted query in the database of records, wherein a location indicated by a data field or attribute of the duplicate record is written with a virtual location corresponding to the first physical location;

accessing a second user-submitted query generated by a second user interface of another user device, the second user-submitted query including one or more second search criteria;

applying the one or more second search criteria to search the records of the database to identify a plurality of results for the second user-submitted query; each result for the second user-submitted query corresponding to a record of the database satisfying the one or more second search criteria;

determining a third physical location corresponding to a location associated with the second user or the user device generating the second user-submitted query; and providing the plurality of results for the second user-submitted query for presentation by the second user interface in an order based on a comparison of the third physical location matching a physical location indicated by the location data field or attribute of any original data record corresponding to the plurality of results for the second user-submitted query and a comparison of the third physical location matching a virtual location indicated by the data field or attribute of any duplicate data record corresponding to the plurality of results for the second user-submitted query.

\* \* \* \* \*